US012764041B2

(12) United States Patent
Gao et al.

(10) Patent No.: US 12,764,041 B2

(45) Date of Patent: Oct. 13, 2026

(54) TRIGGERED AUTOMATION FRAMEWORK

(71) Applicant: NetBrain Technologies, Inc., Burlington, MA (US)

(72) Inventors: Lingping Gao, Burlington, MA (US); Xinfeng Xia, Burlington, MA (US); Yawei Wang, Burlington, MA (US); Qingyuan Ni, Burlington, MA (US); Dezhi Chen, Burlington, MA (US); Guangdong Liao, Burlington, MA (US)

(73) Assignee: NetBrain Technologies Inc., Burlington, MA (US)

( * ) Notice: Subject to any disclaimer, the term of this patent is extended or adjusted under 35 U.S.C. 154(b) by 0 days.

(21) Appl. No.: 18/172,061

(22) Filed: Feb. 21, 2023

(65) Prior Publication Data

US 2023/0198866 A1 Jun. 22, 2023

Related U.S. Application Data

(63) Continuation-in-part of application No. 17/729,275, filed on Apr. 26, 2022, now Pat. No. 12,470,469, and
(Continued)

(51) Int. Cl.
*H04L 41/5019* (2022.01)
*H04L 41/0631* (2022.01)
(Continued)

(52) U.S. Cl.
CPC ...... *H04L 41/5019* (2013.01); *H04L 41/0631* (2013.01); *H04L 41/0645* (2013.01);
(Continued)

(58) Field of Classification Search
CPC . H04L 41/5019; H04L 41/22; H04L 41/5074; H04L 43/045; H04L 41/0631; H04L 41/0654
See application file for complete search history.

(56) References Cited

U.S. PATENT DOCUMENTS 5,276,789 A 1/1994 Besaw et al.
5,504,921 A 4/1996 Dev et al.
(Continued)

FOREIGN PATENT DOCUMENTS

EP 1349318 A2 10/2003
EP 3101841 A1 12/2016
(Continued)

OTHER PUBLICATIONS

B. E. Ujcich, A. Bates and W. H. Sanders, "Provenance for Intent-Based Networking," 2020 6th IEEE Conference on Network Softwarization (NetSoft), Ghent, Belgium, 2020, pp. 195-199, doi: 10.1109/NetSoft48620.2020.9165519. (Year: 2020).*
(Continued)

*Primary Examiner* — Patrice L Winder
(74) *Attorney, Agent, or Firm* — GTC Law Group PC & Affiliates

(57) ABSTRACT

Problem Diagnosis Automation System (PDAS) automates the diagnosis of repetitive problems and the enforcement of preventive measures across a network. Automation assets across the network include Network Intent (NI) inside the no-code platform. A Network Intent Cluster (NIC) clones a NI across the network to create a group of NIs (member NIs) with the same design or logic. A subset of Member NIs can be executed according to user-defined conditions based on the member device, the member NI tags, or signature variables. A Triggered Automation Framework (TAF) matches the incoming API calls from a 3rd party system to current incidents and installs the automation (e.g., NI/NIC) to be triggered for each call. It may include: Integrated IT System defining the scope and data of the incoming API calls; Incident Type to match a call to an Incident; and Triggered Diagnosis to define what and how the NIC/NI is executed.

8 Claims, 43 Drawing Sheets

Related U.S. Application Data a continuation-in-part of application No. 17/729,182, filed on Apr. 26, 2022.

(60) Provisional application No. 63/311,679, filed on Feb. 18, 2022, provisional application No. 63/179,782, filed on Apr. 26, 2021.

(51) Int. Cl.

| | |
|---|---|
| ***H04L 41/0681*** | (2022.01) |
| ***H04L 41/22*** | (2022.01) |
| ***H04L 41/5074*** | (2022.01) |
| ***H04L 43/045*** | (2022.01) |

(52) U.S. Cl.

CPC .......... *H04L 41/0681* (2013.01); *H04L 41/22* (2013.01); *H04L 41/5074* (2013.01); *H04L 43/045* (2013.01)

(56) References Cited

U.S. PATENT DOCUMENTS

| | | | |
|---|---|---|---|
| 5,572,640 | A | 11/1996 | Schettler |
| 5,706,440 | A | 1/1998 | Compliment et al. |
| 5,883,621 | A | 3/1999 | Iwamura |
| 5,926,176 | A | 7/1999 | Mcmillan et al. |
| 5,999,179 | A | 12/1999 | Kekic et al. |
| 6,058,103 | A | 5/2000 | Henderson et al. |
| 6,078,924 | A | 6/2000 | Ainsbury et al. |
| 6,137,782 | A | 10/2000 | Sharon et al. |
| 6,151,031 | A | 11/2000 | Atkins et al. |
| 6,205,122 | B1 | 3/2001 | Sharon et al. |
| 6,253,240 | B1 | 6/2001 | Axberg et al. |
| 6,286,035 | B1 | 9/2001 | Gillis et al. |
| 6,289,380 | B1 | 9/2001 | Battat et al. |
| 6,477,572 | B1 | 11/2002 | Elderton et al. |
| 6,484,261 | B1 | 11/2002 | Wiegel |
| 6,614,893 | B1 | 9/2003 | Paiz |
| 6,628,304 | B2 | 9/2003 | Mitchell et al. |
| 6,678,729 | B1 | 1/2004 | Ahoor et al. |
| 6,718,382 | B1 | 4/2004 | Li et al. |
| 6,788,315 | B1 | 9/2004 | Kekic et al. |
| 6,901,440 | B1 | 5/2005 | Bimm et al. |
| 6,907,572 | B2 | 6/2005 | Little et al. |
| 6,909,708 | B1 | 6/2005 | Krishnaswamy et al. |
| 6,957,263 | B2 | 10/2005 | Galou et al. |
| 7,050,813 | B1 | 5/2006 | Paiz |
| 7,051,101 | B1 | 5/2006 | Dubrovsky et al. |
| 7,054,901 | B2 | 5/2006 | Shafer |
| 7,065,769 | B1 | 6/2006 | Tolopka |
| 7,082,464 | B2 | 7/2006 | Hasan et al. |
| 7,177,924 | B2 | 2/2007 | Murray et al. |
| 7,197,561 | B1 | 3/2007 | Lovy et al. |
| 7,219,339 | B1 | 5/2007 | Goyal et al. |
| 7,254,778 | B2 | 8/2007 | Dikhit |
| 7,260,621 | B1 | 8/2007 | Lavian et al. |
| 7,310,666 | B2 | 12/2007 | Benfield et al. |
| 7,376,719 | B1 | 5/2008 | Shafer et al. |
| 7,469,139 | B2 | 12/2008 | Van |
| 7,490,073 | B1 | 2/2009 | Qureshi et al. |
| 7,581,207 | B2 | 8/2009 | Bolder et al. |
| 7,590,718 | B2 | 9/2009 | Gilmour et al. |
| 7,721,304 | B2 | 5/2010 | Datla et al. |
| 7,742,459 | B2 | 6/2010 | Kwan et al. |
| 7,765,320 | B2 | 7/2010 | Vehse et al. |
| 7,774,440 | B1 | 8/2010 | Bagrodia et al. |
| 7,783,733 | B1 | 8/2010 | Yip et al. |
| 7,813,281 | B2 | 10/2010 | Bolt et al. |
| 7,823,069 | B1 | 10/2010 | Tanner et al. |
| 7,848,337 | B1 | 12/2010 | Weng et al. |
| 7,908,594 | B2 | 3/2011 | Varanasi et al. |
| 7,996,415 | B1 | 8/2011 | Raffill et al. |
| 8,190,723 | B2 | 5/2012 | Datla et al. |
| 8,266,264 | B2 | 9/2012 | Hasan et al. |
| 8,271,626 | B2 | 9/2012 | Childers et al. |
| 8,276,152 | B2 | 9/2012 | Sanghvi et al. |
| 8,325,720 | B2 | 12/2012 | Gao et al. |
| 8,386,593 | B1 | 2/2013 | Gao et al. |
| 8,386,937 | B1 | 2/2013 | Gao et al. |
| 8,549,499 | B1 | 10/2013 | Ding et al. |
| 8,601,318 | B2 | 12/2013 | Huang et al. |
| 8,745,191 | B2 | 6/2014 | Raleigh et al. |
| 8,782,201 | B2 | 7/2014 | Kephart et al. |
| 8,903,965 | B2 | 12/2014 | Fong et al. |
| 8,924,533 | B2 | 12/2014 | Adams et al. |
| 8,943,184 | B2 | 1/2015 | Kothe et al. |
| 9,098,412 | B1 | 8/2015 | Marchant et al. |
| 9,176,731 | B1 | 11/2015 | Ziftci et al. |
| 9,258,195 | B1 | 2/2016 | Pendleton et al. |
| 9,374,278 | B2 | 6/2016 | Gao et al. |
| 9,392,462 | B2 | 7/2016 | Raleigh et al. |
| 9,438,481 | B2 | 9/2016 | Gao et al. |
| 9,621,428 | B1 | 4/2017 | Lev et al. |
| 9,954,751 | B2 * | 4/2018 | Zhang ..................... H04L 43/14 |
| 10,235,353 | B1 | 3/2019 | Sanders et al. |
| 10,382,288 | B2 | 8/2019 | Gao et al. |
| 10,454,782 | B2 | 10/2019 | Gao et al. |
| 10,567,252 | B1 * | 2/2020 | Mukhopadhyaya ......................... H04L 41/5032 |
| 10,652,102 | B2 | 5/2020 | Kompella et al. |
| 10,756,983 | B2 | 8/2020 | Ratkovic et al. |
| 10,992,543 | B1 | 4/2021 | Rachamadugu et al. |
| 11,018,994 | B2 | 5/2021 | Balan et al. |
| 11,327,826 | B1 * | 5/2022 | Shama ................... G06N 20/00 |
| 11,431,584 | B2 | 8/2022 | Gao et al. |
| 11,444,833 | B1 | 9/2022 | A et al. |
| 11,528,195 | B2 | 12/2022 | Gao et al. |
| 11,637,758 | B2 | 4/2023 | Gao et al. |
| 11,683,240 | B2 | 6/2023 | Chunduru Venkata et al. |
| 11,689,430 | B2 | 6/2023 | Gao et al. |
| 11,736,365 | B2 | 8/2023 | Gao et al. |
| 12,010,004 | B2 | 6/2024 | Gao et al. |
| 12,470,469 | B2 | 11/2025 | Gao et al. |
| 2002/0054169 | A1 | 5/2002 | Richardson |
| 2002/0152305 | A1 | 10/2002 | Jackson et al. |
| 2002/0161861 | A1 | 10/2002 | Greuel |
| 2002/0161875 | A1 | 10/2002 | Raymond |
| 2002/0175934 | A1 | 11/2002 | Hand et al. |
| 2002/0194497 | A1 | 12/2002 | Mcguire |
| 2002/0198974 | A1 | 12/2002 | Shafer |
| 2003/0009430 | A1 | 1/2003 | Burkey et al. |
| 2003/0033588 | A1 | 2/2003 | Alexander |
| 2003/0051032 | A1 | 3/2003 | Schenkel et al. |
| 2003/0055892 | A1 | 3/2003 | Huitema et al. |
| 2003/0101262 | A1 | 5/2003 | Godwin |
| 2003/0135758 | A1 | 7/2003 | Turner |
| 2003/0204590 | A1 | 10/2003 | Torii |
| 2004/0019671 | A1 | 1/2004 | Metz |
| 2004/0024865 | A1 | 2/2004 | Huang et al. |
| 2004/0041833 | A1 | 3/2004 | Dikhit |
| 2004/0153536 | A1 | 8/2004 | Strassner |
| 2004/0193729 | A1 | 9/2004 | Saraph |
| 2004/0194088 | A1 | 9/2004 | Chen et al. |
| 2005/0005266 | A1 | 1/2005 | Datig |
| 2005/0041676 | A1 | 2/2005 | Weinstein et al. |
| 2005/0044197 | A1 | 2/2005 | Lai |
| 2005/0060579 | A1 | 3/2005 | Dickelman et al. |
| 2005/0060693 | A1 | 3/2005 | Robison et al. |
| 2005/0097397 | A1 | 5/2005 | Wu |
| 2005/0135360 | A1 | 6/2005 | Shin et al. |
| 2005/0138557 | A1 | 6/2005 | Bolder et al. |
| 2005/0165597 | A1 | 7/2005 | Nightingale |
| 2005/0169179 | A1 | 8/2005 | Antal et al. |
| 2005/0216421 | A1 | 9/2005 | Barry et al. |
| 2005/0243066 | A1 | 11/2005 | Li et al. |
| 2005/0256961 | A1 | 11/2005 | Alon et al. |
| 2006/0004745 | A1 | 1/2006 | Kuhn et al. |
| 2006/0015591 | A1 | 1/2006 | Datla et al. |
| 2006/0020694 | A1 | 1/2006 | Nag et al. |
| 2006/0031446 | A1 | 2/2006 | Hamedi |
| 2006/0036612 | A1 | 2/2006 | Harrop et al. |
| 2006/0062154 | A1 | 3/2006 | Choy et al. |
| 2006/0092940 | A1 | 5/2006 | Ansari et al. |
| 2006/0221843 | A1 | 10/2006 | Cidon et al. |

(56) References Cited

U.S. PATENT DOCUMENTS

2006/0233310 A1* 10/2006 Adams, Jr. ............ H04L 41/507 379/21
2006/0258348 A1 11/2006 Rajala
2006/0282453 A1 12/2006 Tjong et al.
2007/0006179 A1 1/2007 Tjong et al.
2007/0011348 A1 1/2007 Bansal et al.
2007/0058570 A1 3/2007 Singh et al.
2007/0073863 A1 3/2007 Motoyama et al.
2007/0101273 A1 5/2007 Lin et al.
2007/0130112 A1 6/2007 Lin
2007/0168704 A1 7/2007 Connolly et al.
2007/0169008 A1 7/2007 Varanasi et al.
2007/0204231 A1 8/2007 Cunningham et al.
2007/0283328 A1 12/2007 Javed et al.
2008/0120129 A1 5/2008 Seubert et al.
2008/0155423 A1 6/2008 Moran et al.
2008/0155643 A1 6/2008 Moran et al.
2008/0165775 A1 7/2008 Das et al.
2008/0222189 A1 9/2008 Ovanesyan et al.
2009/0003232 A1 1/2009 Vaswani et al.
2009/0094521 A1 4/2009 Hung et al.
2009/0113248 A1 4/2009 Bock et al.
2009/0119280 A1 5/2009 Waters et al.
2009/0157630 A1 6/2009 Yuan
2009/0216867 A1 8/2009 Pusateri et al.
2009/0288065 A1 11/2009 Nathan et al.
2009/0300403 A1 12/2009 Little
2010/0023867 A1 1/2010 Coldiron et al.
2010/0030984 A1 2/2010 Erickson et al.
2010/0118710 A1 5/2010 Ogawa et al.
2010/0122175 A1 5/2010 Gupta et al.
2010/0138750 A1 6/2010 Trinler
2010/0153852 A1 6/2010 Mccallum et al.
2010/0260066 A1 10/2010 August et al.
2010/0299430 A1 11/2010 Powers et al.
2010/0318639 A1 12/2010 Jauquet et al.
2011/0004914 A1 1/2011 Ennis et al.
2011/0013520 A1 1/2011 Dunn et al.
2011/0047467 A1 2/2011 Porter
2011/0087988 A1 4/2011 Ray et al.
2011/0161730 A1 6/2011 Van et al.
2012/0041858 A1 2/2012 Lewis
2012/0054551 A1 3/2012 Gao et al.
2012/0059916 A1 3/2012 Ohashi
2012/0173691 A1 7/2012 Kothe et al.
2012/0198082 A1 8/2012 Gaertner et al.
2012/0209581 A1 8/2012 Gao et al.
2012/0213117 A1 8/2012 Banerjee et al.
2012/0259762 A1 10/2012 Tarighat et al.
2012/0314605 A1 12/2012 Akiyoshi
2013/0042222 A1 2/2013 Maddela
2013/0067018 A1 3/2013 Reynolds et al.
2013/0073486 A1 3/2013 Petrick
2013/0198237 A1 8/2013 Serban et al.
2013/0227103 A1* 8/2013 Garimella ........... H04L 41/5054 709/223
2013/0282889 A1 10/2013 Tito
2013/0290224 A1 10/2013 Crowns et al.
2013/0305091 A1 11/2013 Stan et al.
2014/0040710 A1 2/2014 Smith
2014/0078930 A1 3/2014 Bevemyr
2014/0189870 A1 7/2014 Singla et al.
2014/0192645 A1 7/2014 Zhang et al.
2014/0207840 A1 7/2014 Smith et al.
2014/0207945 A1 7/2014 Galloway et al.
2014/0258985 A1 9/2014 Yawn et al.
2014/0269266 A1 9/2014 Filsfils et al.
2014/0280831 A1 9/2014 Gao et al.
2014/0280833 A1 9/2014 Gao et al.
2014/0280864 A1 9/2014 Yin et al.
2014/0282027 A1 9/2014 Gao et al.
2014/0355450 A1 12/2014 Bhikkaji et al.
2015/0019692 A1 1/2015 Chandaria et al.
2015/0081887 A1 3/2015 Kalkunte et al.
2015/0103672 A1 4/2015 Stuart
2015/0156077 A1 6/2015 Gao et al.
2015/0242413 A1 8/2015 Goo et al.
2015/0334207 A1 11/2015 Kane et al.
2015/0373207 A1 12/2015 Day et al.
2015/0382212 A1 12/2015 Elliott et al.
2016/0020976 A1 1/2016 Gamage
2016/0028606 A1 1/2016 Cole et al.
2016/0099883 A1 4/2016 Voit et al.
2016/0119219 A1 4/2016 Fang et al.
2016/0164753 A1 6/2016 Cimprich et al.
2016/0352586 A1 12/2016 Priya et al.
2016/0359687 A1 12/2016 Gao et al.
2016/0359688 A1 12/2016 Gao et al.
2017/0063709 A1 3/2017 Smith et al.
2017/0070426 A1 3/2017 Chen et al.
2017/0264513 A1 9/2017 Pietrowicz et al.
2017/0324627 A1 11/2017 Eardley et al.
2017/0353490 A1 12/2017 Krauss et al.
2018/0018065 A1 1/2018 Gao et al.
2018/0062956 A1 3/2018 Schultz et al.
2018/0091419 A1 3/2018 Bickhart
2018/0115469 A1 4/2018 Erickson et al.
2018/0176096 A1 6/2018 Prabakaran et al.
2018/0262594 A1 9/2018 Nhu et al.
2018/0351806 A1 12/2018 Mohanram et al.
2018/0351821 A1 12/2018 Nagarajan et al.
2018/0375886 A1 12/2018 Kirti et al.
2019/0044790 A1 2/2019 Dickens et al.
2019/0052552 A1 2/2019 Holbrook et al.
2019/0087401 A1 3/2019 Sanders et al.
2019/0182119 A1 6/2019 Ratkovic et al.
2019/0215248 A1 7/2019 D'ippolito et al.
2019/0230003 A1 7/2019 Gao et al.
2019/0238410 A1 8/2019 Kang et al.
2019/0311034 A1 10/2019 Gao et al.
2019/0327125 A1 10/2019 Mcchord et al.
2019/0356535 A1 11/2019 Li et al.
2020/0106673 A1 4/2020 Garrett et al.
2020/0195501 A1 6/2020 Shenoy et al.
2020/0213186 A1 7/2020 Shaw et al.
2020/0225925 A1 7/2020 Sathyanarayanamurthy et al.
2020/0252261 A1 8/2020 Arora et al.
2020/0262297 A1 8/2020 Kubota et al.
2020/0313957 A1 10/2020 A et al.
2020/0389367 A1 12/2020 Gao et al.
2020/0389368 A1 12/2020 Gao et al.
2020/0389369 A1 12/2020 Gao et al.
2020/0389370 A1 12/2020 Gao et al.
2020/0403863 A1* 12/2020 A ........................ H04L 41/0813
2021/0014145 A1 1/2021 Cai et al.
2021/0021492 A1 1/2021 Gao et al.
2021/0144082 A1 5/2021 Bisht et al.
2021/0152416 A1* 5/2021 A ............................ H04L 41/12
2021/0243068 A1 8/2021 R et al.
2021/0258238 A1 8/2021 Bose
2021/0304098 A1 9/2021 Yang et al.
2021/0309124 A1 10/2021 Fields et al.
2021/0392047 A1* 12/2021 Jamkhedkar ............ H04L 41/12
2022/0006755 A1 1/2022 Busick et al.
2022/0021738 A1 1/2022 Patel et al.
2022/0044131 A1* 2/2022 Rayes ..................... G06F 8/433
2022/0078072 A1* 3/2022 Rayes ................. H04L 41/0631
2022/0094614 A1* 3/2022 Khurshid .............. H04L 41/147
2022/0106060 A1 4/2022 Morrison et al.
2022/0120574 A1 4/2022 Simpson
2022/0166679 A1* 5/2022 Hafeez .................... H04L 41/22
2022/0200863 A1 6/2022 Kotalwar
2022/0247638 A1 8/2022 Engi et al.
2022/0321426 A1 10/2022 Ewert et al.
2022/0360509 A1 11/2022 Gao et al.
2022/0393942 A1 12/2022 Gao et al.
2022/0414492 A1* 12/2022 Jezewski ................ G06N 20/00
2023/0034173 A1* 2/2023 Russell .................. G06N 20/00
2023/0104928 A1 4/2023 Gao et al.
2023/0155907 A1 5/2023 Mwanje et al.
2023/0224214 A1 7/2023 Bhargava et al.
2023/0336400 A1 10/2023 Gao et al.
2023/0388824 A1 11/2023 Xu et al.
2024/0155435 A1 5/2024 Karapantelakis et al.

(56) References Cited

U.S. PATENT DOCUMENTS

| | | | |
|---|---|---|---|
| 2024/0236136 | A9 | 7/2024 | Madala et al. |
| 2024/0305517 | A1 | 9/2024 | Gao et al. |
| 2024/0314017 | A1 | 9/2024 | Gao et al. |
| 2024/0314019 | A1 | 9/2024 | Gao et al. |

FOREIGN PATENT DOCUMENTS

| | | | |
|---|---|---|---|
| EP | 3101842 | A1 | 12/2016 |
| EP | 3324575 | A1 | 5/2018 |
| EP | 3101842 | B1 | 11/2019 |
| EP | 3101841 | B1 | 7/2020 |
| EP | 3748503 | A1 | 12/2020 |
| EP | 3748504 | A1 | 12/2020 |
| EP | 3748505 | A1 | 12/2020 |
| EP | 3754905 | A1 | 12/2020 |
| EP | 3780500 | A2 | 2/2021 |
| EP | 3780500 | B1 | 9/2024 |
| EP | 3748503 | B1 | 12/2024 |
| WO | 2013036269 | A1 | 3/2013 |
| WO | 2014145818 | A1 | 9/2014 |
| WO | 2016130337 | A1 | 8/2016 |
| WO | 2019050474 | A1 | 3/2019 |
| WO | 2022002379 | A1 | 1/2022 |

OTHER PUBLICATIONS

M. Bezahaf, E. Davies, C. Rotsos and N. Race, “To All Intents and Purposes: Towards Flexible Intent Expression, ” 2021 IEEE 7th International Conference on Network Softwarization (NetSoft), Tokyo, Japan, 2021, pp. 31-37, doi: 10.1109/NetSoft51509.2021.9492554. (Year: 2021).*

NetBrain Workstation Architect Edition, parts of chapter 10, Apr. 27, 2010, 7 pages.

NetBrain Workstation 2.0, Oct. 10, 2008, 2 pages.

NetBrain Technologies Announces New Channel Strategy in North America and Europe, Mar. 17, 2010, 2 pages.

NetBrain Technologies Releases Enterprise Suite 4.0 at CiscoLive 2011, Jul. 8, 2011, 5 pages.

“European Application Serial No. 16172666.6, Extended European Search Report mailed Oct. 24, 2016”, NetBrain Technologies Inc., 10 pages.

“European Application Serial No. 16172682.3, Extended European Search Report mailed Oct. 24, 2016”, NetBrain Technologies Inc., 9 pages.

“European Application Serial No. 20178695.1, Extended European Search Report mailed Oct. 30, 2020”, NetBrain Technologies Inc., 12 pages.

“European Application Serial No. 20178696.9, Extended European Search Report mailed Nov. 2, 2020”, NetBrain Technologies Inc., 10 pages.

“European Application Serial No. 20178698.5, Extended European Search Report mailed Nov. 9, 2020”, NetBrain Technologies Inc., 13 pages.

“European Application Serial No. 20186452.7, European Search Report mailed Dec. 9, 2020”, NetBrain Technologies Inc., 15 pages.

“European Application Serial No. 20186452.7, Extended European Search Report mailed Mar. 12, 2021”, NetBrain Technologies Inc., 14 pages.

Anonymous, “Cisco Prime Infrastructure 3.3 User Guide”, XP055742035, San Jose, CA, USA Retrieved from the Internet: URL:https://www.cisco.com/c/en/us/td/docs/net_mgmVprime/infrastructure/3-3/user/guide/bk_CiscoPrimeInfrastructure_, Aug. 2, 2017, 898 pages.

Cisco Systems, Inc., “Show Command Section Filter”, Cisco IOS Release 12.3(2)T, 2003, 1 page.

Levy, Jr., Steven, Wayback Machine, Encyclopedia Britannica, definition of Graphical User Interface (GUI) (accessed on Feb. 26, 2024), 2015, 3 pages.

Netbrain Technologies Inc., “How to Define and Use Qapp”, Updated Jun. 12, 2015. Retrieved from https://www.netbraintech.com/ftp/ EE60/How_to_Define_and_Use_Qapp_6.0.pdf on Aug. 4, 2020., 2015, 250 pages.

“International Application Serial No. PCT/US2014/030647, International Preliminary Report on Patentability mailed Sep. 15, 2015”, NetBrain Technologies Inc., 7 pages.

“International Application Serial No. PCT/US2014/030647, International Search Report and Written Opinion mailed Aug. 7, 2014”, NetBrain Technologies Inc., 9 pages.

“International Application Serial No. PCT/US2016/015603, International Preliminary Report on Patentability mailed Aug. 15, 2017”, NetBrain Technologies Inc., 9 pages.

“International Application Serial No. PCT/US2016/015603, International Search Report and Written Opinion mailed Mar. 29, 2016”, NetBrain Technologies Inc., 11 pages.

Schmidt, et al., “Do-It-Yourself TMN Applications by Visual Programming Methods”, IEEE Communications Magazine, vol. 33, No. 11, Nov. 1995, pp. 72-76.

Addad, et al., “Benchmarking the ONOS Intent Interfaces to Ease 5G Service Management”, 2018 IEEE Global V Communications Conference (GLOBECOM), Abu Dhabi, United Arab Emirates, 2018, pp. 1-6.

“International Application Serial No. PCT/US2025/055601, Invitation to Pay Additional Fees and, Where Applicable, Protest Fee mailed Jan. 14, 2026”, NetBrain Technologies Inc., 2 pages.

Sanvito, et al., “ONOS Intent Monitor and Reroute service: enabling plug&play routing logic”, 2018 4th IEEE Conference on U Network Softwarization and Workshops (NetSoft), Montreal, QC, Canada, 2018, pp. 272-276.

* cited by examiner

Input and Output of Problem Diagnosis Automation System (PDAS)

Figure 9
Member Network Intent
To generate the member network intent and also run the network intent
Refresh Member Network Intent
(Last updated at 05:45am, 11/11/2021)
Execution Log
8 Member Network Intent, with 8 automatically generated, and 0 manually added
+ Add Network Intent
Filter by: Select Devices Select Signature Values
Tags: All (8) HSRP (8)
Search
Network Intent
Devices
Type
Last Run Time
Status Code
CSV Report
HSRP Check 1 2 Auto-generated 11/01/2021 9:15pm local state changed from active to standby Report
HSRP Check 2 2 Auto-generated 11/01/2021 9:15pm HSRP status not changed Report
HSRP Check 3 2 Auto-generated 11/01/2021 9:15pm HSRP status not changed Report
HSRP Check 4 2 Auto-generated 11/02/2021 2:23pm local state changed from active to standby Report
HSRP Check 5 2 Auto-generated 11/02/2021 2:23pm HSRP status not changed Report
HSRP Check 6 2 Auto-generated
HSRP Check 7 2 Auto-generated
HSRP Check 8 2 Auto-generated
Export CSV Report
Save CSV Report
Run Network Intent

Figure 15b
Populate Data
(Last executed at 2/4/2022, 7:40:30 AM)
Completed with warnings
Execution Log
5 eigen groups: 3 groups will create NI and 2 groups won't create NI
View Data Retrieval Results
8 items: 8 items matched and 0 items not matched
Filter by: All Device Classifiers
Eigen Group
Eigen Value
Device
Matched Seed Device
Create NI?
Device Classifier
Group 2 (10.8.3.129) CA-TOR-SW1 2 devices Yes Cisco IOS Device
Group 2 (10.8.3.129) CA-TOR-SW2 2 devices Cisco IOS Device
Group 3 (10.8.1.1) US-BOS-SW1 2 devices Cisco IOS Device
Group 5 (10.8.1.17) US-BOS-SW1 2 devices Yes Cisco IOS Device
Group 3 (10.8.1.1) US-BOS-SW2 2 devices Yes Cisco IOS Device
Group 5 (10.8.1.17) US-BOS-SW2 2 devices Yes Cisco IOS Device
Group 4 (104.207.208.97) bur-isp-gw2 2 devices No Cisco IOS Device
Group 1 (104.207.208.65) bur-isp-gw2 2 devices No Cisco IOS Device
2 Matched Seed Devices:
Cisco-Active(CA-TOR-SW1)
Cisco-Standby(CA-TOR-SW2)

Figure 19
Seed NI Variable Setting
Please select Seed NI Variables for testing:
Check System Upgrade
D1 [US-LAX-FortiGate-FW]
get system status
dummy
version
D2 [US-BOS-R1]
show version
version
Cancel
OK

Figure 27
Match Member Network Intents
Match member NI(s) to be executed by signature variable, member device, or member NI tag
A
Member Device
Is part of
Short_description
B
Select Criteria
Boolean Expression:
A
Maximum number of Network Intent(s) matched for one trigger task:
1

Figure 32
Triggered Diagnosis Center
Incident Type
Triggered Diagnosis
Diagnosis Log
Display all triggered tasks from integrated IT system and NetBrain incident.
Items: 9
Time Range:
Last 7 days
Status:
All
Search...
Task ID
Source
Category
Triggered Time
Status
Incident Type
Incident ID
Matched Diagnosis Count
Delete

Figure 35
Manual Run Diagnosis
Query Alerts from Preventive Automation
NI Output:
NI level Alerts
Device level Alerts
Output Item Count
High CPU Utilization
Messages
Maps
Diagnosis
Members
Select Diagnosis
Run
Query Alerts from Preventive Automation
Output
All
Alert
Detected duplex mismatch on 3 devices

TRIGGERED AUTOMATION FRAMEWORK

PRIORITY

This application claims priority to Provisional Patent Application No. 63/311,679, filed on Feb. 18, 2022, entitled PROBLEM DIAGNOSIS AUTOMATION SYSTEM (PDAS) INCLUDING NETWORK INTENT CLUSTER (NIC), TRIGGERED DIAGNOSIS, AND PERSONAL MAP, and claims priority as a Continuation-in-part to U.S. application Ser. No. 17/729,275, filed on Apr. 26, 2022, entitled NETWORK ADAPTIVE MONITORING, and to U.S. application Ser. No. 17/729,182, filed on Apr. 26, 2022, entitled NETWORK INTENT MANAGEMENT AND AUTOMATION, both of which claim priority to Provisional Patent Application No. 63/179,782, filed on Apr. 26, 2021, entitled INTENT-BASED NETWORK AUTOMATION, the entire disclosures of each are herein incorporated by reference.

BACKGROUND

In the modern computer age, businesses rely on an electronic network to function properly. Computer network management and troubleshooting are complex. There are thousands of shell scripts and applications for different network problems. The available, but poorly documented solutions can be overwhelming for junior network engineers. Most network engineers learn troubleshooting through reading the manufacturer's manual or internal documentation from the company's documentation department. But the effectiveness varies. For instance, the troubleshooting knowledge captured in a document can only be helpful if the information is accurate and the user correctly identifies the problem. Many companies have to conduct extensive training for junior engineers. The conventional way of network troubleshooting requires a network professional to manually run a set of standard commands and processes for each device. However, to become familiar with those commands, along with each of their parameters, takes years of practice. Also, complicated troubleshooting methodology is often hard to share and transfer. Therefore, even though a similar network problem happens repeatedly, each troubleshooting instance may still have to start from scratch. However, networks are getting more and more complex, and it is increasingly difficult to manage them efficiently with traditional methods and tools.

Network management teams provide two functions: to deliver services required by the business and ensure minimized downtime. The first function may be dominated by projects, such as data centers, cloud migration, or implementing quality of service (QoS) for a voice or video service. The second function, minimizing downtime, may be more critical in impacting a company's revenue and reputation. Ensuring minimal downtime can include preventing outages from happening and resolving outages as soon as possible. Two measurements for an outage may include Mean Time Between Failure (MTBF) and Mean Time to Repair (MTTR).

Network management may utilize new methodologies and processes to accommodate the global shift to digital technologies. To manage the network efficiently with tactical, manual approaches using legacy mechanisms to build, operate, and troubleshoot may need to improve.

SUMMARY

This disclosure generally relates to Problem Diagnosis Automation System (PDAS) for network management automation using network intent (NI). Network intent (NI) represents a network design and baseline configuration for that network or network devices with the ability to diagnose deviation from the baseline configuration. Problem Diagnosis Automation System (PDAS) automates the diagnosis of repetitive problems and the enforcement of preventive measures across a network. Automation assets across the network include Network Intent (NI) or Executable Runbook (RB) inside the no-code platform. Automation is executed in response to an external symptom in three successive methods, namely interactive, triggered, and preventive. Execution output is organized inside an incident pane for each incident.

A Network Intent Cluster (NIC) clones a NI across the network to create a group of NIs (member NIs) with the same design or logic. NIC may be created from a seed NI via no coding process. In PDAS, a subset of Member NIs can be automatically executed according to the user-defined condition based on the member device, the member NI tags, or signature variables.

A Triggered Automation Framework (TAF) matches the incoming API calls from a 3rd party system to current incidents and installs the automation (e.g., NI/NIC) to be triggered for each call. It may include: Integrated IT System defining the scope and data of the incoming API calls; Incident Type to match a call to an Incident; and Triggered Diagnosis to define what and how the NIC/NI is executed.

In one embodiment, a method for network management automation includes defining one or more input devices and variables; identifying one or more network intent (NI) seeds; generating member NI based on the one or more NI seeds and based on the defined one or more input devices; and triggering a network intent cluster to run for the generated member NI. The method includes classifying the one or more input devices when subject to network commands; and grouping the one or more input devices by eigen-value based on the network commands. The generating the member NI is based on the grouping. The method includes selecting the NI seed; and testing the selected NI seed against a live network, wherein the generating the member NI occurs only when the NI seed passes the testing. The defining the input devices further comprises identifying the one or more input devices based on Site, Device Group, Device, Path, or by Map. The defining comprises uploading a file with device properties. The NI seed comprises one or more devices with NI to be replicated. The member NI comprises one or more devices with the NI seed, wherein the one or more devices are from the defined one or more input devices. The generating member NI is: by map, by site, by device group, by path, by device, or by neighbor. The triggering is from an external source.

In another embodiment, a method for Problem Diagnosis Automation System (PDAS) including receiving an incident via a ticket system for a network; identifying a device and signature variables based on the incident; and triggering a network intent cluster (NIC) to create and run a member NI. The method includes reviewing a reference library for past incidents from the ticket system; and performing an automated network intent runbook analysis. The method includes performing an automated diagnosis of the problem based on the automated network intent runbook analysis; and outputting results of the automated diagnosis for troubleshooting and data sharing. The method includes classifying the input device when subject to different commands; grouping the classifying by eigen-value; and comparing, for each of the groupings, a NI for the input device with the identified NI seed. The output comprises an incident pane as a graphical user interface (GUI). The incident pane displays results from a network intent diagnosis. The incident pane displays a recommended diagnosis for the incident.

In another embodiment, a method for network intention (NI) includes cloning a NI with a Network Intent Cluster (NIC); and seeding the NI across a network to create a group of NIs based on the design for the NIC. A subset of the NIs can be automatically executed according to a user-defined condition based on a member device, a member NI tags, or other signature variables. The NI includes at least one of a name, a description, a target device, a tag, a configuration, or a variable.

In one embodiment, a method for automating network management includes enabling a network intent (NI) or a network intent cluster (NIC) to be triggered based on input parameters for an incident; defining conditions for the triggering of the NI or the NIC; and identifying member NIs to be executed. The method includes executing the member NIs. The input parameters for an incident comprises a name, description, type, or selection. The type comprises the NI or NIC. The conditions comprise triggered conditions.

In another embodiment, a method for network management includes receiving an incident via a ticket system for a network; analyzing the incident; performing an automated diagnosis of the incident based on the analysis, wherein the automated diagnosis comprises implementing a Triggered Automation Framework (TAF); and outputting results of the automated diagnosis for troubleshooting and data sharing. The automated diagnosis further includes: performing a self-service diagnosis; performing an interactive automation; and performing preventative automation via a probe. The TAF includes: matching incoming application program interface (API) calls; and installing automation to be triggered for each of the API calls. The installing comprises a triggered diagnosis to define execution of a network intent (NI). The installing comprises a triggered diagnosis to define execution of a network intent cluster (NIC). The outputting results t comprises an incident pane as a graphical user interface (GUI). The incident pane displays results from a network intent (NI) diagnosis. Results from the TAF are displayed on the incident pane.

In another embodiment, a method for network automation includes: receiving a network incident; classifying the incident; triggering a diagnosis for the incident based on the classifying; and displaying the diagnosis in an incident pane. The receiving comprises a ticket identifying the incident. The classifying comprises classifying an incident error, an incident type, or a device for the incident. The classifying comprises an Application Programming Interface (API) call. The triggering comprises a triggered diagnosis that automatically executes based on the classifying. The execution comprises a Network Intent Cluster (NIC) that updates logic based on the classifying. The incident pane comprises a graphical user interface (GUI) that displays a triggered diagnosis center. The incident pane comprises a triggered diagnosis log.

BRIEF DESCRIPTION OF THE DRAWINGS

The system and method may be better understood with reference to the following drawings and descriptions. Non-limiting and non-exhaustive embodiments are described with reference to the following drawings. The components in the drawings are not necessarily to scale, emphasis instead being placed upon illustrating the principles of the invention. The drawings, like referenced numerals, designate corresponding parts throughout the different views.

DETAILED DESCRIPTION

Figure 1:
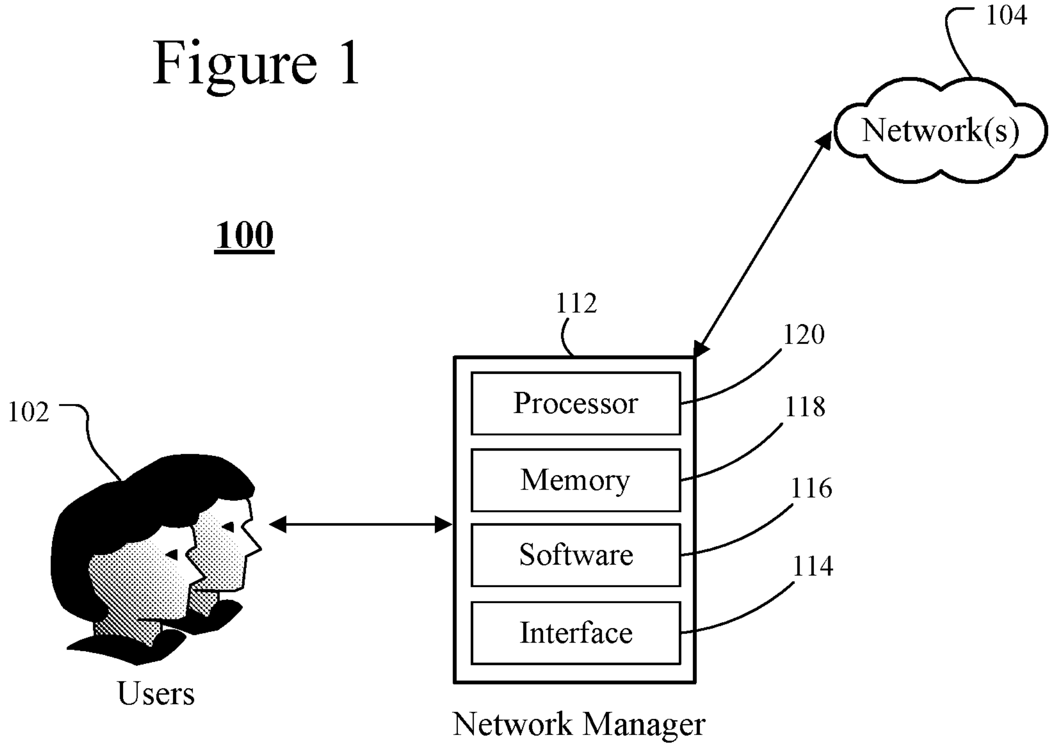
FIG. 1 illustrates a block diagram of an example network system.

Network problems may be organized by a Ticket System in the form of incidents. Those network problems may be repetitive: identical or similar problems happen repeatedly but are diagnosed the same way each time. Often those problems are preventable, caused by miss-configuration, performance degrade, or security violations. However, lack of automated methods to enforce the design rules, best practices, or security policy may prevent the remediation of those problems effectively.

Problem Diagnosis Automation System (PDAS) may address those issues. Specifically, PDAS may include automating the Diagnosis of the repetitive problem and automating the enforcement of preventive measures across the entire network. PDAS automates the Diagnosis of repetitive problems and enforces preventive measures across the entire network.

A Network Intent Cluster (NIC) clones a NI across the network to create a group of NIs (member NIs) with the same design or logic. NIC may be created from a seed NI via no coding process. In PDAS, a subset of Member NIs can be automatically executed according to the user-defined condition based on the member device, the member NI tags, or signature variables.

A Triggered Automation Framework (TAF) matches the incoming API calls from a 3rd party system to current incidents and installs the automation (e.g., NI/NIC) to be triggered for each call. It may include: Integrated IT System defining the scope and data of the incoming API calls; Incident Type to match a call to an Incident; and Triggered Diagnosis to define what and how the NIC/NI is executed.

Reference will now be made in detail to exemplary embodiments of the invention, examples of which are illustrated in the accompanying drawings. When appropriate, the same reference numbers are used throughout the drawings to refer to the same or like parts. The numerous innovative teachings of the present application will be described with particular reference to presently preferred embodiments (by way of example, and not of limitation). The present application describes several inventions, and none of the statements below should be taken as limiting the claims generally.

For simplicity and clarity of illustration, the drawing figures illustrate the general manner of construction, and description and details of well-known features and techniques may be omitted to avoid unnecessarily obscuring the invention. Additionally, elements in the drawing figures are not necessarily drawn to scale, and some areas or elements may be expanded to help improve understanding of embodiments of the invention.

The word 'couple' and similar terms do not necessarily denote direct and immediate connections, but also include connections through intermediate elements or devices. For purposes of convenience and clarity only, directional (up/down, etc.) or motional (forward/back, etc.) terms may be used with respect to the drawings. These and similar directional terms should not be construed to limit the scope in any manner. It will also be understood that other embodiments may be utilized without departing from the scope of the present disclosure, and that the detailed description is not to be taken in a limiting sense, and that elements may be differently positioned, or otherwise noted as in the appended claims without requirements of the written description being required thereto.

The terms "first," "second," "third," "fourth," and the like in the description and the claims, if any, may be used for distinguishing between similar elements and not necessarily for describing a particular sequential or chronological order. It is to be understood that the terms so used are interchangeable. Furthermore, the terms "comprise," "include," "have," and any variations thereof, are intended to cover non-exclusive inclusions, such that a process, method, article, apparatus, or composition that comprises a list of elements is not necessarily limited to those elements, but may include other elements not expressly listed or inherent to such process, method, article, apparatus, or composition.

The aspects of the present disclosure may be described herein in terms of functional block components and various processing steps. It should be appreciated that such functional blocks may be realized by any number of hardware and/or software components configured to perform the specified functions. For example, these aspects may employ various integrated circuit components, e.g., memory elements, processing elements, logic elements, look-up tables, and the like, which may carry out a variety of functions under the control of one or more microprocessors or other control devices.

Similarly, the software elements of the present disclosure may be implemented with any programming or scripting languages such as C, C++, Java, COBOL, assembler, PERL, Python, or the like, with the various algorithms being implemented with any combination of data structures, objects, processes, routines, or other programming elements. Further, it should be noted that the present disclosure may employ any number of conventional techniques for data transmission, signaling, data processing, network control, and the like.

The particular implementations shown and described herein are for explanatory purposes and are not intended to otherwise be limiting in any way. Furthermore, the connecting lines shown in the various figures contained herein are intended to represent exemplary functional relationships and/or physical couplings between the various elements. It should be noted that many alternative or additional functional relationships or physical connections may be present in a practical incentive system implemented in accordance with the disclosure.

As will be appreciated by one of ordinary skill in the art, aspects of the present disclosure may be embodied as a method or a system. Furthermore, these aspects of the present disclosure may take the form of a computer program product on a tangible computer-readable storage medium having computer-readable program-code embodied in the storage medium. Any suitable computer-readable storage medium may be utilized, including hard disks, CD-ROM, optical storage devices, magnetic storage devices, and/or the like. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

As used herein, the terms "user," "network engineer," "network manager," "network developer" and "participant" shall interchangeably refer to any person, entity, organization, machine, hardware, software, or business that accesses and uses the system of the disclosure. Participants in the system may interact with one another either online or offline.

Communication between participants in the system of the present disclosure is accomplished through any suitable communication means, such as, for example, a telephone network, intranet, Internet, extranet, WAN, LAN, personal digital assistant, cellular phone, online communications, off-line communications, wireless network communications, satellite communications, and/or the like. One skilled in the art will also appreciate that, for security reasons, any databases, systems, or components of the present disclosure may consist of any combination of databases or components at a single location or at multiple locations, wherein each database or system includes any of various suitable security features, such as firewalls, access codes, encryption, de-encryption, compression, decompression, and/or the like.

In network troubleshooting, a network engineer may use a set of commands, methods, and tools, either standard or proprietary. For example, these commands, methods, and tools may include the following items:

The Command Line Interface (CLI): network devices often provide CLI commands to check the network status or statistics. For example, in a Cisco IOS switch, the command "show interface" can be used to show the interface status, such as input errors.

Configuration management: a tool used to find differences of configurations of network devices in a certain period. This is important since about half of the network problems are caused by configuration changes.

The term "Object" refers to the term used in computer technology, in the same meaning as "object oriented" programming languages (such as Java, Common Lisp, Python, C++, Objective-C, Smalltalk, Delphi, Java, Swift, C#, Perl, Ruby, and PHP). It is an abstracting computer logic entity that envelops or mimics an entity in the real physical world, usually possessing an interface, data properties and/or methods.

The term "Device" refers to a data object representing a physical computer machine (e.g., printer, router) connected in a network or an object (e.g., computer instances or database instances on a server) created by computer logic functioning in a computer network.

The term "Q-map" or "Qmap" refers to a map of network devices created by the computer technology of NetBrain Technologies, Inc. that uses visual images and graphic drawings to represent the topology of a computer network with interface property and device property displays through a graphical user interface (GUI). Typically, a computer network is created with a map-like structure where a device is represented with a device image and is linked with other devices through straight lines, pointed lines, dashed lines and/or curved lines, depending on their interfaces and connection relationship. Along the lines, also displayed are the various data properties of the device or connection.

The term "Qapp" refers to a built-in or user-defined independently executable script or procedure generated through a graphical user interface as per technology available from NETBRAIN TECHNOLOGIES, INC.

The term "GUI" refers to a graphical user interface and includes a visual paradigm that offers users a plethora of choices. GUI paradigm or operation relies on windows, icons, mouse, pointers, and scrollbars to display the set of available files and applications graphically. In a GUI-based system, a network structure may be represented with graphic features (icons, lines and menus) that represent corresponding features in a physical network in a map. The map system may be referred to as a Qmap and is further described with respect to U.S. Pat. Nos. 8,386,593, 8,325,720, and 8,386,937, the entire disclosure of each of which is hereby incorporated by reference. After a procedure is created, it can be run in connection with any network system. Troubleshooting with a proposed solution may just take a few minutes instead of hours or days traditionally. The troubleshooting and network management automation may be with the mapping of the network along with the NETBRAIN QAPP (Qapp) system. The Qapp system is further described with respect to U.S. Pat. Nos. 9,374,278, 9,438,481, U.S. Pat. Pub. No. 2015/0156077, U.S. Pat. Pub. No. 2016/0359687, and U.S. Pat. Pub. No. 2016/0359688, the entire disclosure of each of which is hereby incorporated by reference.

The term "Step" refers to a single independently executable computer action represented by a GUI element, that obtains, or causes, a network result from, or in, a computer network; a Step can take a form of a Qapp, a system function, or a block of plain text describing an external action to be executed manually by a user, such as a suggestion of action, "go check the cable." Each Step is thus operable and re-usable by a GUI operation, such as mouse curser drag-and-drop or a mouse click.

FIG. 1 illustrates a block diagram of an example network system 100. The system 100 may include functionality for managing network devices with a network manager 112. The network system 100 may include one or more networks 104, which includes any number of network devices (not shown) that are managed. The network(s) 104 devices may be any computing or network device, which belongs to network 104, such as a data center or enterprise network. Examples of devices include, but are not limited to, routers, access points, databases, printers, mobile devices, personal computers, personal digital assistants ("PDA"), cellular phones, tablets, other electronic devices, or any network devices. The devices in the network 104 may be managed by the network manager 112.

The network manager 112 may be a computing device for monitoring or managing devices in a network, including performing automation tasks for the management, including network intent analysis and adaptive monitoring automation. In other embodiments, the network manager 112 may be referred to as a network intent analyzer or adaptive monitor for a user 102. The network manager 112 may include a processor 120, a memory 118, software 116 and a user interface 114. In alternative embodiments, the network manager 112 may be multiple devices to provide different functions, and it may or may not include all of the user interface 114, the software 116, the memory 118, and/or the processor 120.

The user interface 114 may be a user input device or a display. The user interface 114 may include a keyboard, keypad, or cursor control device, such as a mouse, joystick, touch screen display, remote control, or any other device operative to allow a user or administrator to interact with the network manager 112. The user interface 114 may communicate with any of the network devices in the network 104, and/or the network manager 112. The user interface 114 may include a user interface configured to allow a user and/or an administrator to interact with any of the components of the network manager 112. The user interface 114 may include a display coupled with the processor 120 and configured to display output from the processor 120. The display (not shown) may be a liquid crystal display (LCD), an organic light emitting diode (OLED), a flat panel display, a solid state display, a cathode ray tube (CRT), a projector, a printer or other now known or later developed display device for outputting determined information. The display may act as an interface for the user to see the functioning of the processor 120, or as an interface with the software 116 for providing data.

The processor 120 in the network manager 112 may include a central processing unit (CPU), a graphics processing unit (GPU), a digital signal processor (DSP), or other types of processing devices. The processor 120 may be a component in any one of a variety of systems. For example, the processor 120 may be part of a standard personal computer or a workstation. The processor 120 may be one or more general processors, digital signal processors, application specific integrated circuits, field programmable gate arrays, servers, networks, digital circuits, analog circuits, combinations thereof, or other now known or later developed devices for analyzing and processing data. The processor 120 may operate in conjunction with a software program (i.e., software 116), such as code generated manually (i.e., programmed). The software 116 may include the Data View system and tasks that are performed as part of the management of the network 104, including the generation and usage of Data View functionality. Specifically, the Data View may be implemented from software, such as the software 116.

The processor 120 may be coupled with the memory 118, or the memory 118 may be a separate component. The software 116 may be stored in the memory 118. The memory 118 may include, but is not limited to, computer readable storage media such as various types of volatile and non-volatile storage media, including random access memory, read-only memory, programmable read-only memory, electrically programmable read-only memory, electrically erasable read-only memory, flash memory, magnetic tape or disk, optical media and the like. The memory 118 may include a random access memory for the processor 120. Alternatively, the memory 118 may be separate from the processor 120, such as a cache memory of a processor, the system memory, or other memory. The memory 118 may be an external storage device or database for storing recorded tracking data, or an analysis of the data. Examples include a hard drive, compact disc ("CD"), digital video disc ("DVD"), memory card, memory stick, floppy disc, universal serial bus ("USB") memory device, or any other device operative to store data. The memory 118 is operable to store instructions executable by the processor 120.

The functions, acts or tasks illustrated in the figures or described herein may be performed by the programmed processor executing the instructions stored in the software 116 or the memory 118. The functions, acts or tasks are independent of the particular type of instruction set, storage media, processor or processing strategy and may be performed by software, hardware, integrated circuits, firmware, micro-code and the like, operating alone or in combination. Likewise, processing strategies may include multiprocessing, multitasking, parallel processing and the like. The processor 120 is configured to execute the software 116.

The present disclosure contemplates a computer-readable medium that includes instructions or receives and executes instructions responsive to a propagated signal, so that a device connected to a network can communicate voice, video, audio, images or any other data over a network. The user interface 114 may be used to provide the instructions over the network via a communication port. The communication port may be created in software or may be a physical connection in hardware. The communication port may be configured to connect with a network, external media, display, or any other components in system 100, or combinations thereof. The connection with the network may be a physical connection, such as a wired Ethernet connection or may be established wirelessly, as discussed below. Likewise, the connections with other components of the system 100 may be physical connections or may be established wirelessly.

Any of the components in the system 100 may be coupled with one another through a (computer) network, including but not limited to one or more network(s) 104. For example, the network manager 112 may be coupled with the devices in the network 104 through a network or the network manager 112 may be a part of the network 104. Accordingly, any of the components in the system 100 may include communication ports configured to connect with a network. The network or networks that may connect any of the components in the system 100 to enable data communication between the devices may include wired networks, wireless networks, or combinations thereof. The wireless network may be a cellular telephone network, a network operating according to a standardized protocol such as IEEE 802.11, 802.16, 802.20, published by the Institute of Electrical and Electronics Engineers, Inc., or WiMax network. Further, the network(s) may be a public network, such as the Internet, a private network, such as an intranet, or combinations thereof, and may utilize a variety of networking protocols now available or later developed including, but not limited to TCP/IP based networking protocols. The network(s) may include one or more of a local area network (LAN), a wide area network (WAN), a direct connection such as through a Universal Serial Bus (USB) port, and the like, and may include the set of interconnected networks that make up the Internet. The network(s) may include any communication method or employ any form of machine-readable media for communicating information from one device to another.

The network manager 112 may act as the operating system (OS) of the entire network 104. The network manager 112 provides automation for the users 102, including automated documentation, automated troubleshooting, automated change, and automated network defense. In one embodiment, the users 102 may refer to network engineers who have a basic understanding of networking technologies, are skilled in operating a network via a device command line interface, and are able to interpret a CLI output. The users 102 may rely on the network manager 112 for controlling the network 104, such as with network intent analysis functionality or for adaptive monitoring automation.

Figure 2:
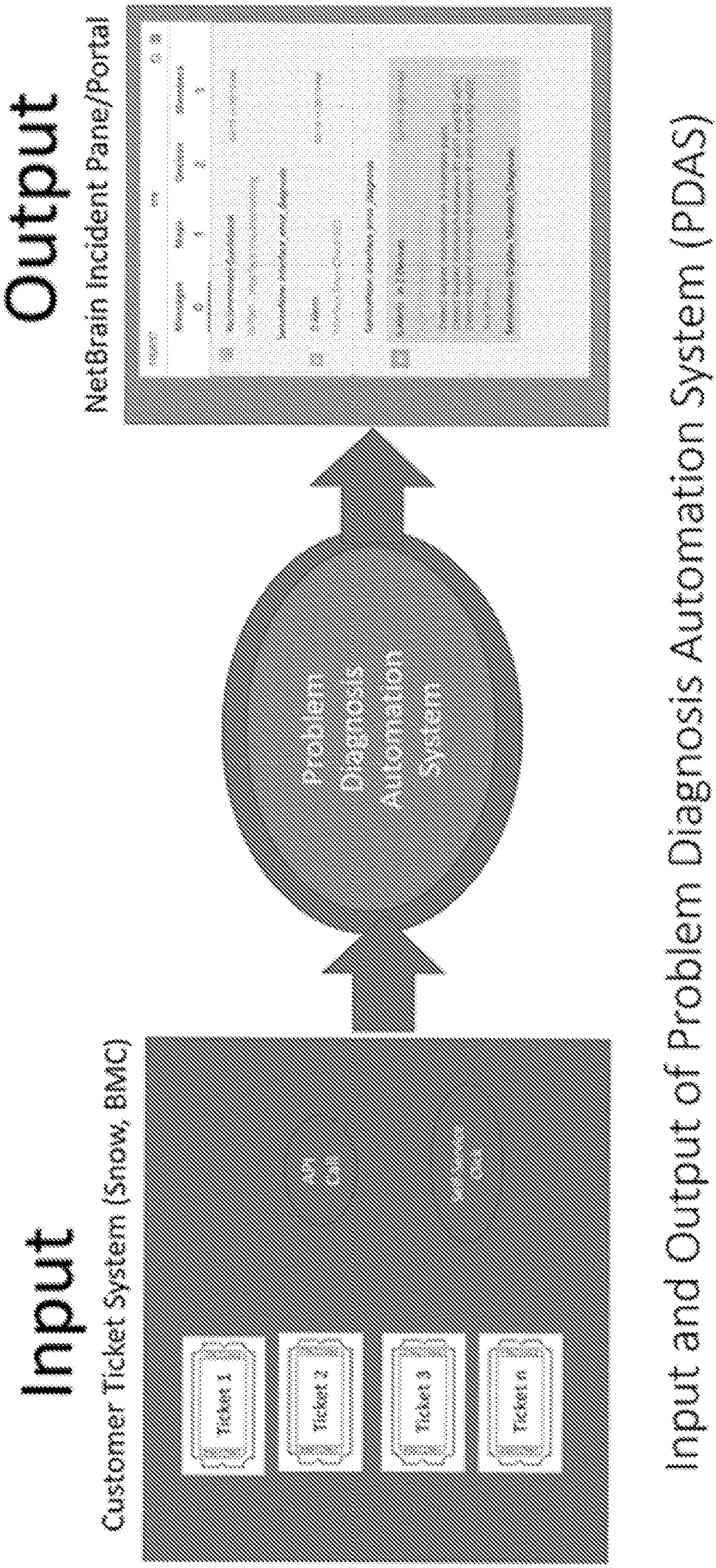
FIG. 2 illustrates the input and output of Problem Diagnosis Automation System (PDAS).

FIG. 2 illustrates the input and output of Problem Diagnosis Automation System (PDAS). PDAS may include automating the Diagnosis of the repetitive problem and automating the enforcement of preventive measures across the entire network. PDAS automates the Diagnosis of repetitive problems and enforces preventive measures across the entire network. FIG. 2 shows, from the end user's perspective, the output of PDAs is an Incident Pane/Portal, a central collaboration platform for troubleshooting and data sharing for each problem. The input is various tickets provided by customers indicating a network problem/issue. The Network Manager 112 from FIG. 1 may be the PDAS system.

Figure 3:
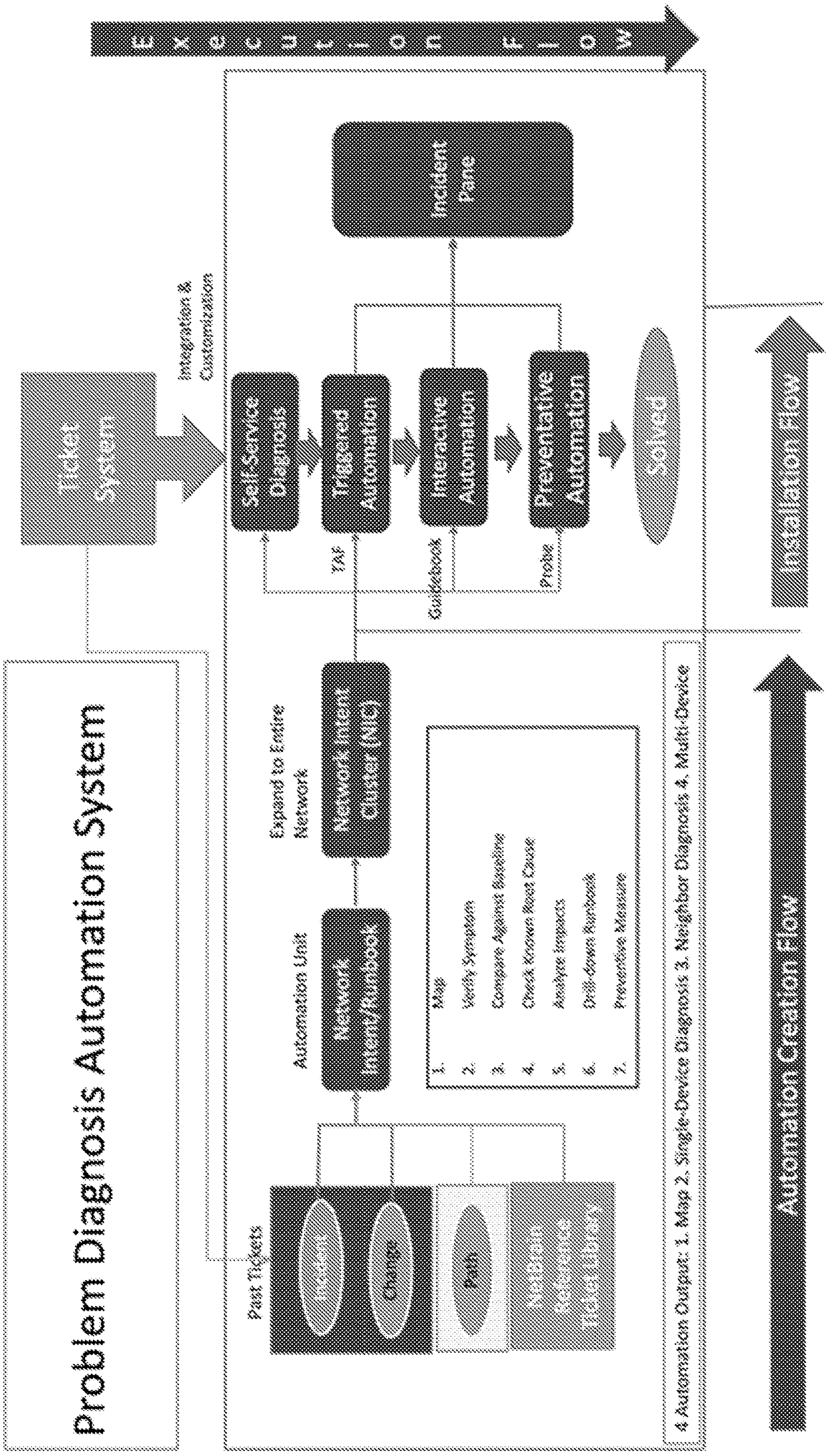
FIG. 3 illustrates a flow of Problem Diagnosis Automation System (PDAS).

FIG. 3 illustrates a flow of Problem Diagnosis Automation System (PDAS). In one embodiment, the underlying system may have multiple example flows, including:

- Automation Creation Flow: where diagnosis know-how is turned into automation assets across the entire network in the form of Network Intent (NI) or Executable Runbook (RB) inside the no-code platform.
- Automation Installation Flow: where various automation assets are connected to future problem diagnosis through Triggers from the ticket system, human interaction, or an adaptive monitoring system.
- Automation Execution Flow—where automation is executed in response to an external symptom in three successive methods, namely triggered, interactive, and preventive. All execution output is organized inside the NetBrain incident pane for each distinctive Incident.

Along with the flows in FIG. 2, the following functions may be included:

- Network Intent Cluster (NIC): NIC may clone a Network Intent (NI), a seed NI, across the entire network to create a group of NIs (member NIs) with the same design or logic. NIC may be created from the seed NI. In PDAS, a subset of Member NIs may be automatically executed according to the user-defined condition based on the member device, the member NI tags, or signature variables.
- Triggered Automation Framework (TAF): TAF may match incoming API calls from a 3rd party system to the Incidents and installs the automation (NI/NIC) to be triggered for each call. In some embodiments, it has three components: Integrated IT System defining the scope and data of the incoming API calls, Incident Type to match a call to an Incident, and Triggered Diagnosis to define what and how the NIC/NI is executed.
- Incident Pane: as the output of PDAS, Incident Pane provides detailed data and diagnosis history, including NI diagnosis results (from TAF, Probe, manually run), the status codes of Adaptive Monitoring data, and recommended diagnoses.

Triggered Automation: Automate First Response

Figure 4:
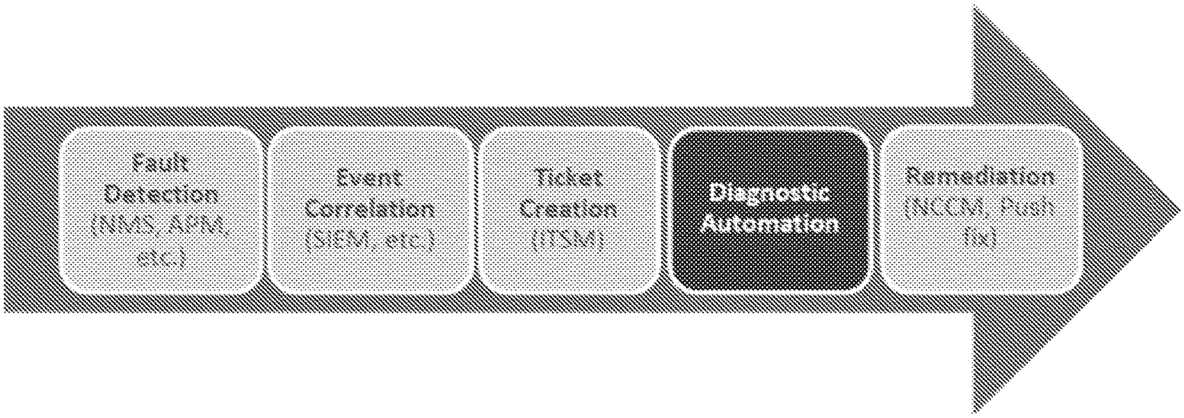
FIG. 4 illustrates triggered automation systems architecture.

FIG. 4 illustrates triggered automation systems architecture. Automation can augment the Detect phase in two ways: 1. automatically gather additional telemetry to help problem classification and diagnosis, and 2. reduce transition delays between the Detect and Identify stages. Automation may be designed to augment people. Rather than sequentially parsing through the CLI outputs of every piece of network equipment in an affected segment, the engineer leverages pre-built operational runbooks that retrieve contextual diagnostic data from every device at the click of a button. This helps provide repeatable and predictable outcomes, ensures that relevant data is accurately retrieved, and dramatically reduces the diagnostic process's time.

The diagnostics may be scalable. Once the first engineer responds to an incident and begins the initial triage and investigation, the priority is to obtain the correct data quickly and perform accurate, efficient analysis, typically involving manual digging through CLI. The goal is to accelerate this diagnosis using automation. Knowing what data to get, retrieving it rapidly, and leveraging expert know-how to analyze it is required. Automation may also provide enhanced data analytic functions to enable activities such as historical data comparisons to know "what has changed" or baseline analysis to understand "is this normal." When combined with live data, an engineer can obtain the correct data and use these comparisons of past, current, and ideal network conditions to perform the analysis much faster. The first level of support can resolve some issues, but many problems require escalation. Collaboration may fail during incident response, with data not adequately conveyed to the next-level engineer or diagnostics not captured and saved. The escalation engineer may duplicate the work of the first engineer before moving on to more advanced diagnostics. A network automation solution should record the collected diagnostics and troubleshooting notes of every person assigned to the ticket so everyone working on the problem has the same data. When it comes to the fix, the goal is to push out the change safely and verify that the fix resolves the issue. A well-designed change automation system ensures the fix is successful. The solution automates the full mitigation sequence, including change deployment, before and after quality assurance, and validation that the problem has cleared. The network management automation embodiments may ensure that mitigation is safely executed, no additional harm has occurred, and reliable post-fix verification is performed.

To see continual improvement over time requires more issues to be near-instantly diagnosed with the root cause identified. In other words, the automation strategy should focus on moving increasingly more issues to near-zero time to a resolution until you can resolve practically every ticket with automation. As more problems occur with proper postmortem reviews, a NetOps team would classify recurring issue types into a "known problem" category and develop operational runbooks for these problems.

As more known problem operational runbooks are fed to the machine, more known issues will have fully automated diagnoses. This process continuously pushes MTTR lower. With proactive automation, we convert lessons learned into repeatable and executable diagnostic automation tasks. More than just documenting that lesson, the goal is to implement an automated diagnostic that checks for this problem the next time there is a similar incident.

Figure 5:
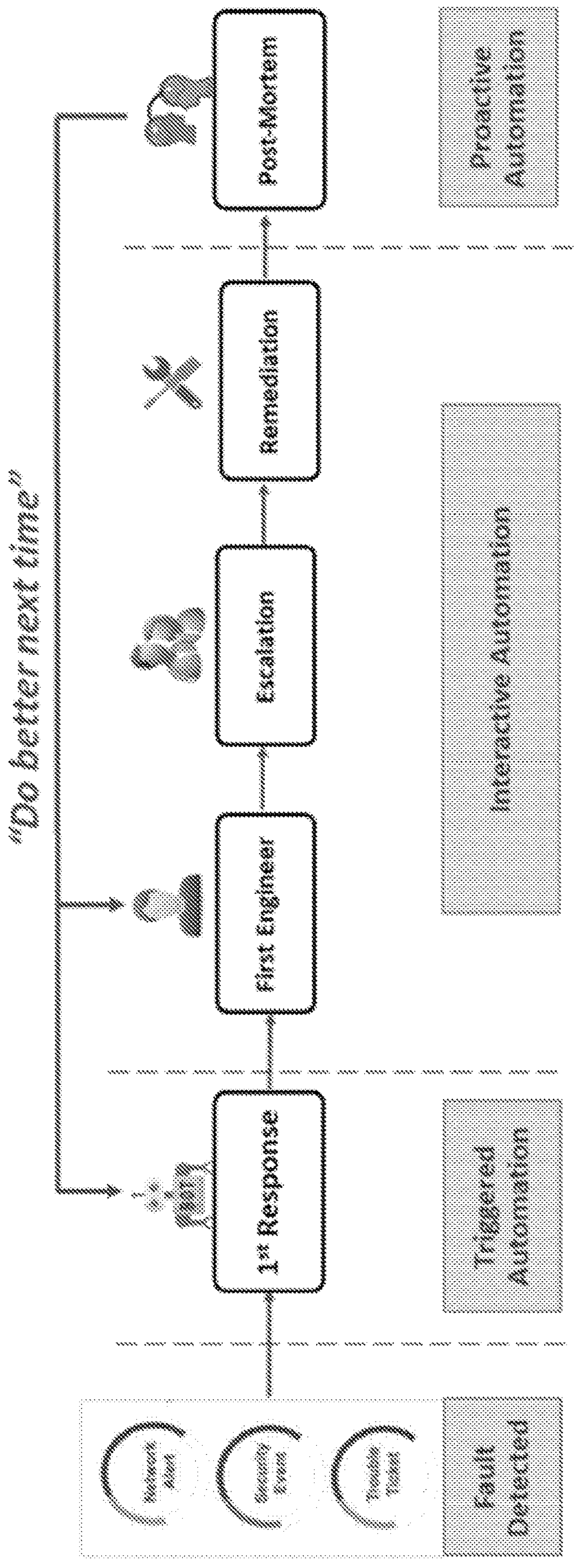
FIG. 5 illustrates another example of network management flow.

FIG. 5 illustrates another example network management flow. Automation may include:

- Triggered automation—occurring the moment an incident is detected.
- Interactive automation—to assist network engineers in their diagnoses.
- Proactive automation—to make the incident response more effective in the future.

When a fault occurs within the network, the first challenge is the resulting idle time. If the ticket sits unworked, and in the case of intermittent issues, potential diagnostic data may even clear before an investigation can begin. Automation augments this process and initiates the diagnosis of the event. Triggered automation closes the gap between the detection of the fault and the action of investigating. For triggered automation to be successful, full network management workflow integration may be used. A network's event detection system or ITSM must communicate with the NetOps automation system to trigger an automatic diagnosis.

There are times when knowledge should be fed back into the automation platform, but two examples are operational handoff and following an incident. Operational Handoff is when a team has implemented a new network design (e.g., MPLS). A consistent, easy-to-follow method for documenting operational procedures related to new designs or new technology is required to ensure that everyone on the team knows how to troubleshoot the new environment. Building an operational runbook for the new design may be part of the handoff from the architect to the operator. Following an Incident means that the team may get together for a post-mortem review after resolving an incident. The goal is to do better next time. This feedback process creates a closed-loop mechanism for continual improvement, capturing knowledge at these two critical and ordinary moments. Combining knowledge management with no-code runbook automation leads to the automated resolution of every ticket and can achieve continuous MTTR reduction over time. This feedback mechanism may be referred to as Proactive Automation.

Automation Platform

Figure 6:
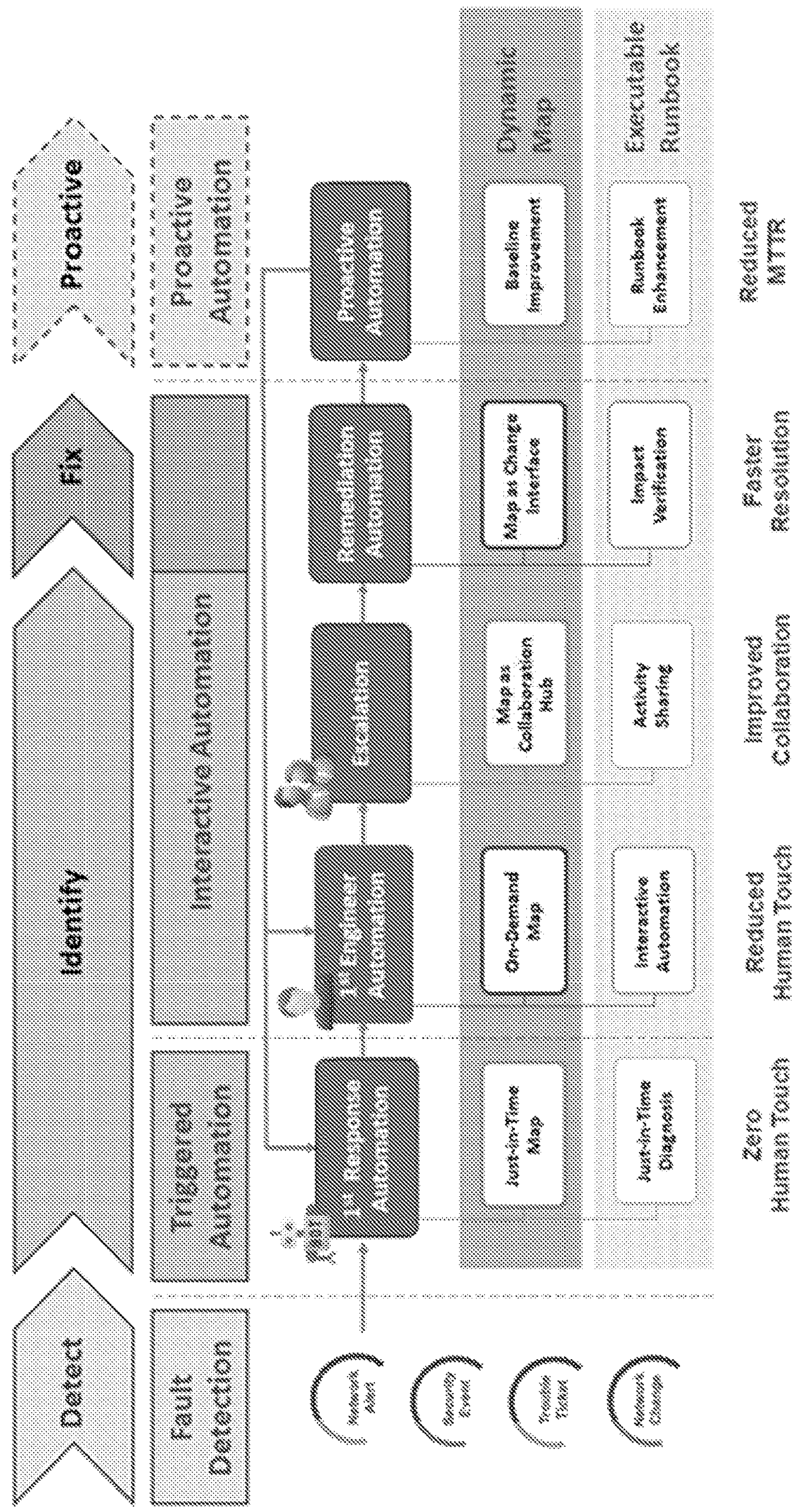
FIG. 6 illustrates an example incident response framework with automation for each stage.

FIG. 6 illustrates an example incident response framework with automation for each stage. In some embodiments, the automation platform utilizes two automation technologies—Dynamic Maps and Executable Runbooks. To build the model, the network management system performs an automated in-depth discovery of the network's control plane logic, which serves as the foundation for the automation. A neighbor-walking algorithm leverages CLI automation, SNMP, and APIs to decode thousands of data variables per device, creating a "digital twin" of the network. This discovery process populates the automation database, enabling data visualization via a Dynamic Map and providing repeatable automation with Executable Runbooks. The automation platform automates the resolution of every ticket and for delivering advanced knowledge management with the following functions:

- Management network abstraction with creating the network's "digital twin" and a conceptual management network fabric.
- Dynamic network mapping for real-time visualization and as the user interface for automation.
- Runbook automation for rapid diagnostics and analysis of network events without any coding.
- Integration with existing ecosystem tools for end-to-end analysis on one map.
- Event-triggered automation for an instant, automated diagnostics and mapping of the problem.
- Centralized elastic knowledge base for codified know-how to shift knowledge to the left.

Automation may have two types of users: consumers and creators of executable knowledge. This solves the challenges of resolving network tickets and maintaining a network, as shown in the following example network incident. The network's monitoring systems have detected a low video quality issue between the Boston and New York site locations. The network team's application performance monitor notifies their ITSM system and generates a new trouble ticket. Here, workflow integration comes into play. The network management system provides a mechanism to integrate with ITSM systems, which enables (1) creating a contextual Dynamic Map of the problem area at the time of ticket creation, and (2) enriches the trouble ticket with diagnostic data obtained from Executable Runbooks at the time of the event-Just in Time Automation. In the example video quality incident, the Dynamic Map visualizes relevant data about the network-topology data, configuration, and design data, baseline data across thousands of data points, and even data from integrated third-party solutions. This map provides instant visualizations of the problem area. Triggered automation has now occurred, and valuable data has been automatically gathered at the start of the event using an Executable Runbook. A first response engineer may have reviewed these automated diagnostics. The data retrieved includes essential device health, QoS parameters, access-control lists, and other relevant collected logs. What used to be a manual effort is now a zero-touch mechanism, ensuring that every ticket is enriched with a contextual map and diagnostic data.

The root cause can then be determined in the poor video quality issue. The engineer has reviewed the map of the problem and the collected diagnostics but still needs to drill down further to determine the root cause. To aid in the diagnosis, the scalability of the automation platform may be used. Additional diagnostics or more advanced design reviews may be needed to determine the root cause. The engineer now leverages the automated drill-down capabilities of the network management automation platform to do further analysis and historical comparisons and compare this data with previous baselines. The know-how and operational procedures from previous incident responses by the network management team may be converted into Executable Runbooks and allows large swaths of contextual data to be pulled, parsed, analyzed, and displayed on the console at the push of a button by an engineer on the team, no matter their experience.

In the low video quality example, the network management team has identified the issue to be a misconfigured QoS parameter on a router. The misconfiguration has been successfully remediated with a configuration fix using the network management automation platform. By adding this issue to the list of known problems, the team ensures that they can identify and remediate the problems much faster if it happens again. With the network management automation platform, the additional diagnostic commands used to resolve the issue are added to the existing Executable Runbook automatically to enrich the Runbook without requiring any coding. Should the event reoccur, the system will trigger an automated diagnosis using the updated Runbook. The root cause will be determined instantly, with a near-zero Time to Repair this repeat occurrence. This process also helps to rule out possible known issues in unrelated incidents automatically. It creates a "virtuous cycle"—the more known problems and scenarios for which an Executable Runbook is built, the further MTTR is reduced.

Intent-Based Automation

Dynamic Mapping and Executable Runbook are used for automating network troubleshooting. The Runbook digitalizes the troubleshooting procedure and can be executed anywhere by anyone after writing once. There exist vast amounts of troubleshooting playbooks by network device vendors. Enterprise also creates many best-practice playbooks to troubleshoot problems common to its unique network. Executable Runbook can codify these playbooks. However, one difficulty in codifying these runbooks is that they try to solve a common problem and require coding skills. Some Runbooks can be complicated with many forks depending on human decisions making them hard to execute in the backend processes without human intervention. Since Runbook is a template-based solution designed to solve a common problem for many networks, it may not contain the baseline data for a specific network, which is the most useful info while troubleshooting.

Accordingly, Network Intention (NI) can be used to solve these issues. NI is an Automation Unit that can represent an actual network design (with Baseline) and include the logic to diagnose the intent deviation and replicate diagnosis logic across the entire network (with Network Intent Cluster technology). NI is a network-based solution with an executable automation element to document and verify a network design. In an ideal network, all NIs should not be violated. NIs can be monitored proactively, and the system should send an alert for an NI violation. The NI system may include the following components:

- Network Intention Management: a subsystem to define, manage and manually execute NI.
- Network Intent Cluster (NIC): a subsystem to automatically create NIs and is further described below.
- Adaptive Monitoring Automation: a backend process to periodically poll the whole network's status via Flash Probe. When a flash alert occurs, further execute the triggered automation, such as Network Intent.
- Preventive Automation Dashboard: a view to present Flash Probe's results with the Flash Alert and associated triggered automation.

Figure 7:
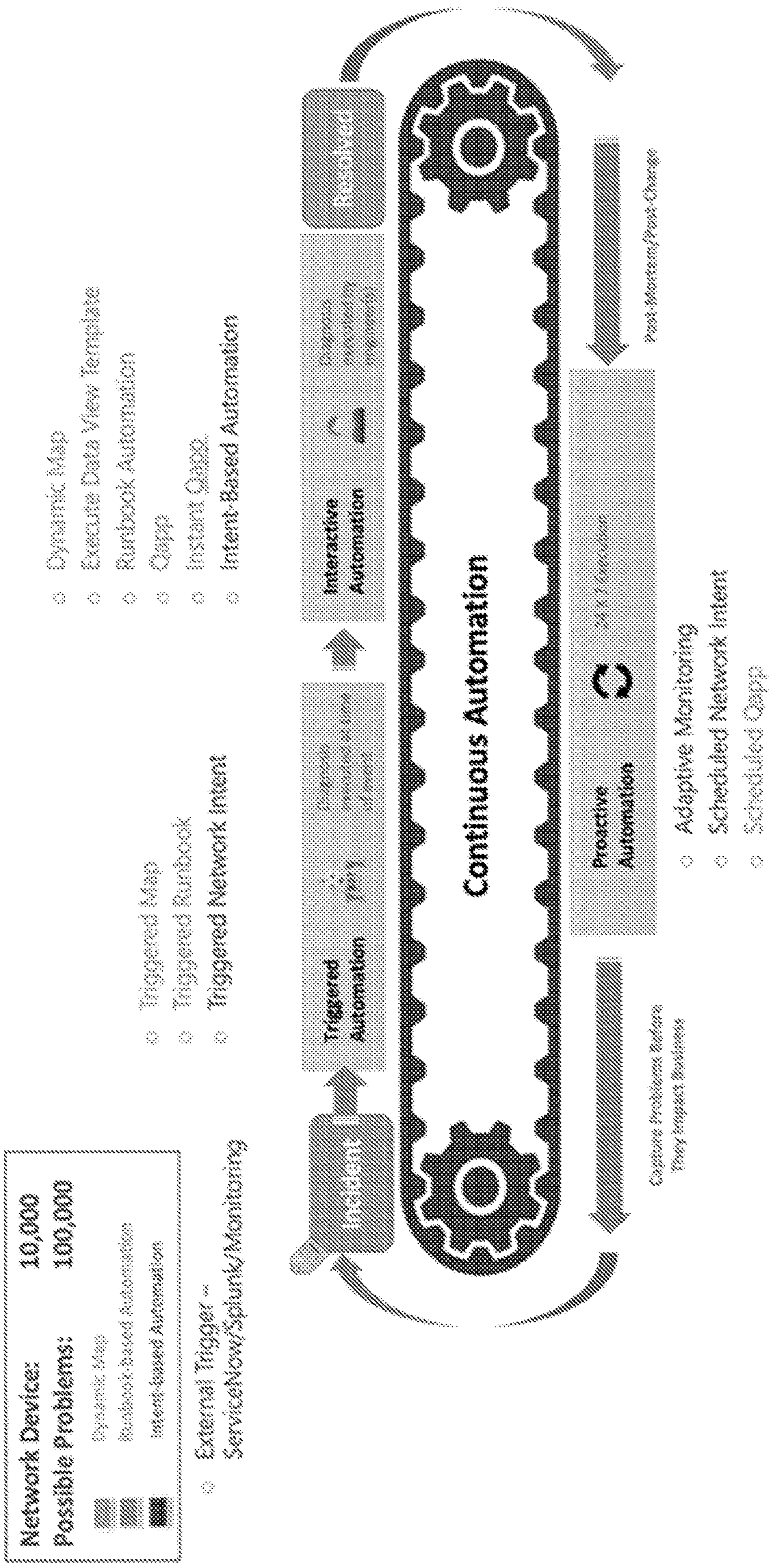
FIG. 7 illustrates an example network intent system with continuous automation.

FIG. 7 illustrates an example network intent system with continuous automation. Network Intent (NI) describes a network design for a specific network device, what these design baselines are like, and how to verify the design works properly. The baseline may be when the network is working well. This baseline configuration is a normal condition, providing a way to document network design and allowing other engineers to quickly understand the device's design and baseline or normal state of a particular device. It also provides a way to verify network design. When a network problem occurs, one or multiple NIs are violated. In the postmortem stage of this problem, the violated NIs are coded and automatically monitored. The next time a similar situation occurs, it can be automatically or manually solved in a few minutes and reduce MTTR.

NI may be used in a preventative use case. There may not be problems, but periodic checkups ensure the network runs normally. In another example, when there are problems (e.g., the application is down-ticket system), tests may need to be run, so the automation automates the testing for why the application is down. It may be NI is violated.

Network Intent Cluster (NIC)

NIC expands Network Intent (NI) scope from a specific network design to one type of network design with similar diagnosis logic. A large network can have millions of NIs, and it may be time-consuming to add these NIs manually. The NIC system can discover and create these NIs automatically.

While NI effectively documents and validates a network design, it may apply to at least one network device or a set of devices at a time. Therefore, it can take many repetitive efforts to create NIs for a large network. NIC may be designed to expand the logic of a NI (seed NI) from one or a set of devices to the whole network. Furthermore, NIC may be triggered to run in the Triggered Automation Framework (TAF), and its results can significantly reduce the MTTR. NIC may not require coding skills and provides an intuitive user interface for creating and debugging. For example, a NI may monitor whether a failover occurs between a pair of network devices (the failover may cause performance issues such as slow applications). Upon identification, NIC can replicate the logic to all other pairs of network devices in the network without any coding.

Figure 8:
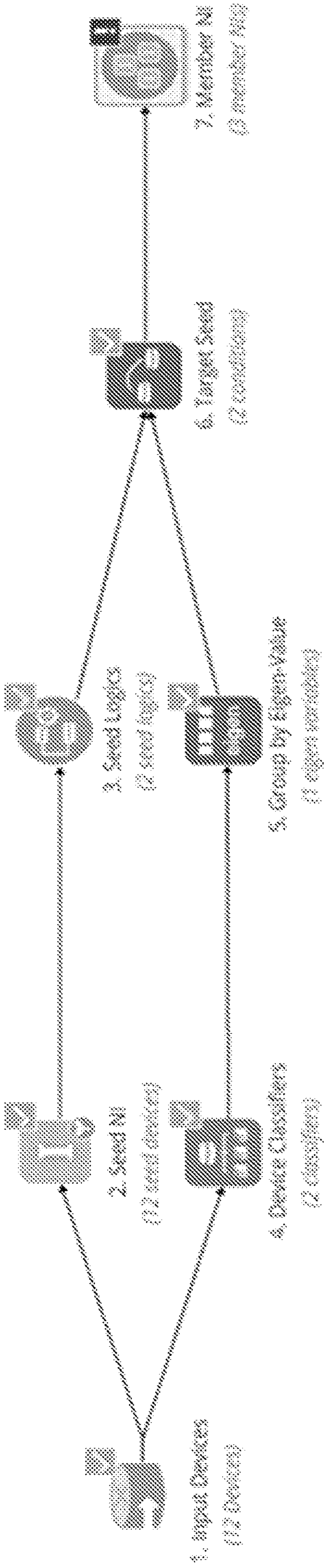
FIG. 8 illustrates an example no-code process for Network Intent Cluster (NIC).

FIG. 8 illustrates an example no-code process for Network Intent Cluster (NIC). NIC may include a group of NIs (member NI) cloned from Seed NI via a no-code process, such as the process illustrated in FIG. 8, which is a 7-step process. A NIC may have thousands of Member NIs, corresponding to a specific network diagnosis. A subset of Member NIs can be selected to execute according to the user-defined matching logic based on: 1) devices inside the member NI (member device); 2) unique tags for each Member NI; or 3) signature variables assigned to Member NI.

Figure 9:
FIG. 9 illustrates an example screen for a Network Intent Cluster (NIC) process.

FIG. 9 illustrates an example screen for a Network Intent Cluster (NIC) process. FIG. 9 illustrates a display of the devices (HSRP) for a sample NIC to clone a seed NI to check the device (HSRP) running status for a network site. By creating a NIC to achieve this, the Diagnosis process may be expanded to an entire network. Each Member NI may have its tag and signature variable, the virtual IP address of HSRP.

Referring back to FIG. 8, the example seven steps for the NIC creation are now described below.

Step 1: Define Device Input

Figure 10A:
FIG. 10*a* illustrates a selection screen for selecting where to expand the Network Intent (NI).

The first step shown in the example process of FIG. 8 is defining device input. The defined devices are those for which a user wants to expand the NI. It can be a site, the whole network, or a group of devices. This example may expand the logic to a specific type of device. FIG. 10*a* illustrates a selection screen for selecting where to expand the Network Intent (NI). Therefore, the selection of Cisco routers and IOS switches in the domain of FIG. 10*a* sets the input devices. In this example, there is no selection of specific devices, but it can be filtered with types.

This step may be referred to as an Input Devices node. In the Input Devices node, users select the devices to expand the NI. There may be at least three ways to choose devices: 1) Select Sites: Select all devices of this site; 2) Select Device Groups: select all devices of this device group; or 3) Select Devices: select devices manually. Sites and Device Group may help deal with dynamic devices.

Figure 10B:
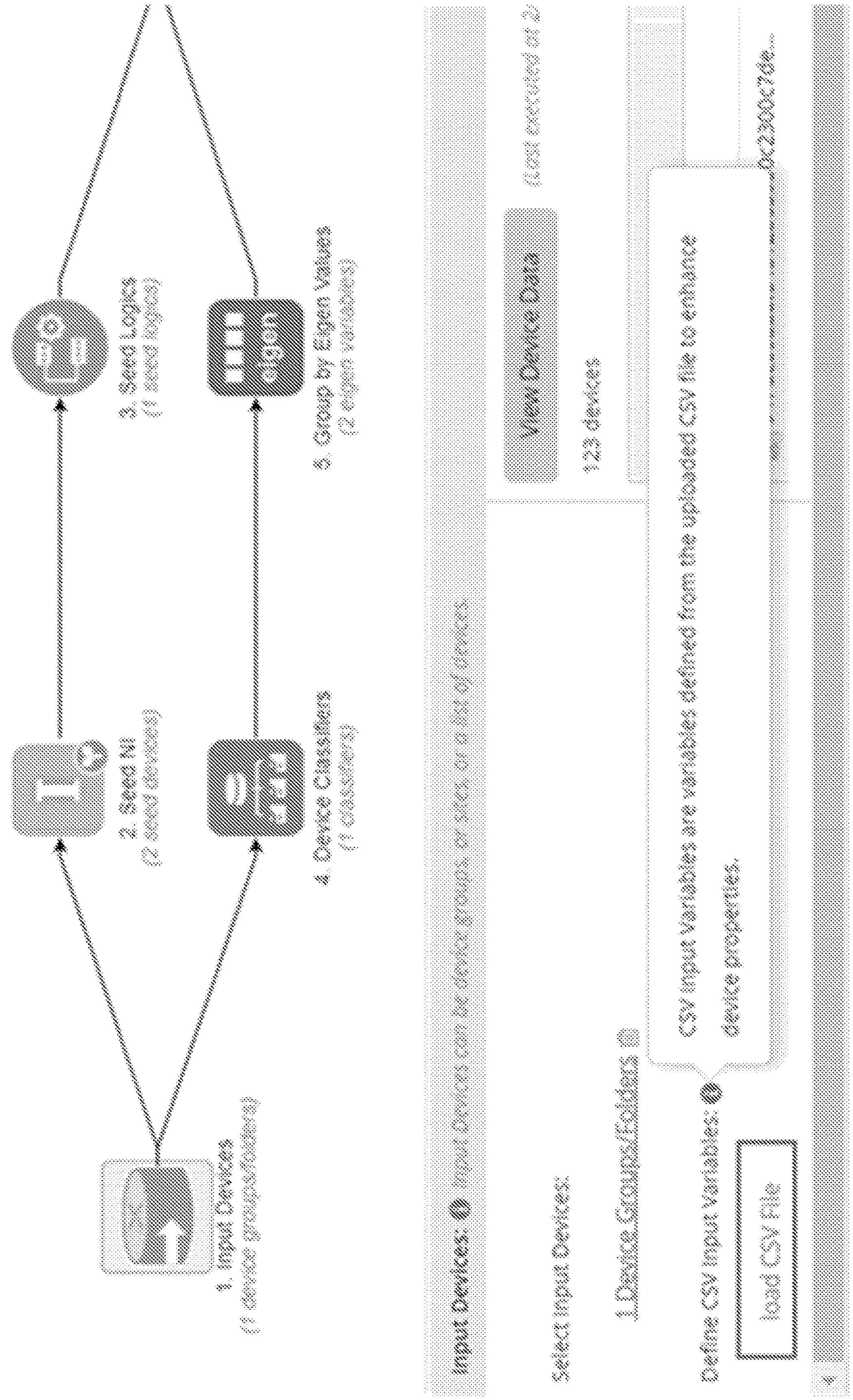
FIG. 10*b* illustrates a selection screen for defining device inputs from a file.

FIG. 10*b* illustrates a selection screen for defining device inputs from a file. Users can load a CSV File to import the variables to enhance the device properties and/or the interface-related data. The CSV Input Variables may be used in the following functions (described below):

- Eigen Variable Identification: The CSV input variables can be selected to define Eigen Variable to divide devices into different Eigen groups for NI creation (step 5).
- Target Seed Logic: CSV input variables can be used in the Target Seed condition (step 6).
- Macro Variable: A user may want to pass the device property to NI via Macro Variable, and you can use the CSV Input variable to achieve this (step 7).

Step 2: Select Seed Network Intent (NI)

Figure 11A:
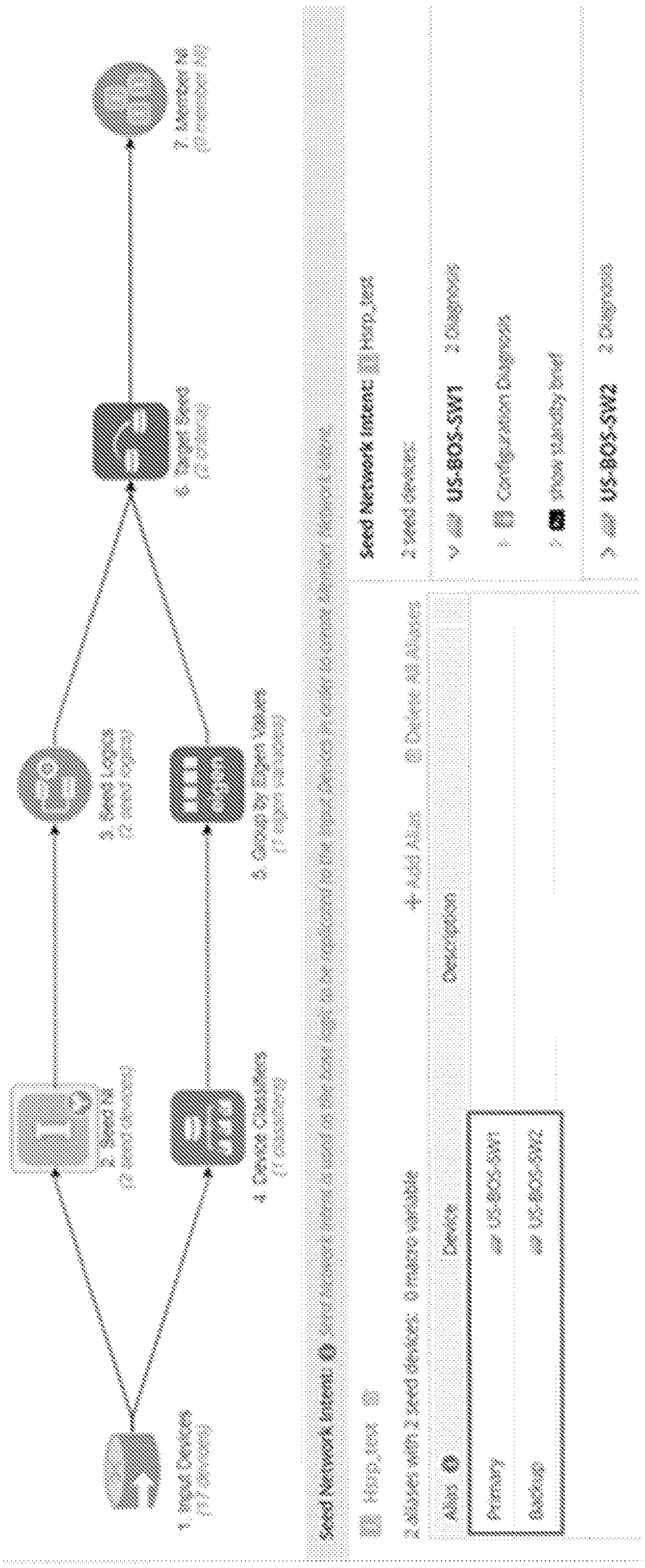
FIG. 11*a* illustrates a selection screen for selecting seed Network Intent (NI).

The second step shown in the example process of FIG. 8 is selecting seed NI. A seed NI node defines which NI is used to duplicate the diagnosis logic. After a NI is selected, the NI devices will be listed as the seed device(s). FIG. 11*a* illustrates a selection screen for selecting seed Network Intent (NI). The interface allows for creating a meaningful alias as shown in FIG. 11*a* and the Table below. In this example, a user selects NI to check the pair of HSRP Cisco devices whether the configurations change against the baseline and their HSRP status (active/standby) changes via the CLI command. The diagnosis logic may include a device configuration file and CLI command check against baseline data, as shown in the following table:

TABLE 1

| Diagnosis logic | | |
|---|---|---|
| Alias | Device | Diagnosis Logic |
| Primary | US-BOS-SW1 | Config: compare HSRP config against the baseline.<br>CLI: show standby, compare HSRP status against the baseline. |
| Backup | US-BOS-SW2 | Config: compare HSRP config against the baseline.<br>CLI: show standby, compare HSRP status against the baseline. |

Figure 11B:
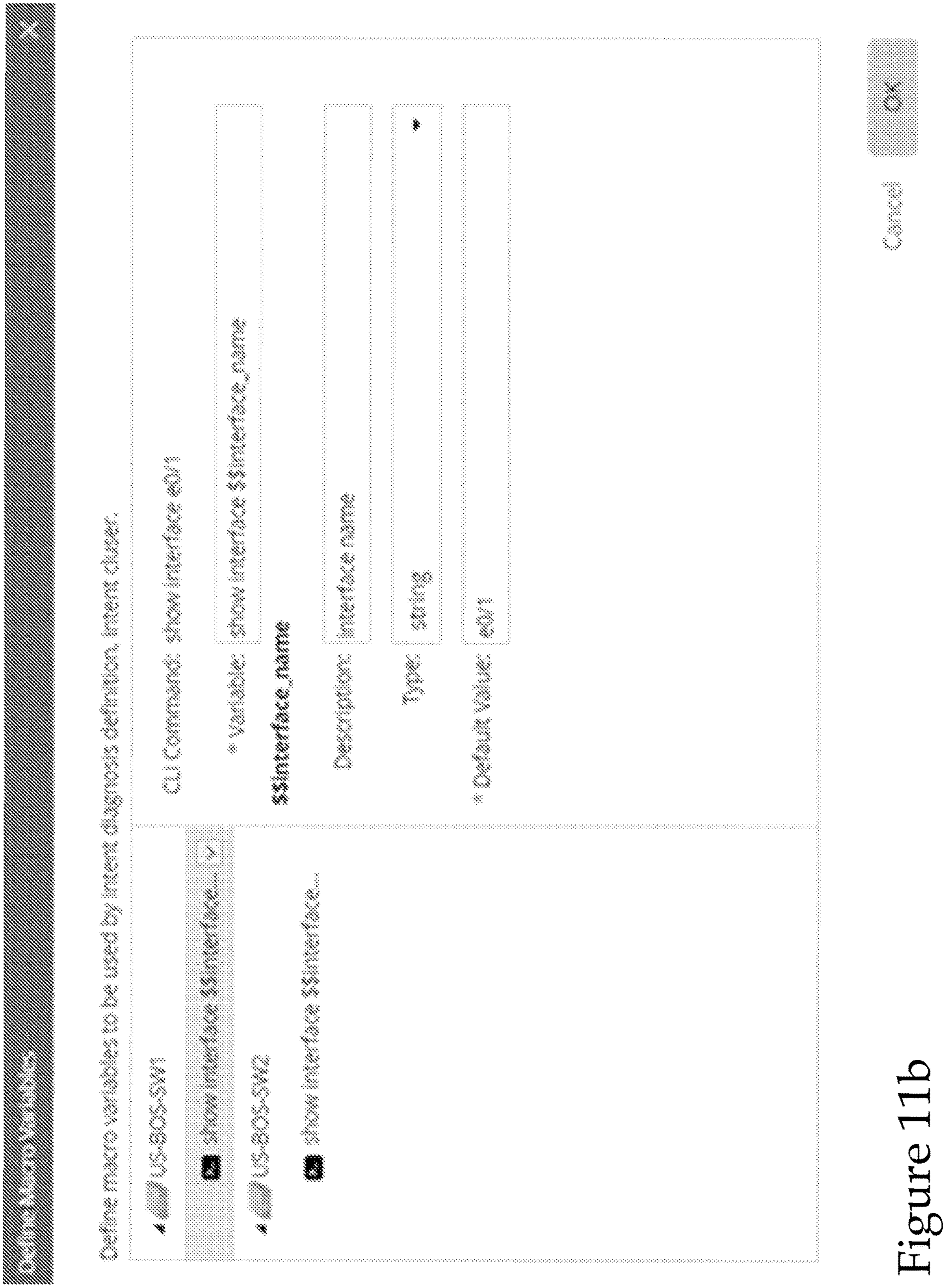
FIG. 11*b* illustrates a screen for defining macro variables.

A Seed NI node may select a NI to expand the logic. The seed devices may have default alias, D1, D2, etc. Users can change the alias to an intuitive name, such as this device and neighbor device. In some embodiments, one NI can be selected for a NIC. The seed NI may support macro variables. For example, users can create a NI to check the MTU mismatch between two specific neighbor interfaces using the CLI command show interface e0/0. FIG. 11*b* illustrates a screen for defining macro variables. While replicating this NI to all neighbor interfaces of a network, the system needs to replace the interface name e0/0 with the interface name of the member device. The Macro Variables are defined for this purpose.

Step 3: Select Seed Logic

Figure 12A:
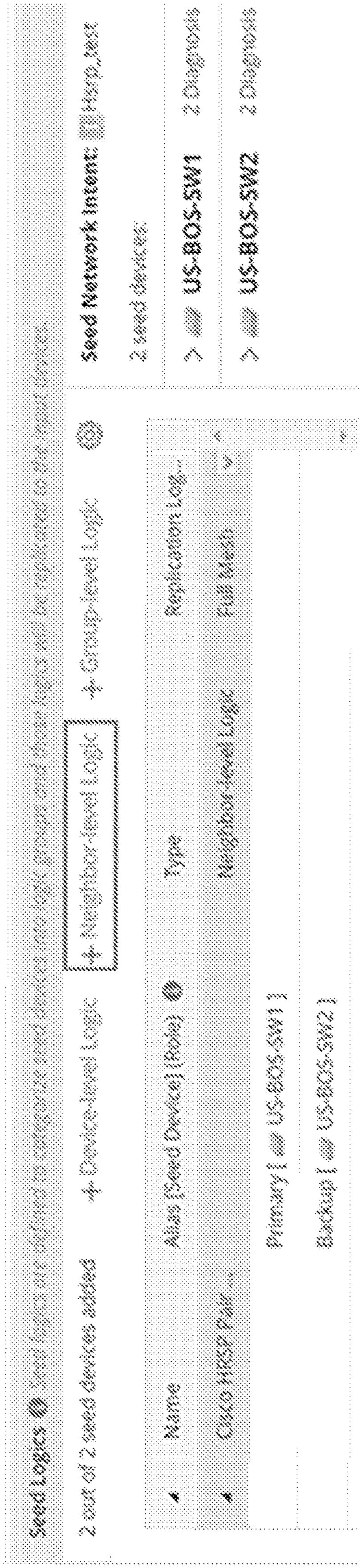
FIG. 12*a* illustrates a selection screen for selecting seed logic.

The third step shown in the example process of FIG. 8 is selecting seed logic. This step may define the logic of a Seed NI to be replicated. FIG. 12*a* illustrates a selection screen for selecting seed logic. There may be three different types of Diagnosis:

- Device-level logic: the logic involves one device.
- Neighbor-level logic: the logic involves a pair of neighbor devices. This logic has three replication options: full-mesh, sparse mode, and hub-spoke.
- Group-level logic: the logic involves multiple devices.

In this example, the NI involves a pair of neighbor devices, so these Seed devices are added with neighbor-level logic and define the replication logic as full mesh.

Seed Logic may be used to select the logic replicating from the seed NI to the input devices. There may be three types of logic:

- Device-level logic is used for single device diagnosis and replicated once for each device.
- Neighbor-level logic is used to categorize neighbor-pair devices with cross-device Diagnosis into a logic group, and the logic will be replicated based on the neighbor pair.
- Group Level logic is used to replicate the exact number of device logic with seed NI.

Figure 12B:
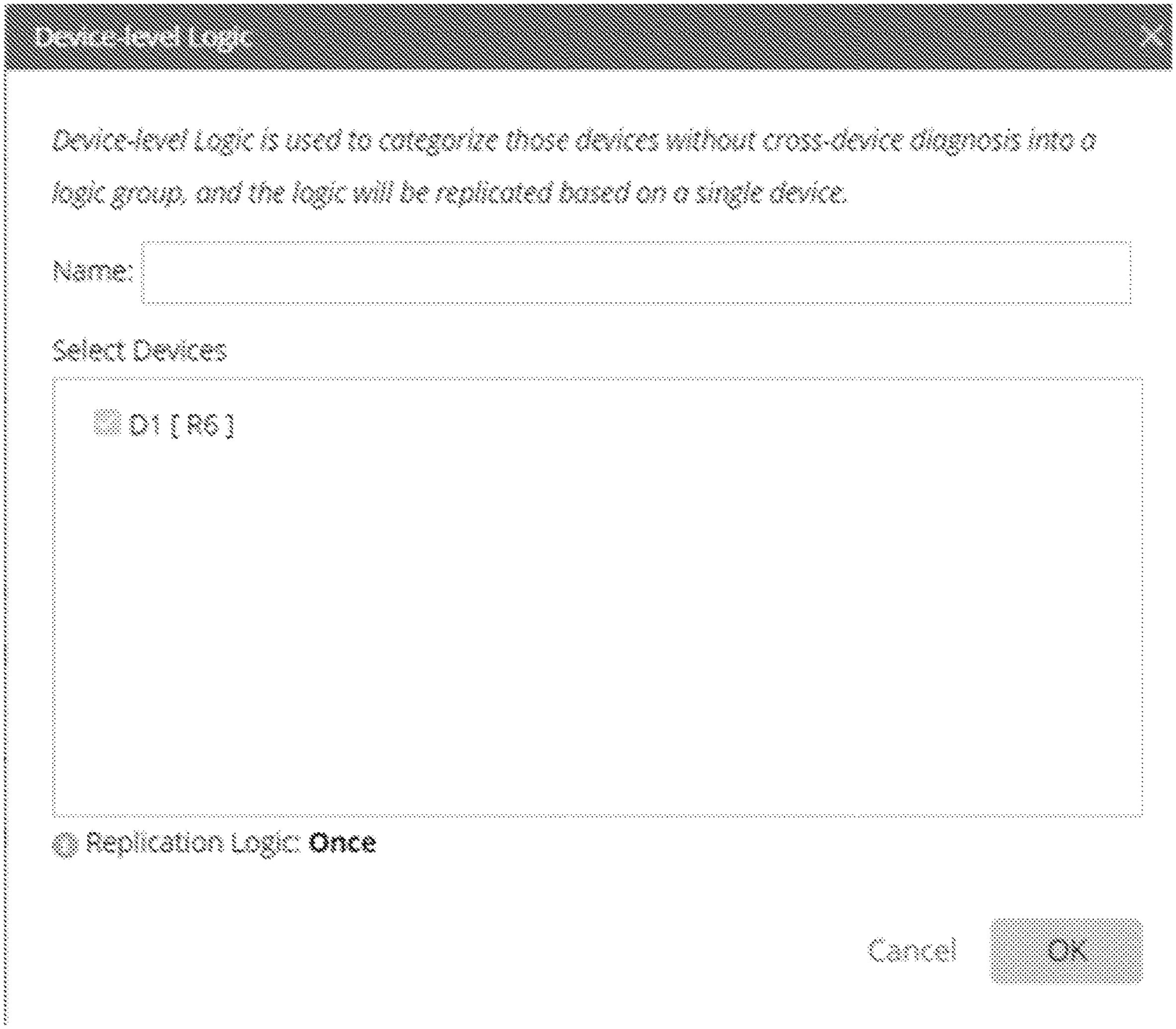
FIG. 12*b* illustrates a selection screen for device level logic.

FIG. 12*b* illustrates a selection screen for device level logic. For example, the NI checks the configurations for security compliance (whether the password is encrypted and telnet is disabled) and monitors the operation status (interface CRC error increases).

Figure 12C:
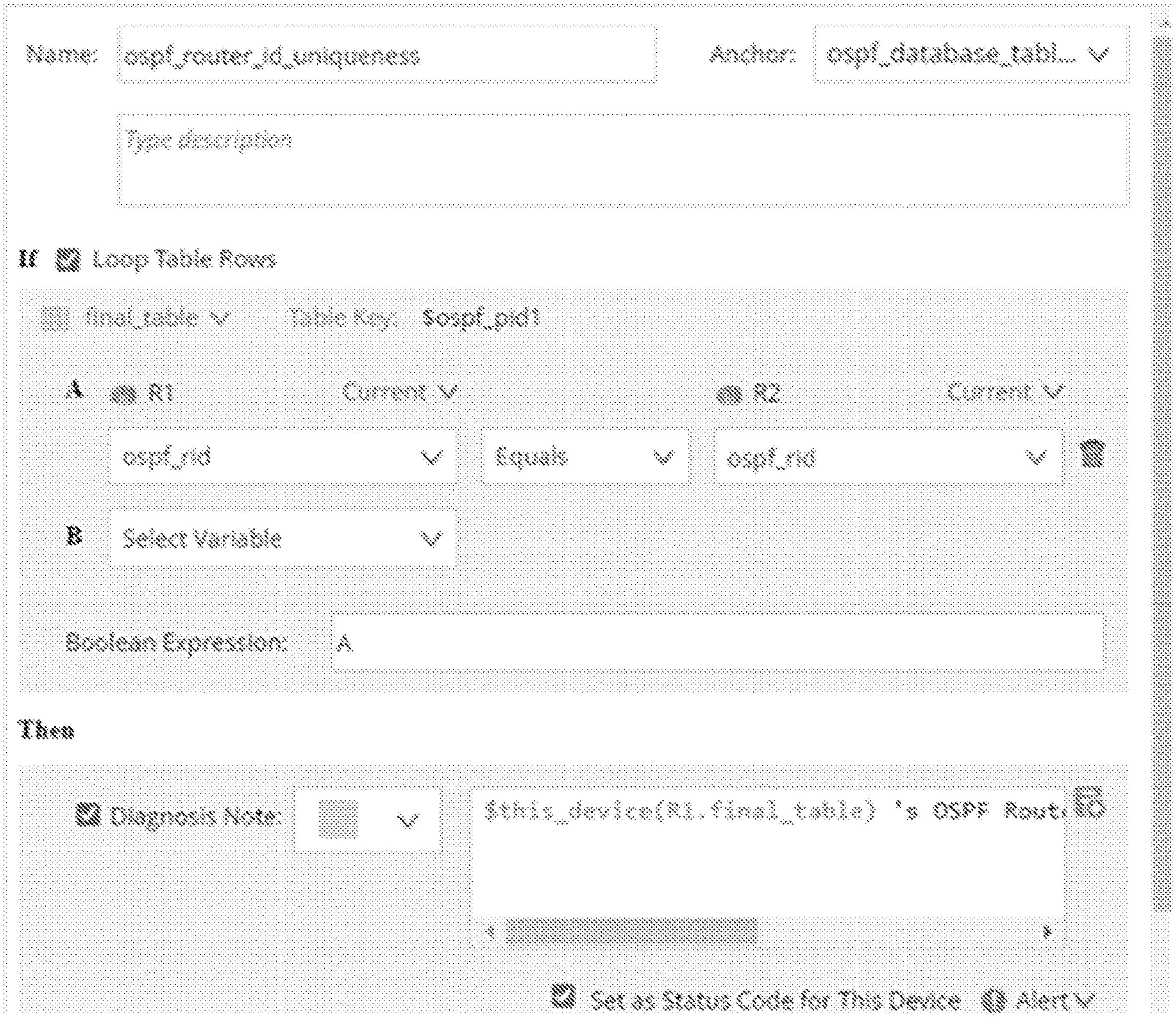
FIG. 12*c* illustrates a screen for full mesh device level logic.

Neighbor-level logic may have three types of replication logic designed for the different types of real-world cases: 1) full mesh; 2) sparse mode; 3) hub-spoke mode. The full mesh may take any two input devices in an eigen group to replicate the Diagnosis. So, if there are n input devices in an eigen group, NIC may generate the maximum of n*(n−1)/2 diagnoses in a member NI. Full mesh mode can be used to check the parameters across each neighbor pair to ensure the parameter for each device is unique. For example, check Router IP for an OSPF autonomous system to ensure that all router IDs configured within the same Autonomous system are unique. FIG. 12*c* illustrates a screen for full mesh device level logic. Seed NI Logic checks the router ID of two devices to ensure that they are not the same. If the router IDs are the same, the system will raise an alert. The full-mesh replication logic can be used to expand the logic to all devices within the same network (e.g., OSPF autonomous) system.

In the second example of neighbor-level logic, there may be a sparse mode. Sparse Mode will take the input devices of an eigen group as a list and replicate the Diagnosis for any two adjacent devices. So, if there are n input devices, NIC may generate the maximum of (n−1) Diagnosis in a member NI. Sparse Mode can check the parameters across each neighbor pair to ensure that the parameters are the same across the device selected. For example, check EIGRP K Value for the same EIGRP AS number to ensure that all EIGRP key values within the same EIGRP AS number are the same. Seed NI checks the K value for two devices to ensure they are not the same. If Key Values are not the same, the system will raise an alert. To expand the logic to all devices within the same EIGRP system, Sparse Mode replication logic may be used to define the seed logic.

In the third example of neighbor-level logic, there may be a hub-spoke mode. Hub-spoke mode may be applied to a pair of devices with different roles. For example, one is a P device, and the other is a PE device. Hub-spoke mode may divide the input devices of an eigen group into two groups according to the roles and take one device from each group to replicate the Diagnosis. For example, if there are m P devices and n PE devices, NIC may generate the maximum m*n Diagnosis in a member NI (for this eigen group). A NI may be created to check the connectivity between a P and a PE device to ensure their connectivity is working. Then for this mode, the expansion for the check logic goes to all connections between P devices and PE devices with hub-spoke mode. For example, a seed NI checks the connectivity between P and PE devices. The system will raise an alert if there is a connectivity issue between the P and PE devices. To expand the logic to all devices within the same BGP AS Number, hub-spoke replication logic may be used to define the seed logic.

For group level logic, there may be a replication of the exact number of device logic with seed NI. For example, a typical remote site of a network includes one router and two switches. A seed NI is created to check the configuration compliance for a particular site. The group level logic can be used to expand the same logic to all remote sites having the same deployment and setup.

Step 4: Define Device Classifier

Figure 13:
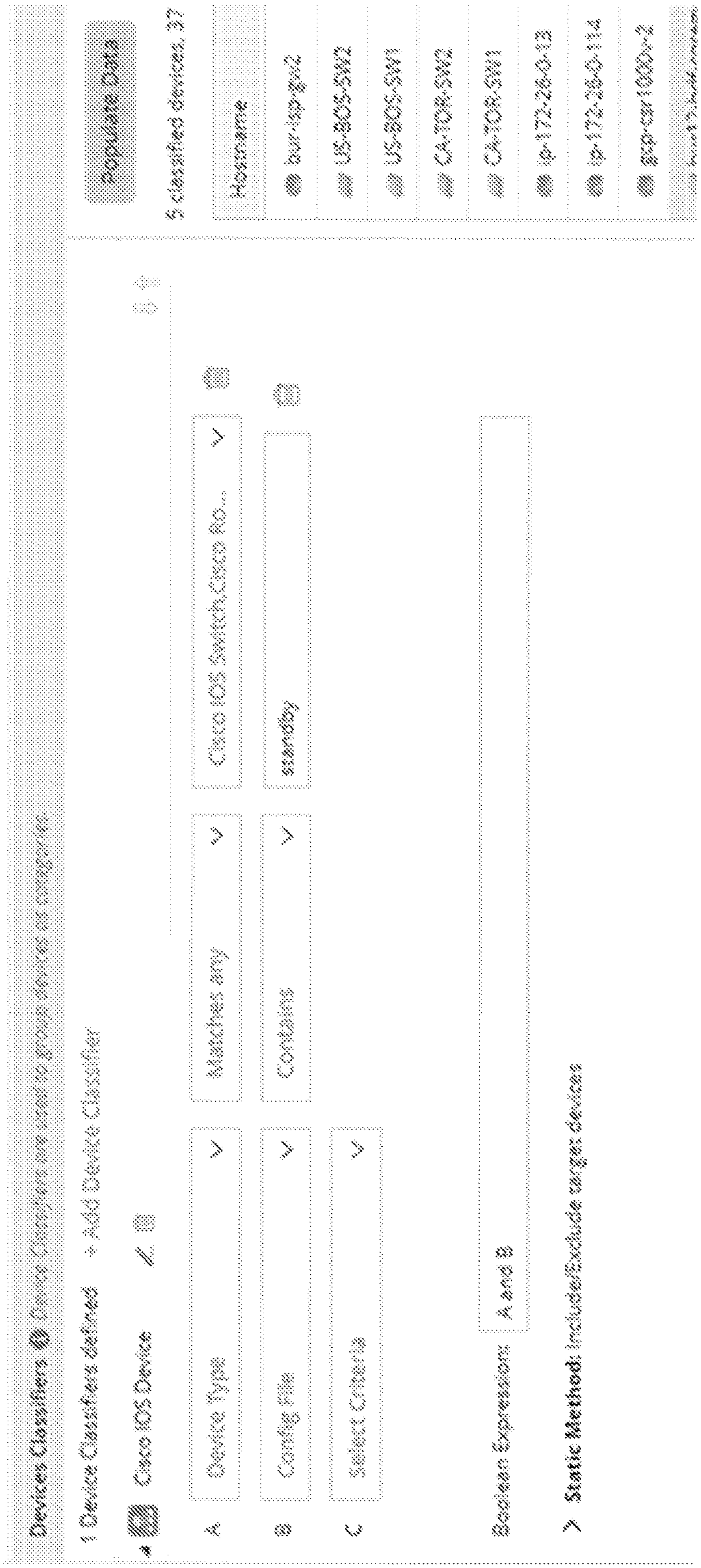
FIG. 13 illustrates a selection screen for defining a device classifier.

The fourth step shown in the example process of FIG. 8 is defining a device classifier. FIG. 13 illustrates a selection screen for defining a device classifier. Classifiers may be based on the device types, so each classifier can use the same CLI command(s) to retrieve the data or use the same system. This logic may be expanded to all Cisco IOS devices with HSRP configured in this example. A classifier is created where the device type matches the Cisco IOS switch or router, and the configurations contain the keyword standby.

The Device Classifier node can put devices into different classifiers based on the device types so each classifier can use the same CLI command(s) to retrieve the data or use the same system. Users can use other device properties and configuration file other than the device type. Users can define multiple classifiers, for example, one classifier for one vendor, which can be useful for an NI to support the multi-vendor.

Step 5: Group by Eigen-Value

Figure 14A:
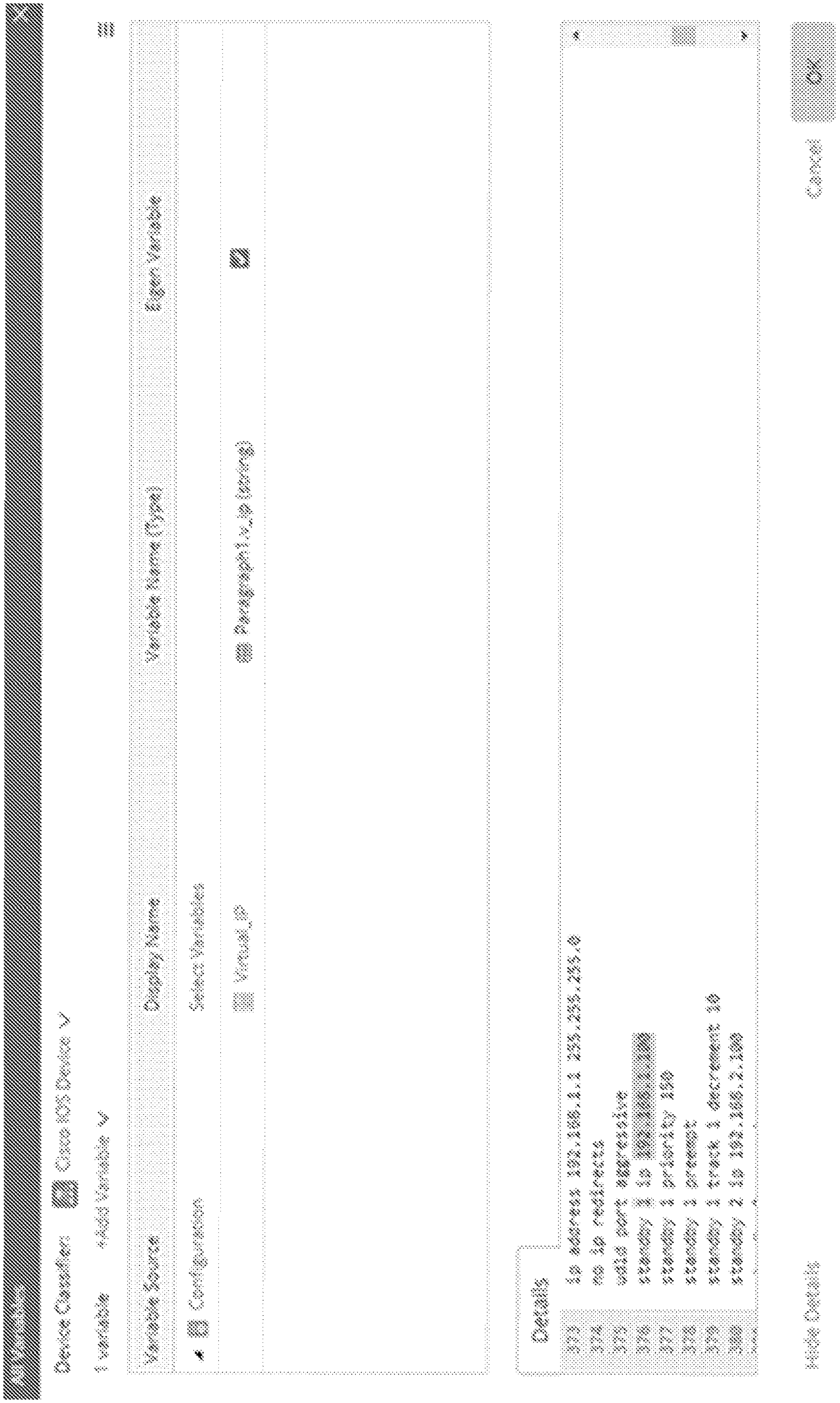
FIG. 14*a* illustrates an example screen for grouping by eigen-value.
Figure 14B:
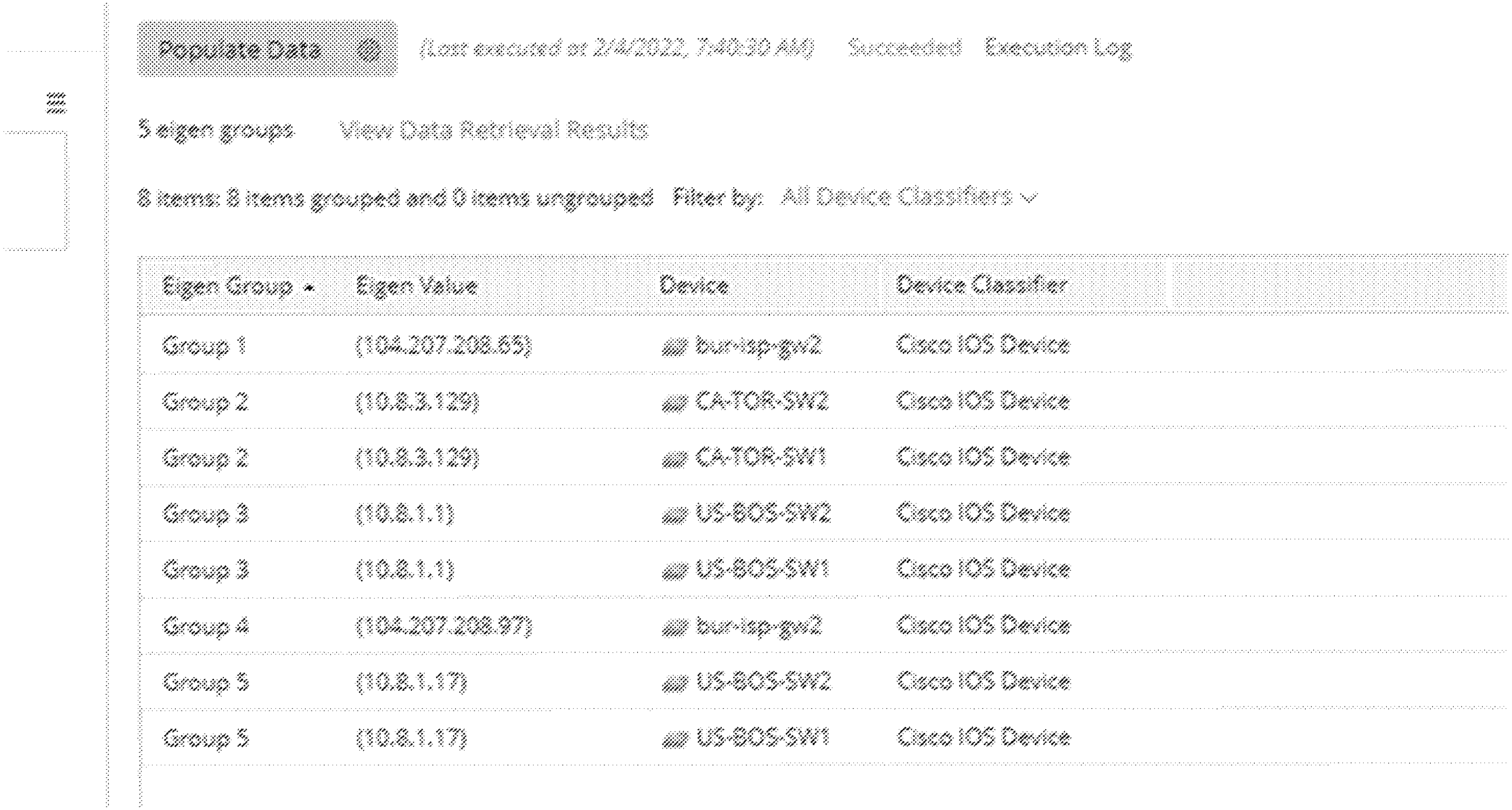
FIG. 14*b* illustrates an example display screen with the eigen-value group.

The fifth step shown in the example process of FIG. 8 is grouping by Eigen-value. FIG. 14*a* illustrates an example screen for grouping by eigen-value. Eigen-Value may be used to group devices with the same characters into a group (Eigen Group), forming a Member NI. In the example of FIG. 14*a*-14*b*, a pair of HRSP devices have the same virtual IP address defined in the configuration file (the line, standby 1 ip 192.168.1.100). The virtual_IP (virtual IP address) can be used as the eigen value/variable, and the devices having the same virtual IP address will form an Eigen group. After adding the Eigen Variable, clicking on the Populate data results in view of the Eigen-groups shown in FIG. 14*b*. FIG. 14*b* illustrates an example display screen with the eigen-value group. Each Eigen group may have a NI created in the Member NI creation node.

Group by Eigen Value node groups devices with the same eigen value into an Eigen Group, and these devices will be in the same Member Network Intent. One example is: for the single device diagnosis, users can select device property, hostname, as the Engen value and put each input device into an eigen group. Users can add variables from the Parser library, built-in system data, and CSV input variables. Or users can create a new Parser. Under the system data, users can select the device property, interface property, and topology data.

In another example, there may be compound variables and/or an instruction to ignore the variable order. While expanding a NI to check MTU mismatch between two neighbor interfaces to the whole network, users can select the topology data under the system data as the eigen variables, including four variables, this device, local interface, neighbor device, and neighbor interface. Furthermore, users can add compound variables built from the currently selected variables. For example, users can create a compound variable this_device_info with the formula $thisDevice+$localInteface. This compound variable may identify a local interface across the network if the device hostname is unique. In some embodiments, users can create the compound variable neigbor_device_info and set both compound variables as the eigen variables. The system may create two eigen groups for a pair of this_device_info and neigbor_device_info as (R1e0, R2e0) and (R2e0, R1e0). However, the order may be varied for MTU mismatch, and these groups may be one. Users can ignore variable orders by adding the Ignore Variable Order setting and checking the corresponding variables.

In another example, there may be a merge group via variable. The system may create the eigen group by default if all eigen variables are the same. In some embodiments, users may want to group devices even if some eigen variables are different. For example, a NI is created to check the neighbor relationship between P and PE devices. For this purpose, the P device and its PE devices are put into an Eigen Group. Four eigen variables are added: $name, $BGP_as_number, $nbr_device, $local_IP. And the Ignore Variable Order is added to ignore the order of name and nbr_device. Four eigen groups are created for each pair of P and PE neighbors. To merge all eigen groups into one group, we can enable the merge variables function and select the variable as_number so that the devices with the same as_number will be merged into one group.

Step 6: Target Seed

Figure 15A:
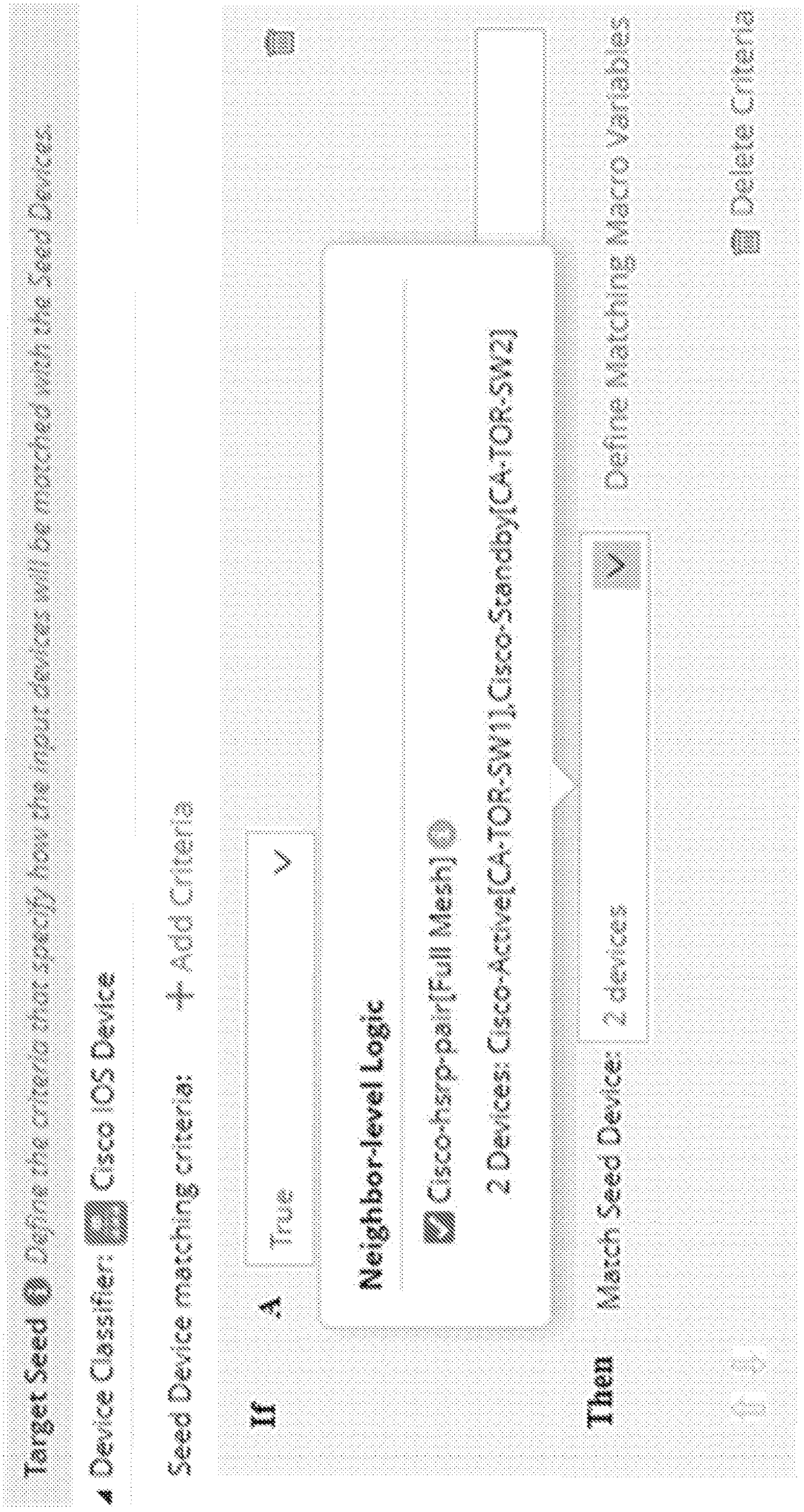
FIG. 15*a* illustrates an example screen for defining target seed.
Figure 15B:
FIG. 15*b* illustrates an example display screen with the defined target seed.

The sixth step shown in the example process of FIG. 8 is Target Seed. Target Seed defines how to clone the logic defined in the Seed Logic section. FIG. 15*a* illustrates an example screen for defining target seed. In this example, there may not be different conditions to filter or match seed logic (e.g., one seed logic followed by primary and standby devices). Therefore, the condition is set to be True. Clicking on Populate Data shows the results. FIG. 15*b* illustrates an example display screen with the defined target seed. The results show the devices, matched seed devices, and whether this Eigen Group will form a NI.

The Target Seed node may define how to match the input devices to a seed device. For example, an NI may be created to check the failover status of a primary and backup HRSP device. The seed devices may be the primary and backup devices. The target seed logic can be defined by: if $state contains Active, match the primary seed device; if $state contains standby, match the standby seed device.

Figure 15C:
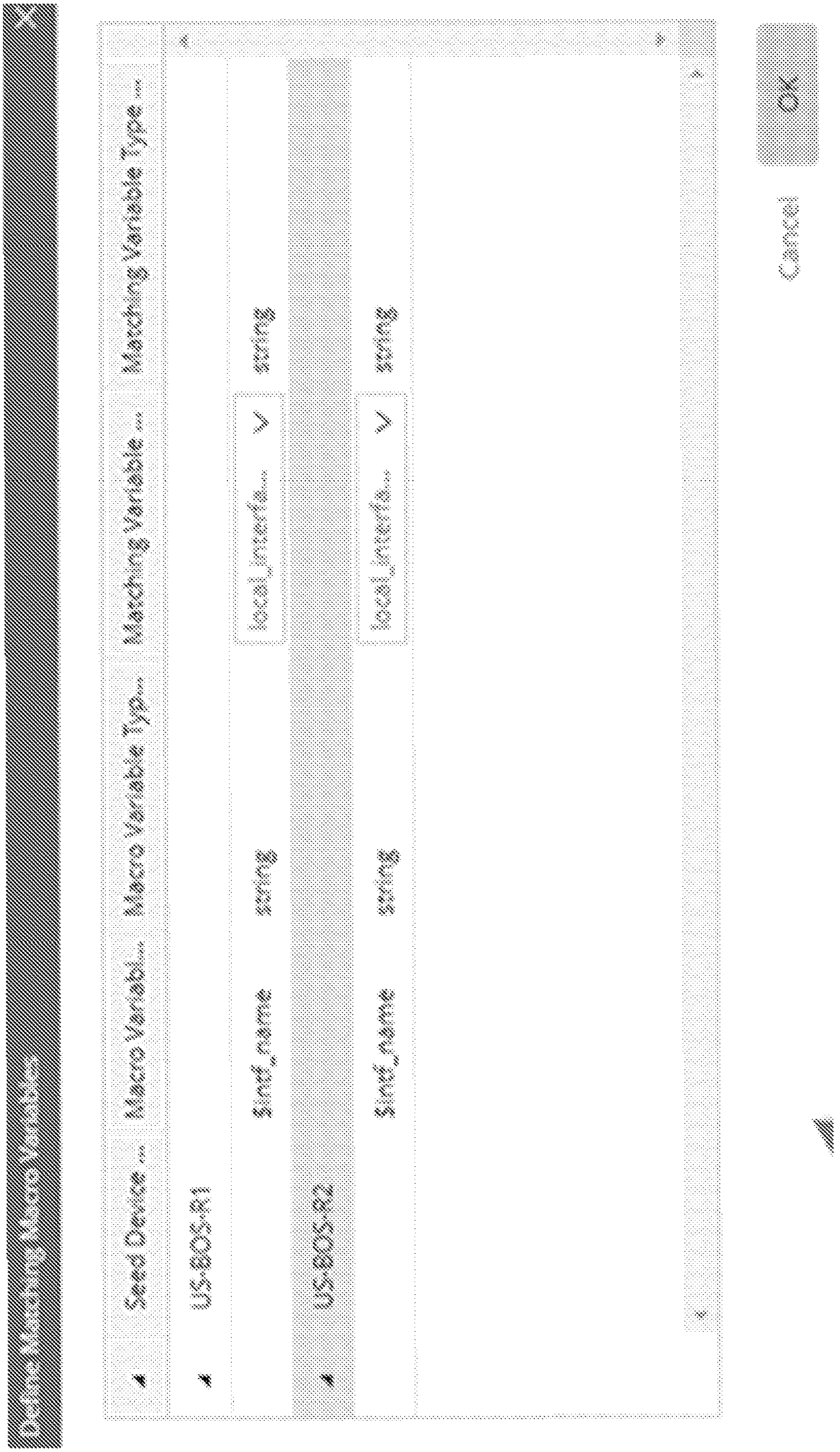
FIG. 15*c* illustrates an example screen for defining matching macro variables.

FIG. 15*c* illustrates an example screen for defining matching macro variables. When the Seed NI has the macro variables, it uses the CLI command, show interface e0/0, to retrieve the data for a special interface. Users may need to define which eigen variables will replace the Macro variables.

Step 7: Member NI

Figure 16A:
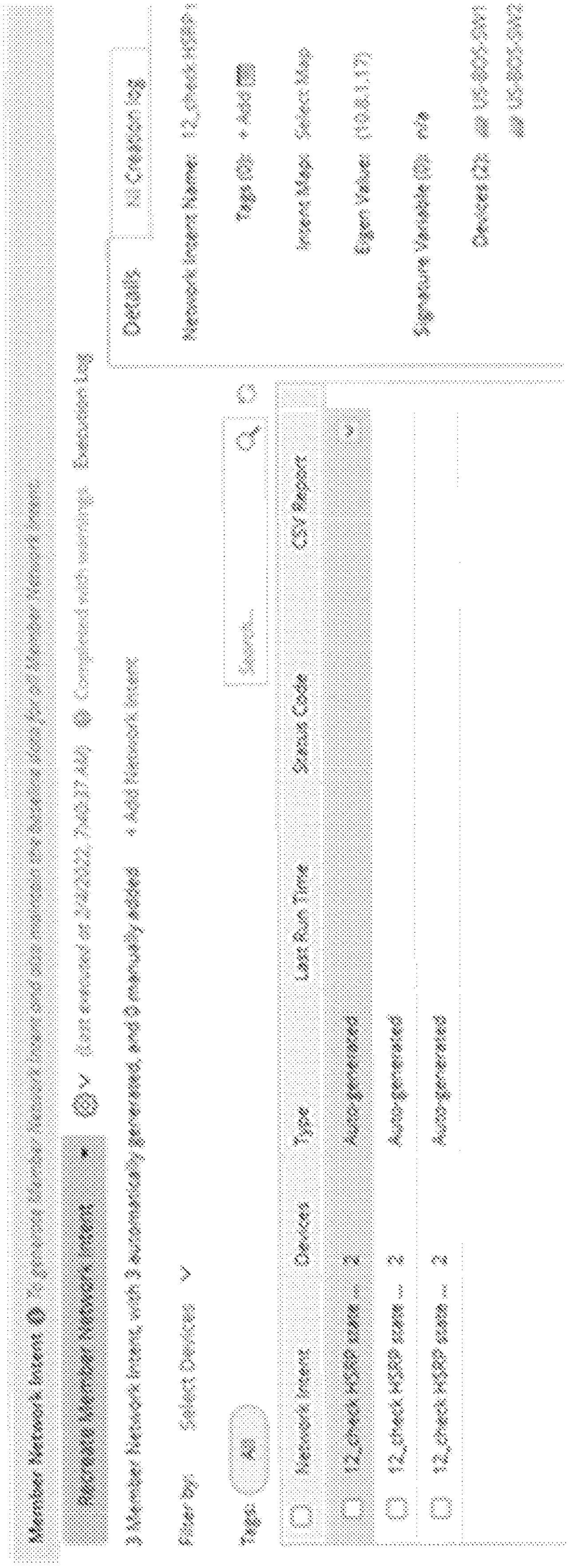
FIG. 16*a* illustrates an example screen for generating member Network Intent (NI).
Figure 16B:
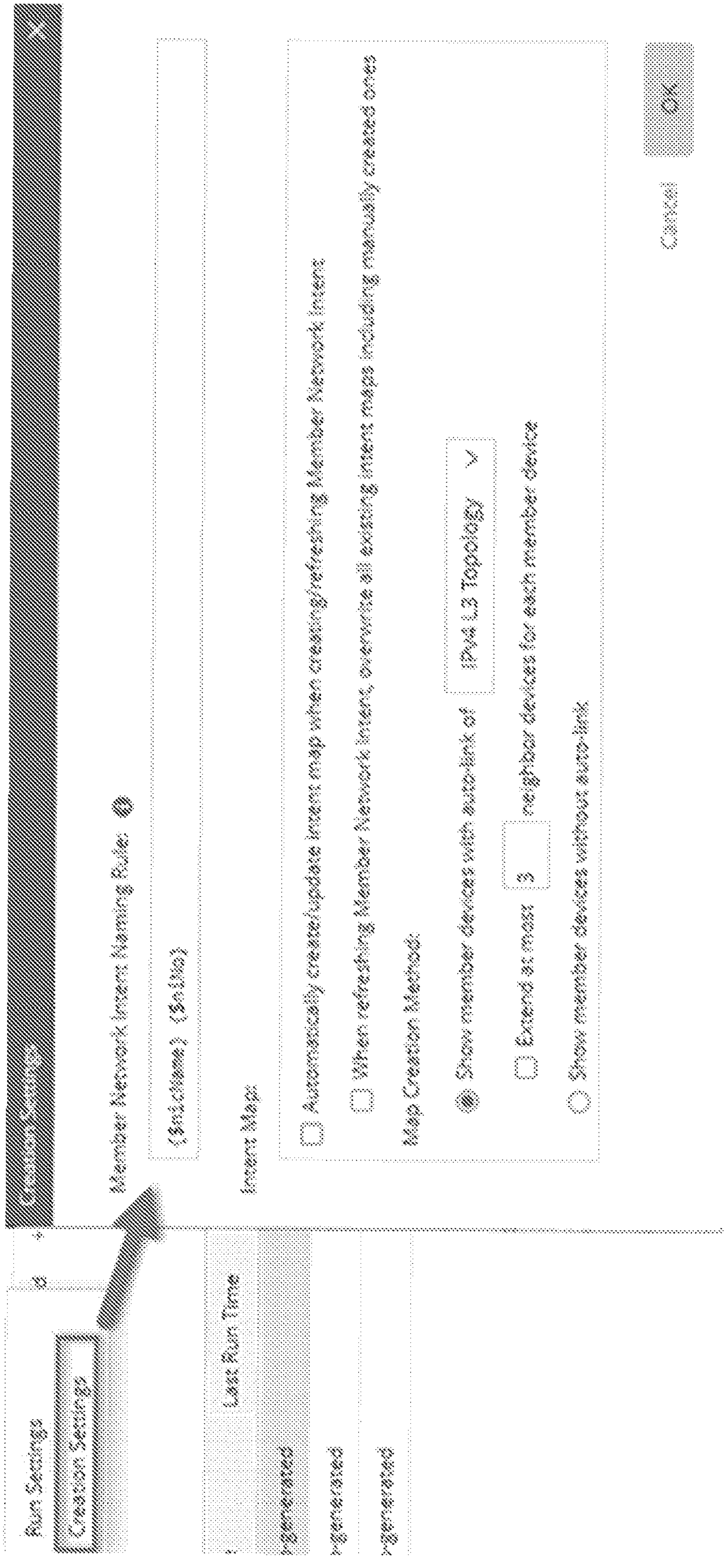
FIG. 16*b* illustrates an example display screen for setting an intent map.

The seventh step shown in the example process of FIG. 8 is creating member Network Intent (NI). FIG. 16*a* illustrates an example screen for generating member Network Intent (NI). Member NI may be generated based on a previous definition. The system may create one member NI for a pair of HRSP devices. For each Member NI, Users can set the tag and signature variable for each Member NI, which may be used later as a condition when a member NI is triggered to run. FIG. 16*b* illustrates an example display screen for setting an intent map. For each member NI, users can also set the Intent Map by selecting a map as the intent map, or the users can configure the Creation Settings to create the Intent map for a member NI automatically.

Member NI generates the Member NIs with the following additional functions:

- For each Member NI, users can view its member devices and eigen variables, set the Intent map, add tags, and/or set the signature variables.
- Add the static NI as its Member NIs.
- Define the run setting and set how to create the Intent Map automatically.
- Export CSV report. After executing Member NIs of a NIC, the system will merge all reports generated by member NIs and create a single report.

The following Table summarizes the example process shown in FIG. 8:

TABLE 2

Example NIC Process as illustrated in FIG. 8.

| NIC | Description | Example |
|---|---|---|
| 1. Input Device | The devices to which you want to expand the NI. It can be a site, the whole network, or a group of devices. | Input Device: all devices in the domain.<br>Representative Devices: US-BOS-R1, US-BOS-R2(Cisco Devices) |

TABLE 2-continued

Example NIC Process as illustrated in FIG. 8.

| NIC | Description | Example | | |
|---|---|---|---|---|
| 2. Seed NI | The design or logic you want to duplicate. | The NI consists of the diagnosis logic for an HSRP Pair of Cisco IOS devices. It checks whether the configurations change against the baseline and its HSPR status | | |
| | | Alias | Device | Diagnosis Logic |
| | | Active | US-BOS-R1 | Config: compare HSRP config against the baseline.<br>CLI: show standby, compare HSRP status against the baseline. |
| | | Standby | US-BOS-R2 | Config: compare HSRP config against the baseline.<br>CLI: show standby, compare HSRP status against the baseline. |
| | | (active/standby) changes via the CLI command, show standby. | | |
| 3. Seed Logic | The logic of a Seed NI to be replicated. There are three different types of Diagnosis Device-level logic Neighbor-level logic Group-level logic | Use neighbor-level Logic to define the seed logic for two seed devices: | | |
| | | Seed Logic | Logic type | Replication Logic |
| | | (Active, Standby) | Neighbor-level | Full-mesh |
| 4. Device Classifiers | Classify devices based on the device types so each classifier can use the same CLI command(s) to retrieve the data or use the same system Data. | Create one device classifier: the device type is Cisco IOS Device, and the configuration file contains the keyword, standby. | | |
| 5. Group by Eigen-Value | Eigen-Value is used to group devices with the same characters into a group (Eigen Group), forming a Member NI. | A pair of HRSP devices have the same virtual IP address defined in the configuration file (the line, standby 0 ip 10.10.10.100). So, we define the eigen variable as the virtual IP address, and the devices having the same virtual IP address will form an Eigen group:<br>Eigen Group1: R1&R2<br>Eigen Value: (10.10.10.100)<br>R1: (10.10.10.100)<br>R2: (10.10.10.100) | | |
| 6. Target Seed | Defines how each device in the Eigen Group matches the target seed. | Just assign the devices to the seed logic of hsrp-neighbor-pair. | | |
| | | Device Classifier | Match Definition | Match Result |
| | | Cisco IOS Devices | (R1, R2) -><br>(Active, Standby) | Result1: (R1 -> Active),<br>(R2 -> Standby) |
| 7. Member NI | Generate member NI based on the previous definition. | The system will create one member NI for a pair of HRSP devices. Also, you can tag the Member NI as the fail-over and the signature variable as the virtual IP address. The tag and signature variable will be used later as a condition when a member NI is triggered to run. | | |

Figure 17:
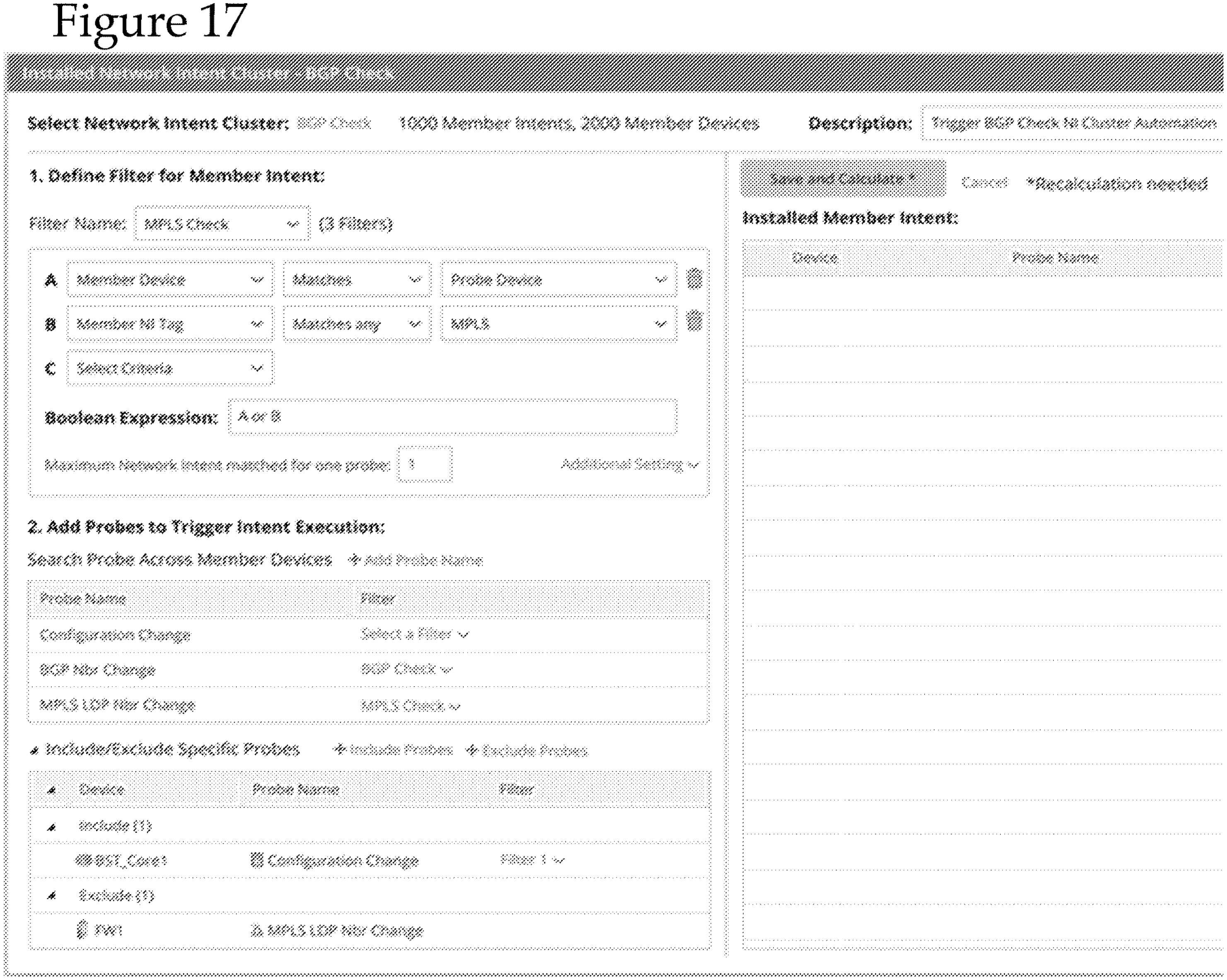
FIG. 17 illustrates an example of NIC execution.

The NIC can then be executed. Member NIs of a NIC can be run manually. In some embodiments, NIC is triggered by an external ticket, which requires adding NIC to the triggered Diagnosis of the Triggered Automation Framework (TAF) system (discussed below), or an internal probe, which may require installation of NIC to the probe. FIG. 17 illustrates an example NIC execution. NIC may be installed to a probe via three steps: 1) Select NIC; 2) Define Filter for Member Intent Member Device with Member NI Tags and signature variables; and 3) Add Probe to Trigger Intent Execution.

Network Intent Cluster (NIC) Auto Mode

Figure 18:
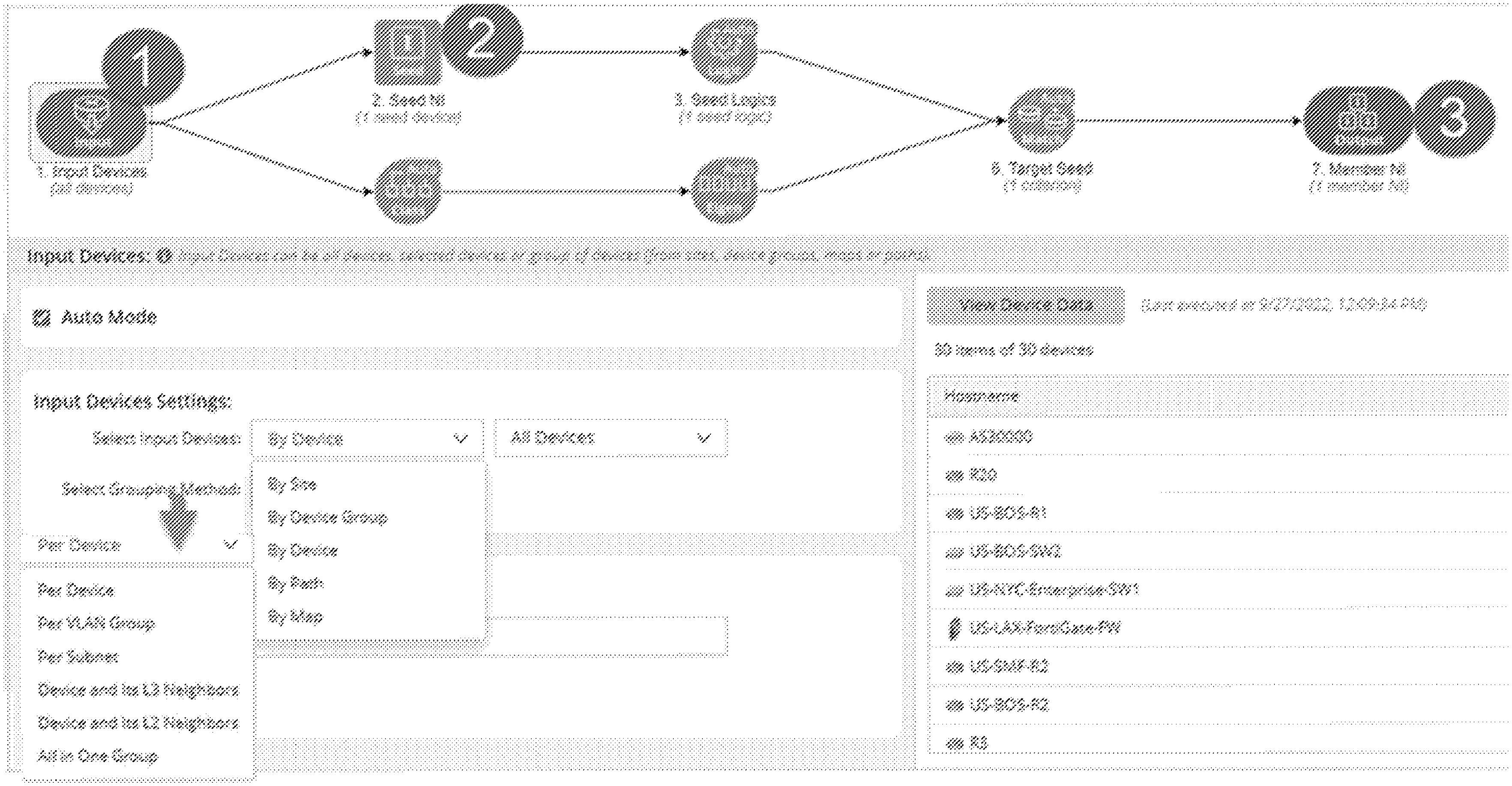
FIG. 18 illustrates an example of Network IntentCluster (NIC) Auto Mode.

The example NIC process described above includes seven steps. In alternative embodiments, there may be more or fewer steps. In one embodiment referred to as Auto Mode, that process may include three steps. FIG. 18 illustrates an example of Network IntentCluster (NIC) Auto Mode. In the example embodiment shown in FIG. 18, the three steps for Auto Mode include: 1) Input Devices; 2) Seed NI; and 3) Member NI (step 7 in FIG. 8). These steps are all described above and that description is relevant here. The other steps are automated by the system.

For the first step, the input devices are selected. Users can select the input devices: by Site, by Device Group, By Device, by Path, and by Map. When users select inputting the device by Device, they may select the method to create the group, which can be per device, per VLAN group, per subnet, device and L3 neighbors, device and its L2 neighbors, and all in one group. For the second step, the seed NIs are selected. The auto mode may support the single device diagnosis. The system can ask users to disable the auto mode if the Seed Intent contains a cross-device diagnosis. For the third step, the member NIs are created. The member NIs will be created by the type of input devices or the method to create the group:

- By map: all devices on the same map will belong to a member NI.
- By Site: all devices of a site will belong to a member NI.
- By Device Group: all devices in a device group will belong to a member NI.
- By Path: all devices in a path will belong to a member NI.
- By Device, which includes:
  - Per device: a member NI will be created for each device.
  - Per VLAN group: a member NI will be created for all devices belonging to a VLAN group.
  - Per subnet: a member NI will be created for all devices belonging to a subnet.
  - Device and L3 neighbors: a member NI will be created for the device and its L3 neighbors.
  - Device and its L2 neighbors: a member NI will be created for the device and its L2 neighbors.
  - All in one group: only one member NI is created to include all devices.

The system can automatically create other nodes (e.g., nodes/steps 3-6 from FIG. 8). Users can disable the auto mode and edit these nodes rather than relying on the system to create them automatically.

Network Intent Cluster (NIC) Auto Test

In FIG. 8, the sixth step is the Target Seed node described above. In one embodiment, there may be an optional variable referred to as Test Seed NI variable that is added to the Target Seed node. With this option enabled, users can select the seed NI variables. For each input device, the system may test the selected variables against the live network, and if one of the seed NI variables is not retrieved or parsed successfully from a device for one seed device type, the system can try the next seed device type. No member NI is created for the input device if no seed device type succeeds. With this option, users can then create member NIs that have meaningful results.

Figure 19:
FIG. 19 illustrates an example of Auto Test mode for the target seed node.

FIG. 19 illustrates an example of Auto Test mode for the target seed node. In this embodiment, an NIC is created to clone a seed NI, which retrieves the system version number and checks whether a device system requires upgrading. The seed NI has two seed devices, one for Cisco IOS, which issues the command show version, and the other for FortiGate, which issues the command get system status. When the Test Seed NI Variable option is enabled, the system will try the command, get system status, first for an input device. If it fails, the system will continue to try the command, show version. If both commands fail (e.g., when the device is not Cisco IOS or FortiGate), no member NI is created for this input device.

This Auto Test option can also apply to and simplify the definition of Device Classifiers (step/node 4) and Group by Eigen Values (step/node 5) when multiple vendors or commands are involved. With this option enabled, the user can use the default device classifier, and the system then determines which device type or commands are used by testing the data against the live network. In other words, Auto Test provides functionality for Auto Mode, where the system determines several nodes/steps.

Triggered Automation Framework (TAF)

Figure 20:
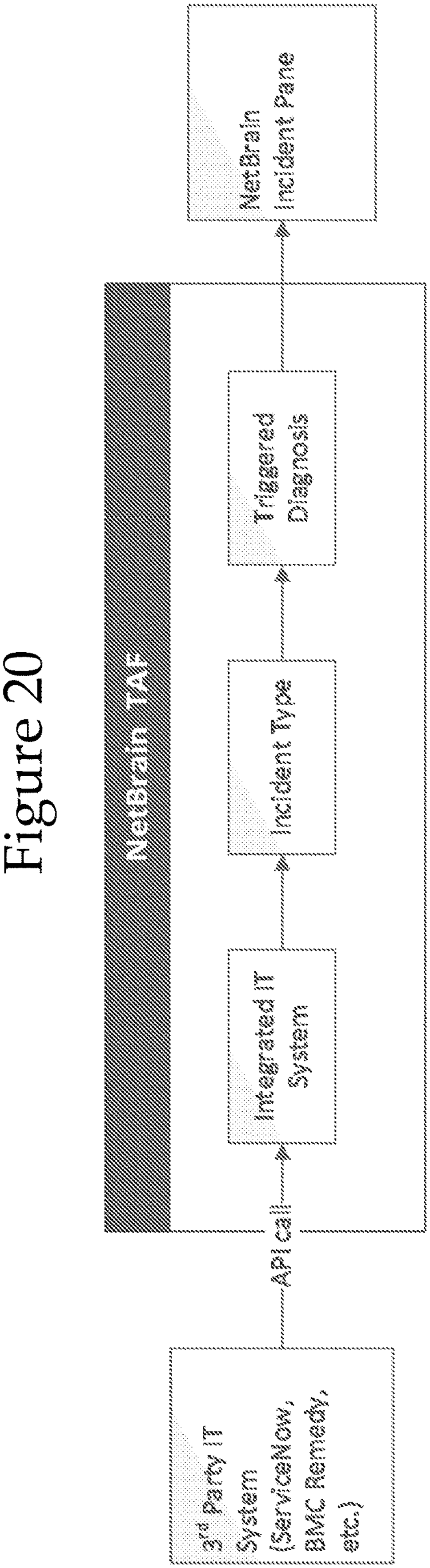
FIG. 20 illustrates an example Triggered Automation Framework (TAF) process.

Triggered Automation Framework (TAF) is a framework for an incident such as a ServiceNow ticket to trigger the related network automation such as Network Intent and Runbook. FIG. 20 illustrates an example Triggered Automation Framework (TAF) process. In some embodiments, TAF has the following components: 1) Integrated IT System; 2) Incident Type; and 3) Triggered Diagnosis. For the Integrated IT System, the categories of API calls are defined along with what data for each API call comes from the IT system (ticket system) to be integrated with the system. For the Incident Type, each category of the incoming API call from the Integrated IT Systems is classified into Incident types. The Incident Type may include: a) The condition to put an API call into this Incident Type; b) The signature to decide whether merge the API call into an existing Incident or create a new Incident; and/or c) The Incident message and Guidebook, which will be displayed in the Incident Pane. For the Triggered Diagnosis, each Incident Type can be installed to execute NI/NIC. The installed NI and NIC can be run automatically (triggered Diagnosis) by the incoming API call or displayed in Incident Pane for the user to execute manually (self-service). The Diagnosis results and NI codes may be shown in Incident Pane and the Integrated IT system. The Triggered Diagnosis may include: a) When to trigger run NI/NIC (triggered condition); b) Which member NIs for a NIC (member Network Intent filter); and/or c) How to run a member NI (member NI execution mode). Users can select create the Intent Map, Execute the NI, or both.

Figure 21:
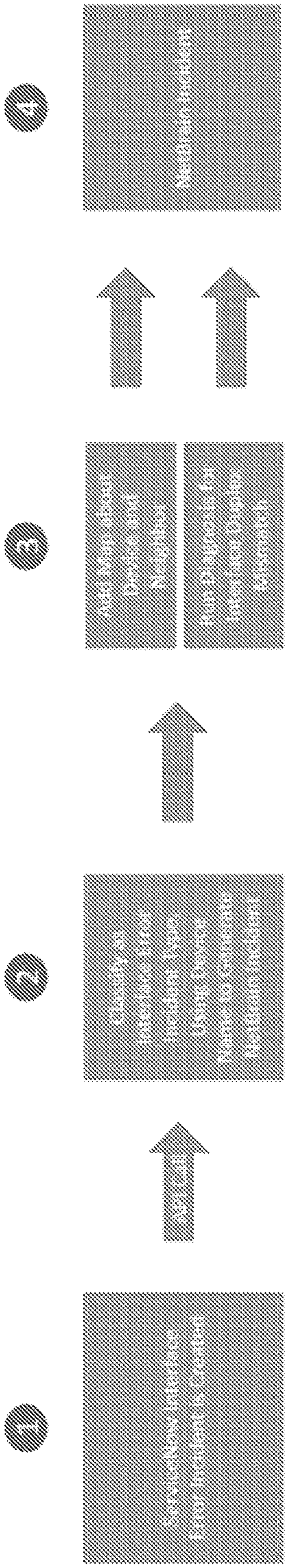
FIG. 21 illustrates an example Triggered Automation Framework (TAF) ticket flow process.

FIG. 21 illustrates an example Triggered Automation Framework (TAF) ticket flow process. This embodiment includes a service ticket (e.g., a ServiceNow ticket) that states that the Interface has an error. The Incident and install Diagnosis for this ticket are further described.

TAF Integrated IT System

The first step in integrating an IT system is to define the API call signature (or identification) from that system to the NetBrain system. This may be done via defining an Integrated IT System at the system management level. An Integrated IT system describes what types of API calls (category) and the data included in these API calls. In addition, the system provides a mechanism to support multi-tenant and domain deployment for Managed Service Providers (MSP) and other customers with the multi-tenant and domain deployment. An Integrated IT system has the following fields:

- Source: the name of the ticket system, such as ServiceNow.
- URL Address: the URL of the ticket system, such as netbrain.servicenow.com. This field is used to differentiate which source an API call is from.
- Description.
- Data field: categories of API calls and the data fields for each category.

Each category may correspond to the different types of API calls from this ticket system, which usually has various data fields or parameters. For example, there may be one category for the Incident ticket and another category for the Change Request ticket. To define a category, a user can enter a unique name and add the data fields. There are at least two ways to add the data fields:

- Manually add data field: manually enter the name (used in TAF) and the original data field (from the ticket system). The enabled value translation maps the value of the original data field to the human-readable value. For example, for the state of a ticket, mapping 1 to New, 2 to Active, etc.
- Import from a JSON file: importing the data fields from a JSON formatted file.

If multiple categories are defined for an IT system, TAF may match an API call to a category by looking for a particular data field, category, of the API call. As a result, a user can add this particular data field to all categories. Otherwise, a user can define a condition of a category used by TAF to tell which category an incoming API call from this ticket system belongs to. To define a simple condition, a user can select a data field of the API call, an operator (contains, does not contain, matches, does not match), and enter a keyword. Users can combine multiple simple conditions with the standard Boolean AND/OR operations.

Managed Service Providers (MSP) customers may have multiple tenant systems, one tenant for one client. To support the multi-tenant/Domain, an API call may include a particular data field, scope, and define mappings between scopes and Domains for Integrated NetBrain systems. The TAF framework may forward the API call to the matched domain.

TAF Incident Type

For each category of the incoming API call from the Integrated IT Systems, TAF will further classify them into NetBrain Incident types. The Incident Type defines: 1) the condition to put an API call into this Incident Type; 2) the signature variables to decide whether merge the API call into an existing Incident or create a new Incident; and 3) the Incident message and Guidebook, which may be displayed in the Incident Pane.

Figure 22:
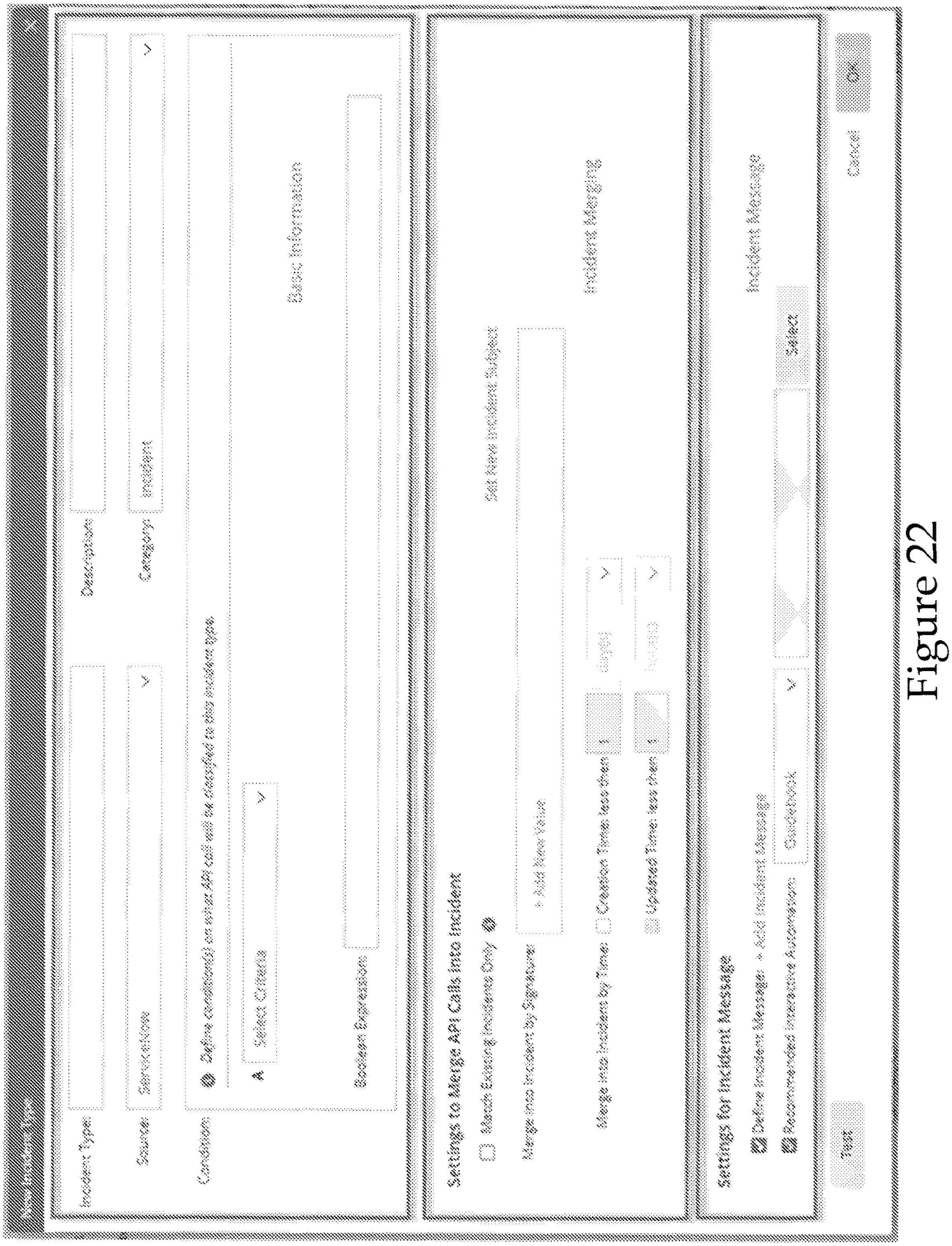
FIG. 22 illustrates an example of a new incident type screen.

FIG. 22 illustrates an example of a new incident type screen. The definition of Incident type may include three steps shown in FIG. 22. For the Basic Information or basic settings or input parameters, there may be:

- Incident Type: a unique name, such as Interface Error, BGP Down, etc.
- Description: an optional field to describe the Incident.
- Source: select an Integrated IT system, such as ServiceNow.
- Category: select a source category, such as Incident (Incident ticket from ServiceNow).
- Condition: defining which API calls of this category coming from the source belongs to this Incident Type. To define a simple condition, select a data field of the API call, an operator (contains, does not contain, matches, does not match), and enter a keyword. Users can combine multiple simple conditions with the standard Boolean AND/OR operations.

There may also be Incident Merging Setting. Multiple tickets are related and can be caused by the same root cause. For example, if a monitoring system detects an interface is down, it may create multiple tickets. TAF allows a user to merge API calls for all these tickets into one Incident instead of creating a new incident for each of these calls. The setting to merge may be defined so: if an API call has the same signature value as a previous API call within a specific time range, then do not create a new incident. Instead, append a new Incident message to the Incident created in the last call.

There may be an option to Match Existing Incident. With this option enabled, API calls belonging to this Incident type will be discarded if no existing incident matches this API call. This option may be disabled so that a new incident will be created if no incident matches the API call. However, a user may temporarily enable this option if he does not want many new incidents created.

There may be an option to Set New Incident Subject. The default incident subject may be {source}-{triggered time}. A user can customize this subject by typing any text and inserting any data field from the category and built-in special fields ({Incident Type}, {source}, {category}, and {triggered time}). For example, a user can create a subject as: Interface {interface name} of device {device} is down: from {source} on {triggered time}.

There may be an option to Merge Incident by Signature. The user can select one or multiple data fields (or custom variables covered later) as the signature to merge the tickets to an incident. One signature can have multiple variables, for example, value 1=$device or $cmdb_ci_name. The use case for the multiple variables is that a ticket may use either $device or $cmdb_ci_name as the device name reporting this Incident. The system may use the first variable with no empty value for the comparison. The user can define multiple values for the signature. For example, for Interface Error incident type, we may define $device_name as value 1 and $interface_name as value 2. The tickets will be merged if both $device_name and $interface_name are the same.

There may be an option for a Custom Variable. The value used for the signature may be a part of a data field such as $description and $detail_message. A user can create a custom variable to retrieve the value from the data field by regular expression.

There may be an option for Merge Incident by Time. The user can define how long TAF should look back to find the incident candidate to be merged. The user can define this time range by Incident Creation Time and/or Updated Time. When both times are selected, the system will use AND logic. If neither is selected, the system will search for all incidents.

Figure 23:
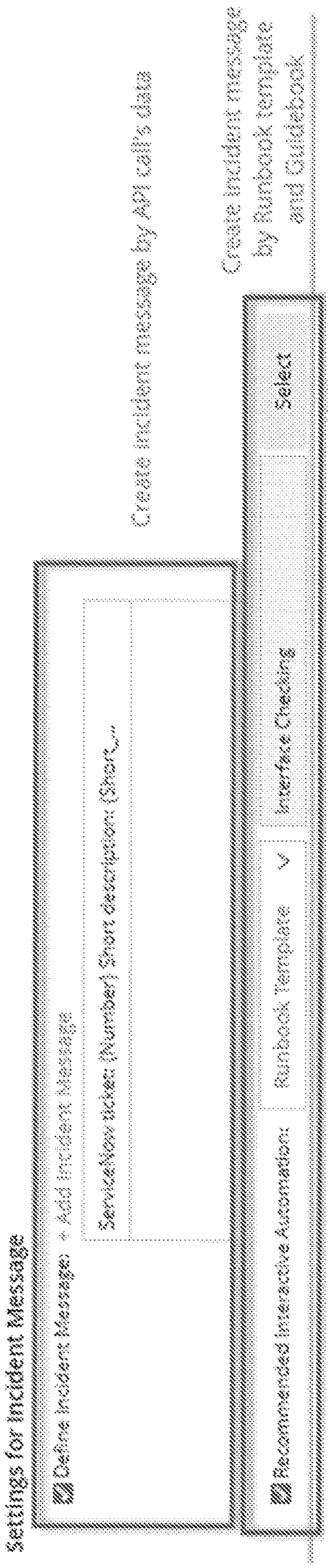
FIG. 23 illustrates an example for defining an incident message.

FIG. 23 illustrates an example for defining an incident message. A user can define an incident message (Define Incident Message). Each ticket may append a message into the corresponding Incident and optionally a recommended guidebook or Runbook template for the interactive troubleshooting. Besides the text, a user can insert any data field from the category, built-in special fields ({Incident Type}, {source}, {category}, and {triggered time}), and hyperlink into the message. To define a hyperlink, a user may define the label and URL. Besides the manual input, a user can insert the data field and custom variable in both fields.

Figure 24:
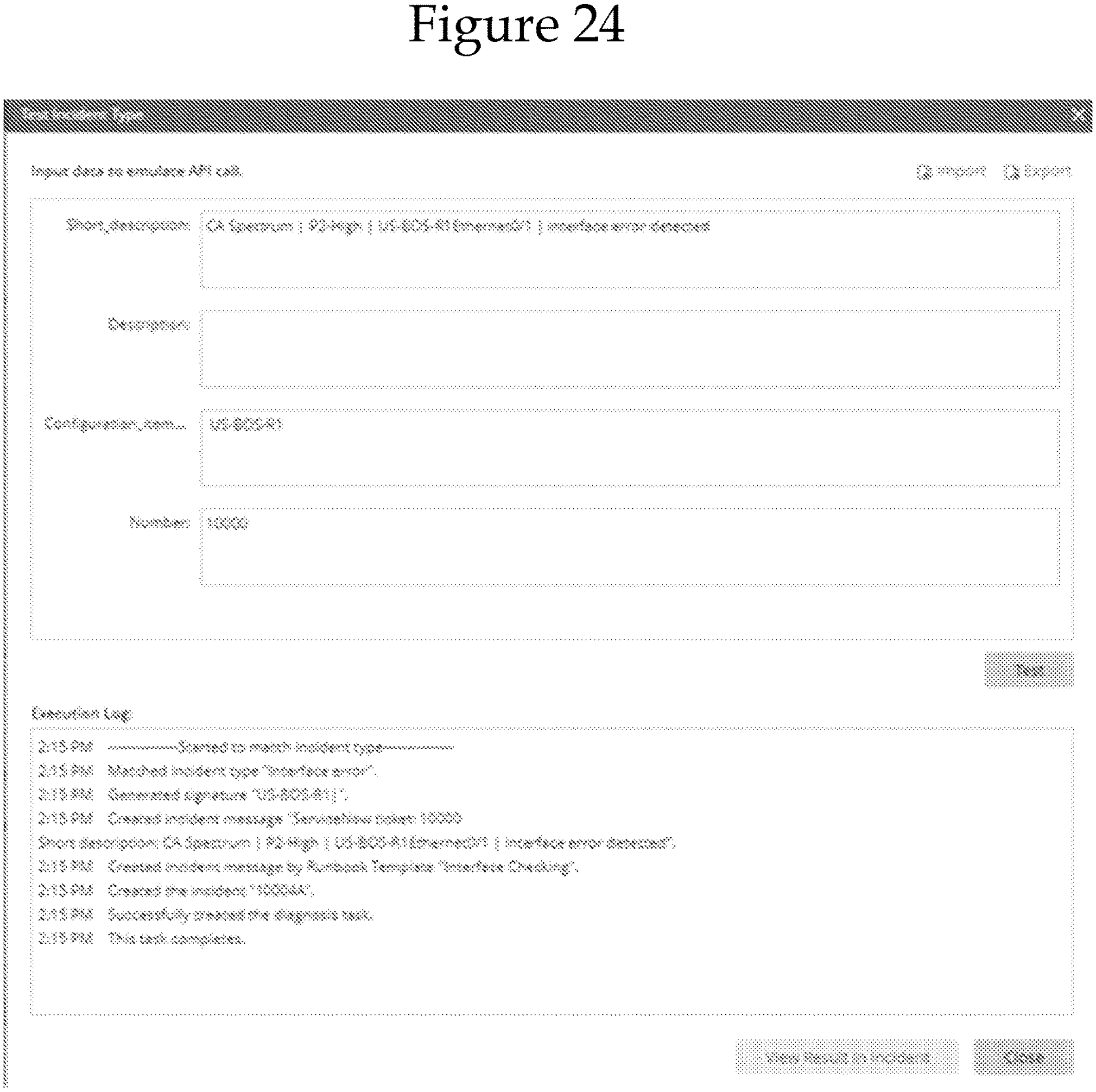
FIG. 24 illustrates an example for testing an incident type.

FIG. 24 illustrates an example for testing an incident type. Incident Type edit UI provides the Test button for a user to test its definition. After inputting the data fields of the incoming API call, the system prints out the execution log with the following example output:

- Whether the data field for this category is empty.
- The values of custom variables if they are defined.
- The matched incident type.
- Generated signature.
- Incident candidates in the time range.
- The Incident to be merged into or a new incident.
- Incident message.
- The incident message created by the Guidebook or Runbook.

The link, View Result in Incident, to view the matched Incident in Incident Pane.

TAF Triggered Diagnosis

Under the Triggered Diagnosis option of a Triggered Diagnosis Center, a user can install an NI or NIC for an Incident Type. The installed NI and NIC can be run automatically (i.e., triggered Diagnosis) by the incoming API call or displayed in Incident Pane for the user to execute manually (self-service). The Diagnosis results and NI status codes may be shown in an Incident Pane and the Integrated IT system.

Figure 25:
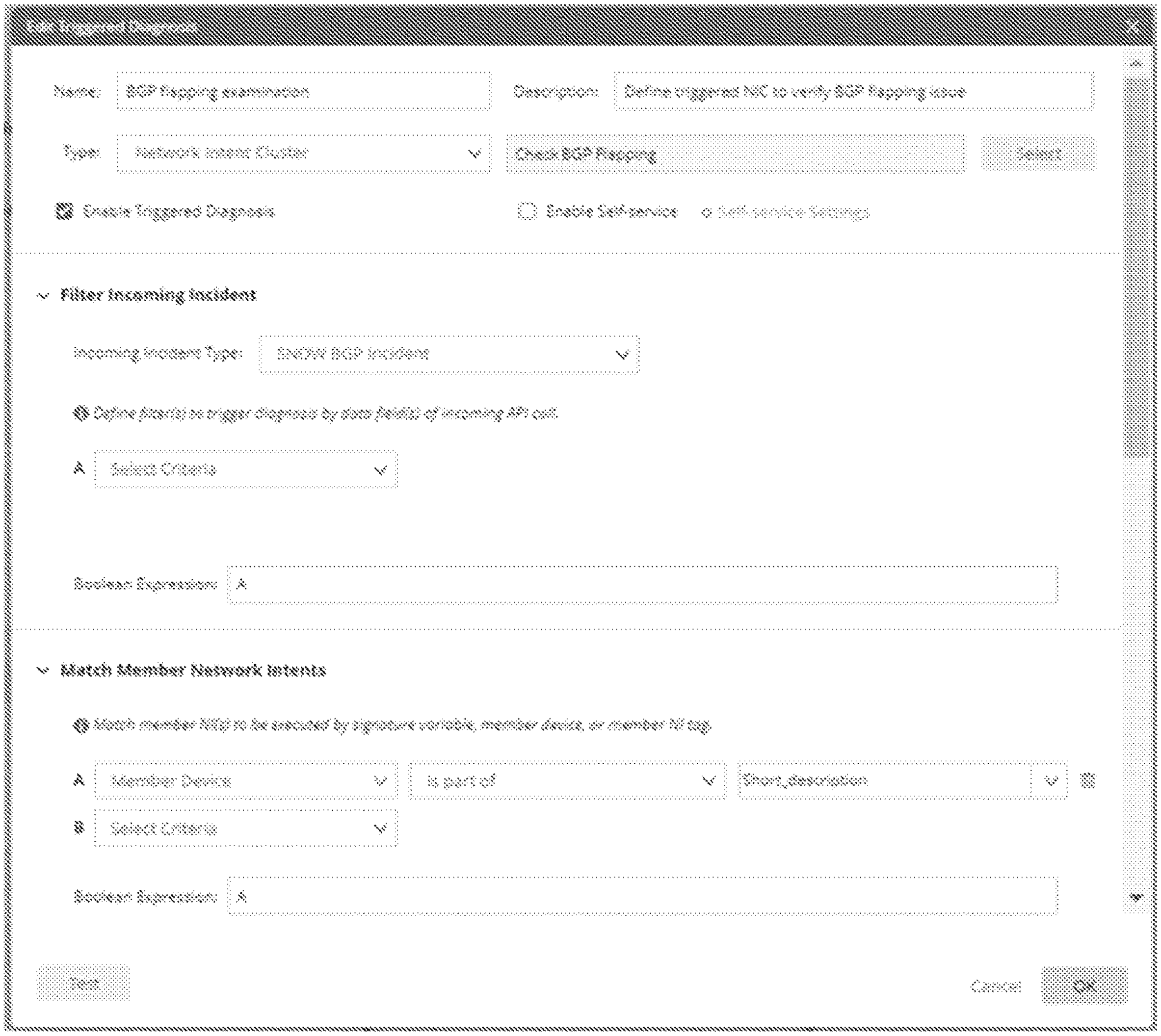
FIG. 25 illustrates an example for editing triggered diagnosis.

FIG. 25 illustrates an example for editing triggered diagnosis. For example, a user can create a NIC to diagnose an issue (e.g., BGP flapping), generating member NIs for all BGP devices in the network. For any API call falling into BGP flapping Incident Type, a user can define a Diagnosis to run this NIC when the Incident occurs. The result indicates whether a BGP flapping and an Intent Map are shown to the end-user in the Incident Pane or ServiceNow. The triggered diagnosis may be defined with the following steps: 1) define the basic setting or input parameters including: name, description, type (NI or NIC), and select an NI/NIC; 2) enable the NI/NIC to be triggered, self-service, or both; 3) define the conditions for the NI/NIC to be triggered (triggered condition); and 4) for NIC, define which member NIs to be executed (filter member NI) and how they are executed.

Besides the name and description, a user can select a NI or NIC for the Diagnosis. In some embodiments, a user can choose NIC unless the Incident Type is specific to certain devices. For example, a user can select the NIC (e.g., BGP Flapping Examination). The NIC may be set to run automatically if the triggered condition is satisfied or displayed in the Incident Portal for the end-user to run it (self-service) manually.

Figure 26:
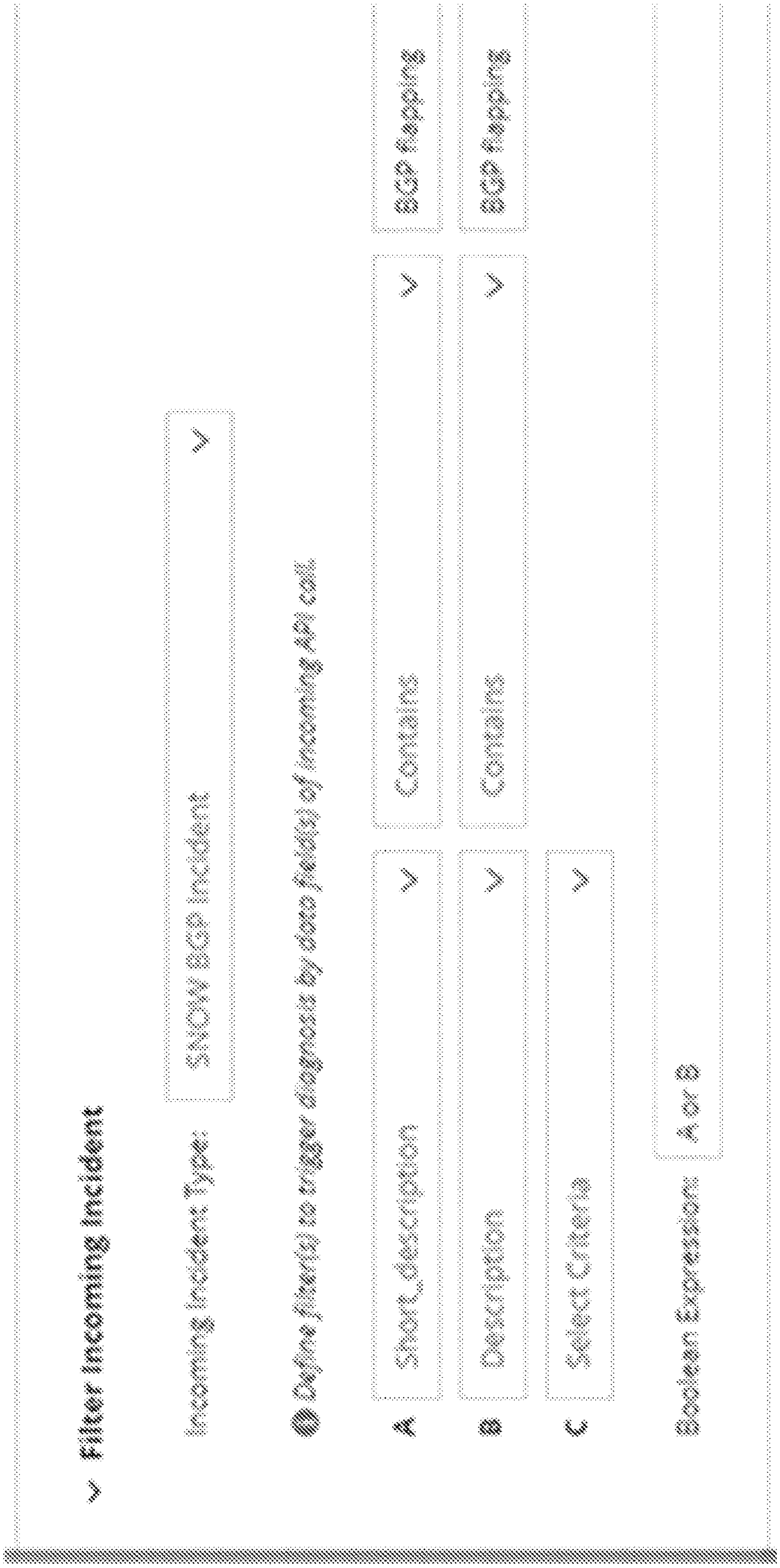
FIG. 26 illustrates an example for filtering triggered conditions.

FIG. 26 illustrates an example for filtering triggered conditions. A trigged condition defines when this Diagnosis will be executed. First, a user can select the Incident Type to trigger this Diagnosis. Then a user can optionally define the condition. If no condition is specified, the Diagnosis may be executed when the incoming API call belongs to the Incident Type. To define a simple condition, a user selects a data field of the Incident Type, an operator (contains, does not contain, matches, does not match), and enters a keyword. Users can combine multiple simple conditions with the standard Boolean AND/OR operations. In the example of FIG. 26, the user selects “SNOW BGP Incident.” Further, the user may not want all BGP incidents to trigger this Diagnosis, and can specify that it is triggered when the short description or description contains the word flapping.

Figure 27:
FIG. 27 illustrates an example for filtering member NI.

FIG. 27 illustrates an example for filtering member NI. For NIC diagnosis, a user can filter the Member NIs to be executed. In this example, a user may not run all Member NIs if there are many BGP devices in the network. Instead, the user may want to run the Member NIs for the device(s) related to this Incident. To define a simple filter, a user may select a variable (signature variable of NIC, member device, and member Network Intent Tag), an operator (contains, matches, is part of, in the same subnet as), and the data field of the Incident Type or any manual input text. The user can combine multiple simple filters with the standard Boolean AND/OR operations. The user may set Maximum Network Intent Matched for One Trigger as a reasonable number to protect the system.

Figure 28:
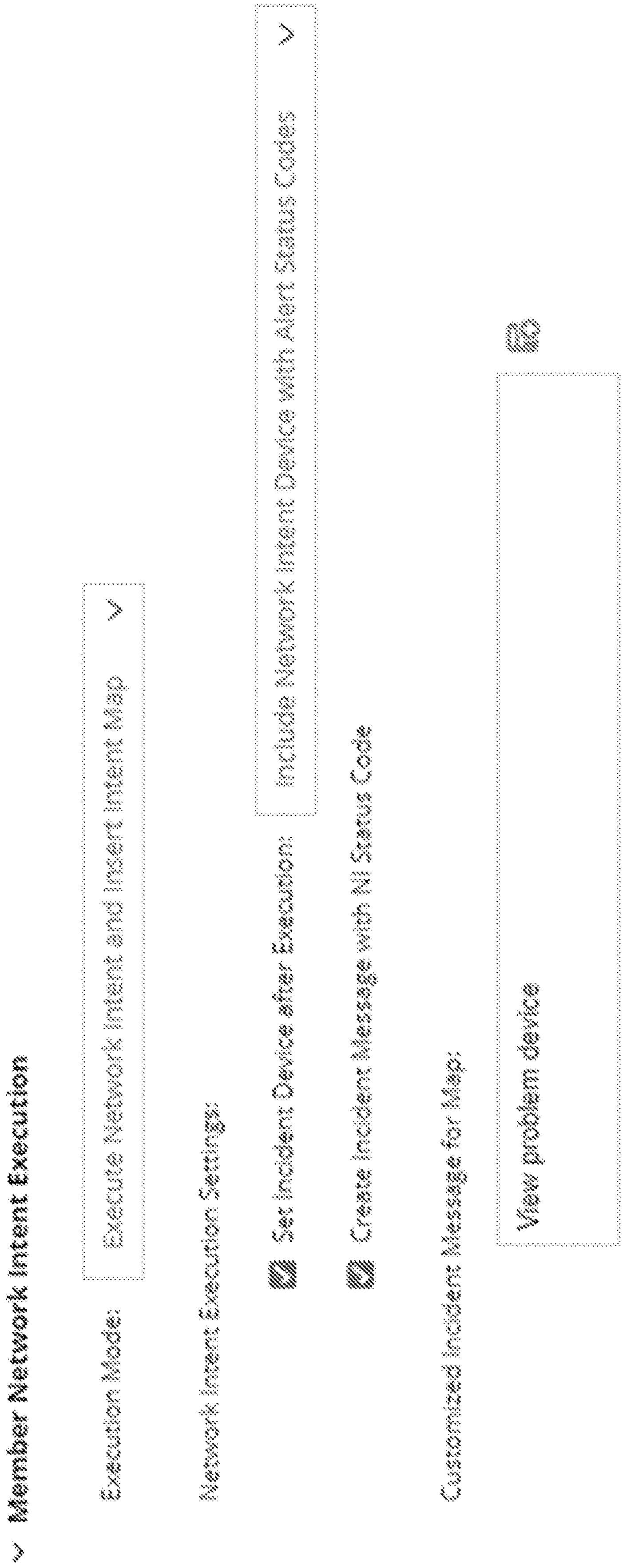
FIG. 28 illustrates an example for member NI execution.

FIG. 28 illustrates an example for member NI execution. NIC defines the logic to check the network state against the Intent and create a map for the Intent. The user can specify which to execute. As shown, the execution mode is selected from available modes: Execute Network Intent, Insert Intent Map, and Execute Network Intent and Add Intent Map. The Network Intent Setting is selected for defining how the results are displayed in the Incident Portal. The option Set Incident Device after Execution allows the user to set the incident device(s) to include all Network Intent devices or the Network Intent Devices with the alert status codes. The option Create Incident Message by Status Code can create an Incident message with the status code. If an NI has an Intent Map, the system will display the map in Incident Portal. Otherwise, the system may create an Intent Map according to the logic defined in NIC. An incident message may also be created with a hyperlink to the Intent Map. This setting affects both the triggered and self-service Diagnosis. If Execute Network Intent is selected, this Diagnosis may be available for the manual Trigger NetBrain Diagnosis (in the Integrated IT system and Incident Portal). Likewise, if Insert Intent Map is selected, the Diagnosis may be available for the manual Trigger Map (in the Integrated IT system and Incident Portal).

In one embodiment, there may be a guide for interactive automation. For example, the user can select a guidebook or a Runbook Template to guide the end-user to run the recommended automation in the Incident Portal.

In another embodiment, there may be a subscription to preventative automation. A diagnosis can be configured to collect the alerts from Flash Probe and/or NIs. The user can define the time range (e.g., next one day), filter tag (e.g., BGP probe or NI), and alert type from Intent. The system may collect alerts from the fresh probe or NIs on all incident devices in the configured time range and display them in the Incident Pane.

Figure 29:
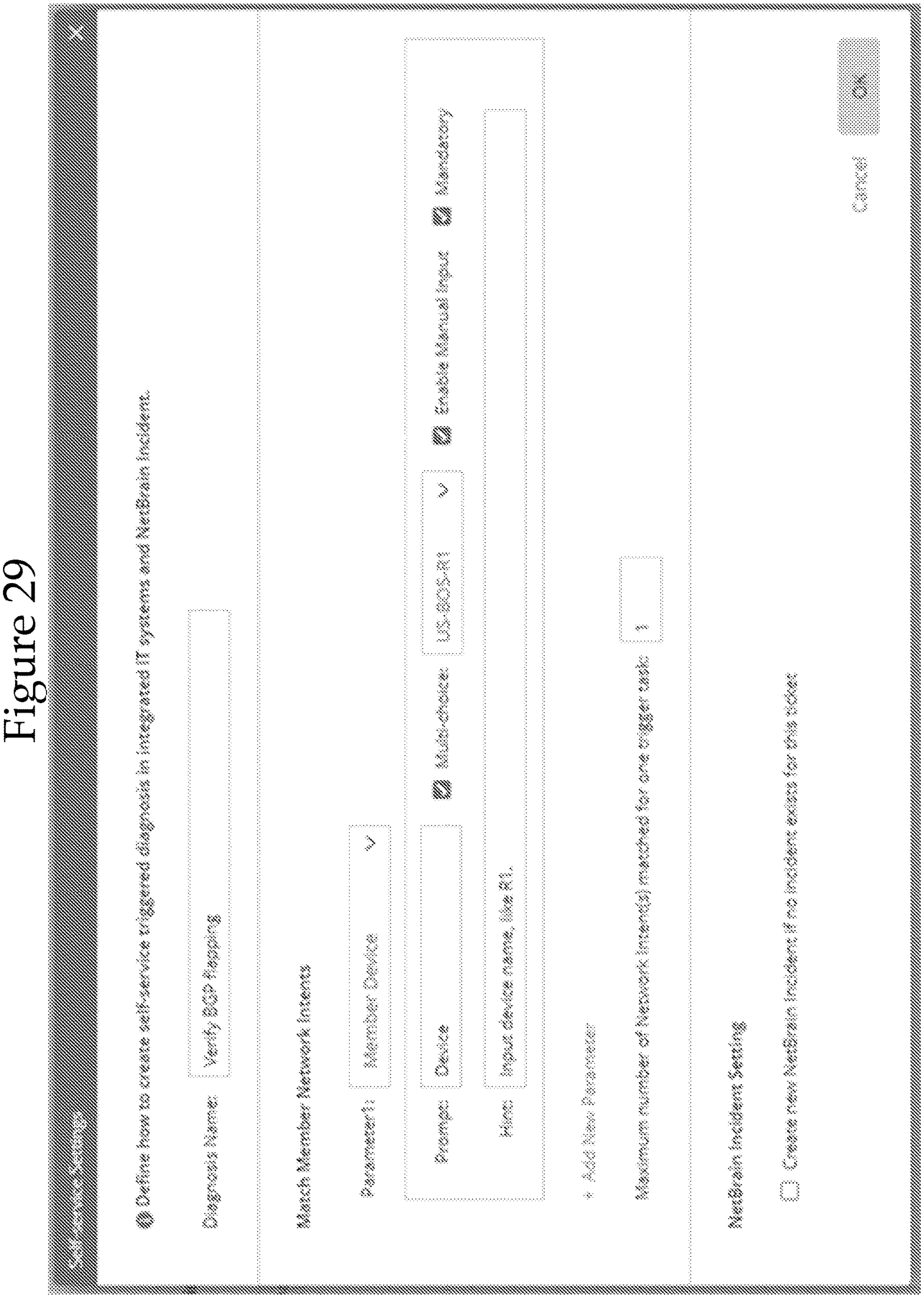
FIG. 29 illustrates an example of self-service settings.

FIG. 29 illustrates an example of self-service settings. If a diagnosis is enabled for self-service, an end-user can select and run this Diagnosis manually from Incident Portal or the IT Integrated System such as ServiceNow. Self-service settings may define parameters an end-user must input in the popup window when the Diagnosis is selected and run and other example options:

- Diagnosis name: the name displayed to the end-user while selecting a diagnosis to run. It can be different than the diagnosis name defined in the Triggered Diagnosis window.
- Parameters to filter the Member NIs: the user can select the NIC signature variable, member device, and member network intent tag. For each parameter, the user can define the prompt, whether the end-user selects the value from the multiple-choice and/or enter the value manually, whether it is mandatory, and hint. When MultiChoice is enabled, the user should enter the possible choices separated by the semi-colon (;). These choices will be displayed to the end-user as the dropdown menu. If both multiple-choice and manual input is enabled, the end-user can manually enter the value or select from the dropdown list.
- Maximum Network Intent Matched for One Trigger defines the maximum of matched NIs. The system will stop matching NIs when this number is reached.
- Checkbox Create New Incident if No Incident Exists in this ticket will create a new incident if no incident exists for this ticket.

The self-service setting may have the default values so that the Diagnosis can work when a user does not change the default setting.

Figure 30:
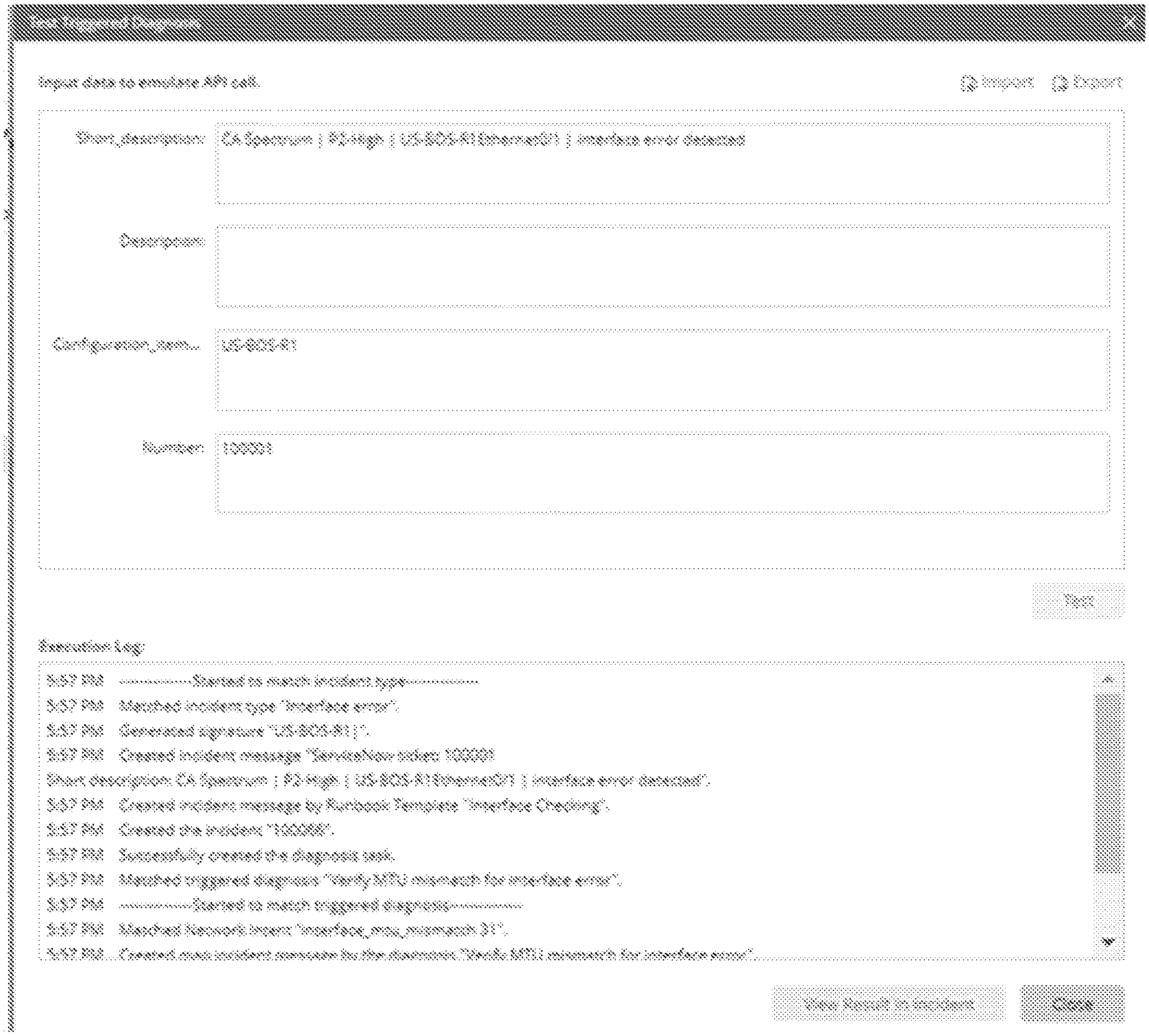
FIG. 30 illustrates an example of test triggered diagnosis.

FIG. 30 illustrates an example of test triggered diagnosis. The triggered Diagnosis UI provides the Test button for a user to test its definition. After inputting the data fields to emulate the API call, the system prints out the execution log with the following example output:

- The results of Incident type.
- Matched triggered Diagnosis.
- Matched member NIs for NIC triggered Diagnosis.
- NI execution results if execution mode includes the execution of NI.
- The message "Created map incident message." if the execution mode includes the Intent Map. Likewise, the map note is displayed if the corresponding option is selected.
- Incident devices if Set Incident Device option is set.
- Incident message if the option is enabled.
- Whether the incident message is successfully created by the Guidebook or Runbook template if the corresponding option is selected.
- Whether the subscription to preventive automation is successfully enabled if it is configured.

A link may be provided to view the Incident for this incoming call.

Figure 31:
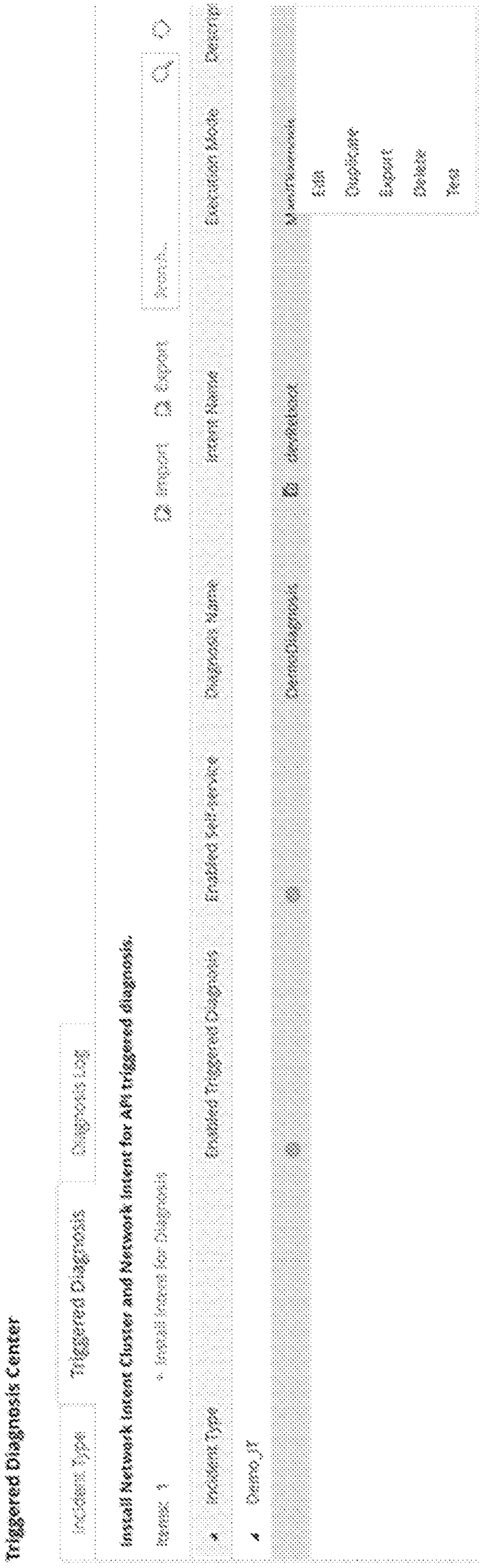
FIG. 31 illustrates an example of managing triggered diagnosis.

FIG. 31 illustrates an example of managing triggered diagnosis.

Triggered Diagnosis may be managed in the Triggered Diagnosis Center, where a user can view all Diagnoses grouped by Incident Types, create, edit, delete, and duplicate (copy) a diagnosis. The center may also provide search and import/export functions.

TAF Triggered Diagnosis Log

Figure 32:
FIG. 32 illustrates an example of a triggered diagnosis log.

FIG. 32 illustrates an example of a triggered diagnosis log. Under the Triggered Diagnosis Log tag of the Triggered Diagnosis Center, logs of triggered Diagnosis are listed, including:

- Auto trigger diagnosis by the Integrated IT systems
- Manually triggered Diagnosis from the Integrated IT systems
- Manually triggered maps from the Integrated IT systems.
- Manually triggered Diagnosis from NetBrain Incident Portal Each task may have the following fields:

- Triggered Task ID.
- Source: integrated IT system, NetBrain, or Incident Portal.
- Category: the Integrated IT system category or empty if it is from NetBrain Incident.
- Triggered time.
- The tasks status: Pending, Running, Finished, aborted, or Failed.
- Incident type: can be none if no Incident type is matched.
- Incident ID: none if no Incident is matched.
- Matched diagnosis count: the number of diagnoses triggered by this task.
- Log: view the execution log of this task.

The user can manually delete triggered tasks. In addition, the system provides the global data clean function to delete historical data older than a customizable time.

Referring back to FIG. 2, the PDAS system output may include the Incident Pane. Specifically, the Incident is the PDAS output, whose data may be displayed in the incident pane and incident portal. The system may create an incident for each ticket when triggered automation occurs. The user is redirected to the Incident Pane from the customer ticket system, which provides data and diagnosis history. The Incident Pane provides a central collaboration platform for troubleshooting and data sharing, including:

- External ticket information, such as ServiceNow ticket ID, short description, and call back URL.
- Problem area mappings.
- NetBrain Flash alert from the adaptive monitoring, shown as the incident message.
- Network Intent diagnosis result, shown in the incident diagnosis tab.
- User notes during collaborative troubleshooting.
- Recommended guidebook and runbook template.

Figure 33:
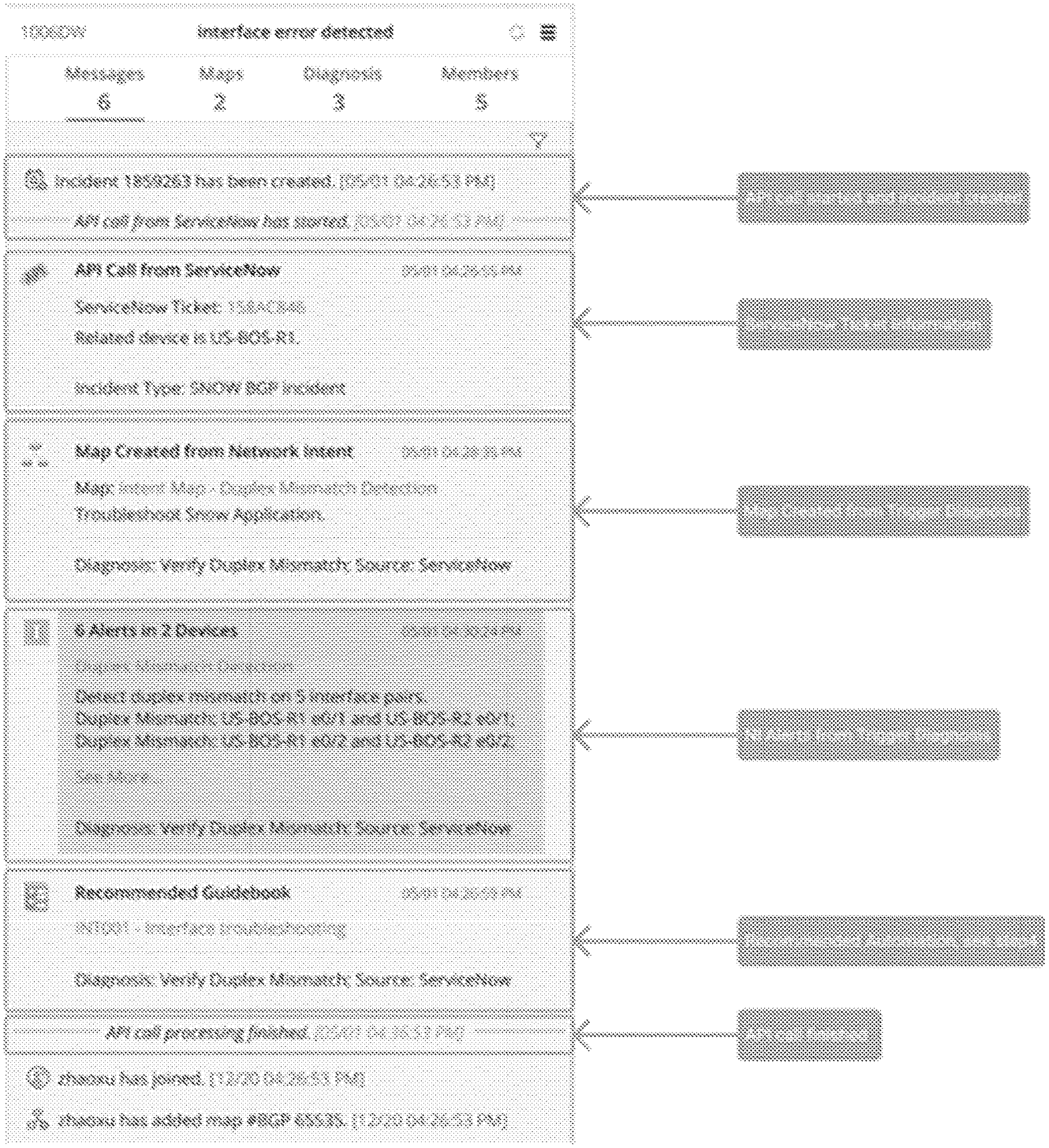
FIG. 33 illustrates an example view of Triggered Diagnosis Results.

There may be an Incident-based Collaboration Flow. First, users may open a ServiceNow ticket during Troubleshooting. An incident can be created automatically for a ServiceNow ticket based on the TAF definition. Users can open a ServiceNow ticket and find the related link to the Incident. Second, the incident pane is opened to provide a view of the messages, showing the triggered process and details. Third, FIG. 33 illustrates an example view of Triggered Diagnosis Results. The TAF system can be configured to send the following kinds of messages into an Incident:

- The ServiceNow ticket data.
- A message with a hyperlink to the intent map. Click the hyperlink to open the map.
- Alerts generated by the triggered NI. Click the Intent name to open the NI.
- Recommended Guidebook or Runbook.

Figure 34:
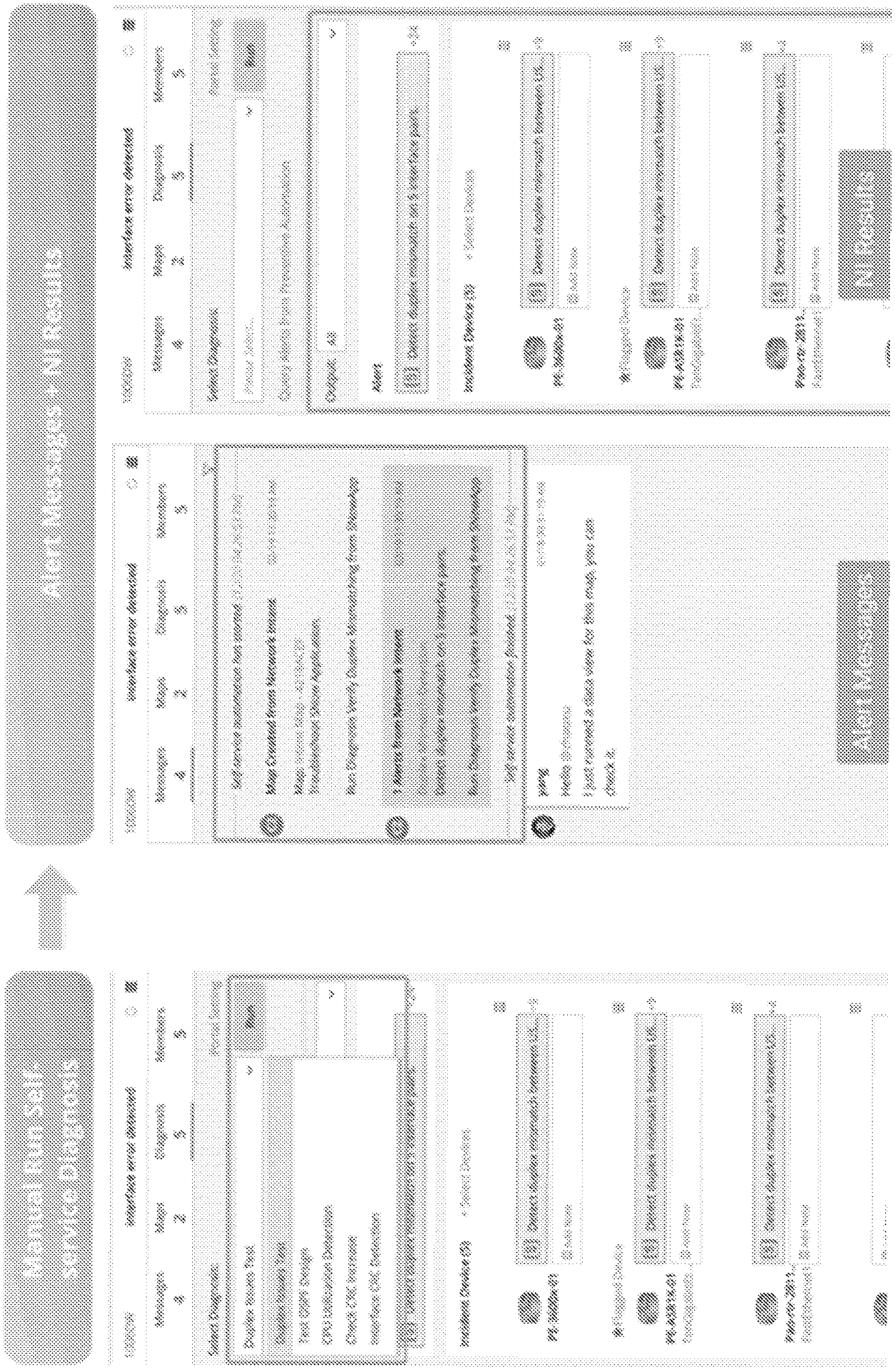
FIG. 34 illustrates example results viewed in the message pane and diagnosis pane.

Fourth, a recommended Guidebook or Runbook Template is run. It may include a drill down of the guidebook and/or template. Fifth, there is a subscription to Preventive Automation to Find Relevant Alerts. Probes and NI/NICs are chosen to subscribe to the alerts created by them. The alerts can be viewed in the message pane and diagnosis pane. Sixth, self-service Diagnosis can be run. Users may run the pre-defined Diagnosis manually. FIG. 34 illustrates example results viewed in the message pane and diagnosis pane.

TAF Diagnosis Output

Figure 35:
FIG. 35 illustrates an example of diagnosis output.

FIG. 35 illustrates an example of diagnosis output. Specifically, the display may include Diagnosis Results and Run Diagnosis. The Incident pane includes four tabs: Messages, Maps, Diagnosis, and Members. The Diagnosis tab provides a central view of the diagnosis results from other functions and for manually running the Diagnosis. Under NI Output, the results from the three sources may be displayed: Triggered Diagnosis, Manually Run Diagnosis, and Preventive Automation (Probe trigger NI). Users can select the NIs to view NI alerts and NI alerts generated on the incident device(s). In some embodiments, one alert is displayed by default. However, users can click the number to see more. Users can manually execute NI. For example, users can run self-service Diagnoses defined in TAF in the NetBrain system. After the NI/NIC in Diagnosis is executed, the execution results may be sent to the incident message and the output of the diagnosis pane. There may be Query Alerts from Preventive Automation.

Solving a problem may require multi-person cooperation and various data types (such as map, NI, probe, and Runbook). The solution may be through troubleshooting and reviewing. Preventive Automation (Adaptive Monitoring) data subscription allows users to see all diagnosis results related to current network problems in the most recent time, which helps users locate and solve problems faster.

Figure 36:
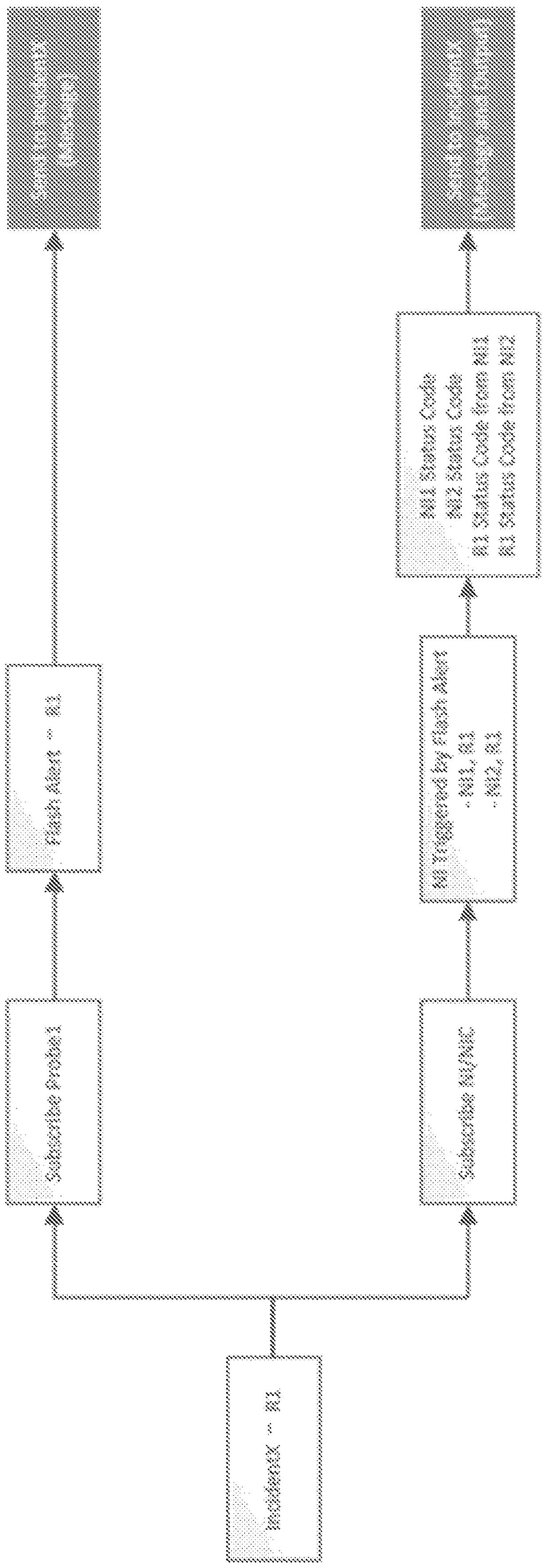
FIG. 36 illustrates an example of preventative automation or adaptive monitoring data subscription.

FIG. 36 illustrates an example of preventative automation or adaptive monitoring data subscription. The flow of Preventive Automation (Adaptive Monitoring) data subscription may include the flash alert generated by the probe that will generate incident messages and the alert status code generated by NI that will generate incident messages, which can also be seen in the output of the diagnosis pane. Users can choose which probes to subscribe to and which NI/NICs are included in the probe:

Specify the subscription scope of the probe, including all Probes of Incident Devices where all probes are subscribed or a select part of probes.

Specify the subscription scope of NI/NIC, including all NIs of Incident Devices, NIs with Tags, or selected Nis.

Define subscription time: Fill in the absolute value of the time. After submission, it is valid for the future time, and the results generated from the past time will not be synchronized.

The system and process described above may be encoded in a signal bearing medium, a computer readable medium such as a memory, programmed within a device such as one or more integrated circuits, one or more processors or processed by a controller or a computer. That data may be analyzed in a computer system and used to generate a spectrum. If the methods are performed by software, the software may reside in a memory resident to or interfaced to a storage device, synchronizer, communication interface, or non-volatile or volatile memory in communication with a transmitter. A circuit or electronic device designed to send data to another location. The memory may include an ordered listing of executable instructions for implementing logical functions. A logical function or any system element described may be implemented through optic circuitry, digital circuitry, through source code, through analog circuitry, through an analog source such as an analog electrical, audio, or video signal or a combination. The software may be embodied in any computer-readable or signal-bearing medium, for use by, or in connection with an instruction executable system, apparatus, or device. Such a system may include a computer-based system, a processor-containing system, or another system that may selectively fetch instructions from an instruction executable system, apparatus, or device that may also execute instructions.

A "computer-readable medium," "machine readable medium," "propagated-signal" medium, and/or "signal-bearing medium" may comprise any device that includes stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection "electronic" having one or more wires, a portable magnetic or optical disk, a volatile memory such as a Random Access Memory "RAM", a Read-Only Memory "ROM", an Erasable Programmable Read-Only Memory (EPROM or Flash memory), or an optical fiber. A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The phrase "coupled with" is defined to mean directly connected to or indirectly connected through one or more intermediate components. Such intermediate components may include both hardware and software based components. Variations in the arrangement and type of the components may be made without departing from the spirit or scope of the claims as set forth herein. Additional, different or fewer components may be provided.

The above disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description. While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A method for network management comprising:

receiving an incident via a ticket system for a network;

analyzing the incident;

performing an automated diagnosis of the incident based on the analysis, wherein the automated diagnosis comprises implementing a Triggered Automation Framework (TAF), wherein the TAF comprises:

matching incoming application program interface (API) calls; and installing automation to be triggered for each of the API calls, the installing comprising a triggered diagnosis to define execution of a network intent (NI) and a network intent cluster (NIC), wherein defining execution of the NIC comprises:

identifying network intents (NIs) by grouping devices via group-by eigen value to form eigen groups;

selecting member NIs of the NIC from the eigen groups; and filtering the member NIs to be executed based on at least one of: a NIC signature variable, a member device, or a member NI tag; and outputting results of the automated diagnosis for troubleshooting and data sharing.

2. The method of claim 1, wherein the automated diagnosis further comprises:

performing a self-service diagnosis;

performing an interactive automation; and performing preventative automation via a probe.

3. The method of claim 1, wherein the outputting results comprise an incident pane as a graphical user interface (GUI).

4. The method of claim 3, wherein the incident pane displays results from a network intent (NI) diagnosis.

5. The method of claim 4, wherein results from the TAF are displayed on the incident pane.

6. The method of claim 1, further comprising:

defining conditions for the triggering of the NI;

identifying member NIs to be executed; and executing the member NIs.

7. The method of claim 6, wherein the conditions comprise triggered conditions.

8. The method of claim 1, wherein the TAF further comprises:

diagnosing a deviation of a design of the network from a baseline configuration of the network.

* * * * *